(12) United States Patent
Sculley

(10) Patent No.: US 10,264,213 B1
(45) Date of Patent: Apr. 16, 2019

(54) CONTENT AMPLIFICATION SYSTEM AND METHOD

(71) Applicant: Steelcase Inc., Grand Rapids, MI (US)

(72) Inventor: Darrin Sculley, Byron Center, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 15/840,730

(22) Filed: Dec. 13, 2017

Related U.S. Application Data

(60) Provisional application No. 62/434,755, filed on Dec. 15, 2016.

(51) Int. Cl.
*H04N 7/15* (2006.01)
*H04N 7/14* (2006.01)
(Continued)

(52) U.S. Cl.
CPC ........... *H04N 7/15* (2013.01); *G06F 3/04817* (2013.01); *H04L 65/403* (2013.01); *H04N 7/147* (2013.01)

(58) Field of Classification Search
CPC .......... H04N 7/15; H04N 7/142; H04N 7/147; H04N 5/268; H04N 7/183
(Continued)

(56) References Cited

U.S. PATENT DOCUMENTS

| 892,954 A | 7/1908 | Hanson |
|---|---|---|
| 1,189,799 A | 7/1916 | Erickson |

(Continued)

FOREIGN PATENT DOCUMENTS

| AU | 2011203137 A1 | 7/2011 |
|---|---|---|
| AU | 2011101160 B4 | 10/2011 |

(Continued)

OTHER PUBLICATIONS

ISA—The Instrumentation, Systems and Automation Society, Microsoft Opens Productivity Research Center, Sep. 26, 2002, 1 page, http://www.isa.org/InTechTemplate.cfm?Section=InTech&template=/ContentManagement/ContentDisplay.cfm&ContentID=18830.

(Continued)

*Primary Examiner* — Melur Ramakrishnaiah
(74) *Attorney, Agent, or Firm* — Quarles & Brady LLP

(57) ABSTRACT

A digital content conference sharing system comprising a first large common emissive surface arranged for viewing by users within a conference space, a first conference table assembly located in the conference space and including at least a first worksurface member and at least first and second user stations including first and second station worksurfaces and first and second indicator devices, the first indicator device controllable to indicate at least first and second visually distinct states, the second indicator device controllable to indicate at least the first visually distinct state and a third visually distinct state that is distinct from the first and second states, a processor programmed to perform the steps of, while a source device is associated with the first station or the second station and capable of sharing but is not sharing content on the common emissive surface, controlling the first and second indicators to indicate the first state, respectively and, while a source device is associated with the first station and the second station and is sharing content on the common emissive surface, controlling the first indicator to indicate the second state and the second indicator to indicate the third state, respectively.

46 Claims, 36 Drawing Sheets

(51) Int. Cl.
*G06F 3/0481* (2013.01)
*H04L 29/06* (2006.01)

(58) Field of Classification Search
USPC .......................... 348/14.01–14.16; 709/204
See application file for complete search history.

(56) References Cited

U.S. PATENT DOCUMENTS

| | | |
|---|---|---|
| 1,428,629 A | 9/1922 | Gunn |
| D100,987 S | 8/1936 | Colen |
| D142,121 S | 8/1945 | Ristenpart |
| 2,480,393 A | 8/1949 | Bossert et al. |
| 2,489,933 A | 11/1949 | Schwarz, Jr. |
| D158,160 S | 4/1950 | Viola |
| D158,522 S | 5/1950 | Smith et al. |
| 2,712,972 A | 7/1955 | Manson et al. |
| 3,053,598 A | 9/1962 | Cheslow |
| 3,128,344 A | 4/1964 | Goold |
| 3,177,594 A | 4/1965 | Demo |
| 3,342,147 A | 9/1967 | Shettles |
| D209,841 S | 1/1968 | Bue et al. |
| D209,911 S | 1/1968 | Cooper |
| 3,514,871 A | 6/1970 | Tucker |
| 3,549,200 A | 12/1970 | Cooper |
| 3,636,892 A | 1/1972 | Linton |
| 3,637,268 A | 1/1972 | Walter |
| 3,741,852 A | 6/1973 | Keener |
| 3,911,218 A | 10/1975 | Suzuki et al. |
| D245,465 S | 8/1977 | Hindle |
| 4,050,165 A | 9/1977 | Yamauchi et al. |
| 4,155,609 A | 5/1979 | Skafte et al. |
| 4,323,291 A | 4/1982 | Ball |
| 4,382,642 A | 5/1983 | Burdick |
| 4,382,643 A | 5/1983 | Heinrich |
| 4,409,906 A | 10/1983 | Alneng |
| 4,430,526 A | 2/1984 | Brown et al. |
| 4,451,895 A | 5/1984 | Sliwkowski |
| 4,495,490 A | 1/1985 | Hopper et al. |
| 4,503,429 A | 3/1985 | Schreiber |
| 4,516,156 A | 5/1985 | Fabris et al. |
| 4,521,770 A | 6/1985 | Rhyne |
| 4,538,993 A | 9/1985 | Krumholz |
| 4,544,804 A | 10/1985 | Herr et al. |
| 4,562,482 A | 12/1985 | Brown |
| 4,587,568 A | 5/1986 | Takayama et al. |
| 4,612,863 A | 9/1986 | Vonhausen et al. |
| 4,616,336 A | 10/1986 | Robertson et al. |
| 4,619,427 A | 10/1986 | Leymann |
| 4,659,048 A | 4/1987 | Fahrion |
| 4,659,876 A | 4/1987 | Sullivan et al. |
| 4,667,254 A | 5/1987 | Araki et al. |
| 4,683,468 A | 7/1987 | Himelstein et al. |
| 4,686,522 A | 8/1987 | Hernandez et al. |
| D293,403 S | 12/1987 | Umanoff et al. |
| 4,715,818 A | 12/1987 | Shapiro et al. |
| 4,725,106 A | 2/1988 | Shields et al. |
| 4,725,829 A | 2/1988 | Murphy |
| 4,732,088 A | 3/1988 | Koechlin et al. |
| 4,735,467 A | 4/1988 | Wolters |
| 4,736,407 A | 4/1988 | Dumas |
| 4,740,779 A | 4/1988 | Cleary et al. |
| D295,630 S | 5/1988 | Wells-Papanek et al. |
| 4,751,399 A | 6/1988 | Koehring |
| 4,752,773 A | 6/1988 | Togawa et al. |
| 4,752,893 A | 6/1988 | Guttag et al. |
| 4,758,887 A | 7/1988 | Engel et al. |
| 4,763,356 A | 8/1988 | Day, Jr. et al. |
| 4,780,821 A | 10/1988 | Crossley |
| 4,785,472 A | 11/1988 | Shapiro |
| 4,797,106 A | 1/1989 | Umehara et al. |
| 4,815,029 A | 3/1989 | Barker et al. |
| 4,817,903 A | 4/1989 | Braehler et al. |
| 4,836,478 A | 6/1989 | Sweere |
| 4,838,177 A | 6/1989 | Vander Park |
| 4,852,500 A | 8/1989 | Ryburg et al. |
| 4,876,657 A | 10/1989 | Saito et al. |
| 4,893,116 A | 1/1990 | Henderson et al. |
| 4,897,801 A | 1/1990 | Kazama et al. |
| 4,920,458 A | 4/1990 | Jones |
| 4,922,835 A | 5/1990 | Van Vliet et al. |
| 4,939,509 A | 7/1990 | Bartholomew et al. |
| 4,953,159 A | 8/1990 | Hayden et al. |
| 4,954,970 A | 9/1990 | Walker et al. |
| 4,974,173 A | 11/1990 | Stefik et al. |
| 4,974,913 A | 12/1990 | Vogt et al. |
| 4,996,110 A | 2/1991 | Tanuma et al. |
| 5,002,491 A | 3/1991 | Abrahamson et al. |
| 5,008,853 A | 4/1991 | Bly et al. |
| 5,014,267 A | 5/1991 | Tompkins et al. |
| 5,018,083 A | 5/1991 | Watanabe et al. |
| 5,025,314 A | 6/1991 | Tang et al. |
| 5,027,198 A | 6/1991 | Yoshioka |
| 5,035,392 A | 7/1991 | Gross et al. |
| 5,038,158 A | 8/1991 | Ayers et al. |
| 5,050,077 A | 9/1991 | Vincent |
| 5,050,105 A | 9/1991 | Peters |
| 5,063,600 A | 11/1991 | Norwood |
| 5,065,832 A | 11/1991 | Mark |
| D322,857 S | 12/1991 | Bacus |
| 5,073,926 A | 12/1991 | Suzuki et al. |
| 5,086,385 A | 2/1992 | Launey |
| 5,097,672 A | 3/1992 | Takenaka |
| 5,101,197 A | 3/1992 | Hix et al. |
| 5,104,087 A | 4/1992 | Wentzloff et al. |
| 5,107,443 A | 4/1992 | Smith et al. |
| 5,119,319 A | 6/1992 | Tanenbaum |
| 5,121,698 A | 6/1992 | Kelley |
| 5,122,941 A | 6/1992 | Gross et al. |
| 5,131,849 A | 7/1992 | Perrero |
| 5,146,552 A | 9/1992 | Cassorla et al. |
| D331,060 S | 11/1992 | Emmons et al. |
| 5,176,520 A | 1/1993 | Hamilton |
| 5,201,011 A | 4/1993 | Bloomberg et al. |
| 5,202,828 A | 4/1993 | Vertelney et al. |
| 5,206,934 A | 4/1993 | Naef, III |
| D335,281 S | 5/1993 | Thummel |
| 5,208,912 A | 5/1993 | Nakayama et al. |
| 5,216,755 A | 6/1993 | Walker et al. |
| 5,239,373 A | 8/1993 | Tang et al. |
| 5,239,466 A | 8/1993 | Morgan et al. |
| 5,261,735 A | 11/1993 | Cohen et al. |
| 5,271,097 A | 12/1993 | Barker et al. |
| 5,280,583 A | 1/1994 | Nakayama et al. |
| 5,293,097 A | 3/1994 | Elwell |
| 5,293,619 A | 3/1994 | Dean |
| 5,299,033 A | 3/1994 | Watanabe et al. |
| 5,299,307 A | 3/1994 | Young |
| 5,309,555 A | 5/1994 | Akins et al. |
| 5,321,579 A | 6/1994 | Brown et al. |
| 5,328,145 A | 7/1994 | Charapich |
| 5,339,389 A | 8/1994 | Bates et al. |
| 5,340,978 A | 8/1994 | Rostoker et al. |
| 5,347,295 A | 9/1994 | Agulnick et al. |
| 5,351,241 A | 9/1994 | Yehonatan |
| 5,352,033 A | 10/1994 | Gresham et al. |
| 5,375,200 A | 12/1994 | Dugan et al. |
| 5,382,972 A | 1/1995 | Kannes |
| 5,392,400 A | 2/1995 | Berkowitz et al. |
| 5,406,176 A | 4/1995 | Sugden |
| 5,412,775 A | 5/1995 | Maeda et al. |
| D359,405 S | 6/1995 | Ball |
| 5,438,937 A | 8/1995 | Ball et al. |
| 5,442,749 A | 8/1995 | Northcutt et al. |
| 5,442,788 A | 8/1995 | Bier |
| 5,448,263 A | 9/1995 | Martin |
| 5,455,487 A | 10/1995 | Mix |
| 5,463,728 A | 10/1995 | Blahut et al. |
| 5,465,370 A | 11/1995 | Ito et al. |
| 5,473,737 A | 12/1995 | Harper |
| 5,476,221 A | 12/1995 | Seymour |
| 5,489,827 A | 2/1996 | Xia |
| D367,857 S | 3/1996 | Emmerik |
| 5,500,671 A | 3/1996 | Andersson et al. |
| 5,502,727 A | 3/1996 | Catanzaro et al. |

(56) References Cited

U.S. PATENT DOCUMENTS

| | | |
|---|---|---|
| D368,721 S | 4/1996 | Howell et al. |
| 5,503,891 A | 4/1996 | Marshall et al. |
| 5,508,713 A | 4/1996 | Okouchi |
| 5,522,324 A | 6/1996 | van Gelder et al. |
| 5,530,795 A | 6/1996 | Wan |
| 5,530,880 A | 6/1996 | Katsurabayashi |
| 5,537,548 A | 7/1996 | Fin et al. |
| 5,548,705 A | 8/1996 | Moran et al. |
| 5,549,267 A | 8/1996 | Armbruster et al. |
| 5,557,725 A | 9/1996 | Ansberry et al. |
| D375,909 S | 11/1996 | Dziersk et al. |
| 5,579,481 A | 11/1996 | Drerup |
| D376,790 S | 12/1996 | Goulet et al. |
| 5,589,873 A | 12/1996 | Natori et al. |
| 5,595,126 A | 1/1997 | Yeh |
| 5,596,721 A | 1/1997 | Masse et al. |
| 5,608,426 A | 3/1997 | Hester |
| 5,608,872 A | 3/1997 | Schwartz et al. |
| 5,625,833 A | 4/1997 | Levine et al. |
| 5,634,018 A | 5/1997 | Tanikoshi et al. |
| 5,638,758 A | 6/1997 | Carr |
| D381,662 S | 7/1997 | Weissberg et al. |
| 5,649,104 A | 7/1997 | Carleton et al. |
| 5,651,107 A | 7/1997 | Frank et al. |
| D382,307 S | 8/1997 | Sharpe, III et al. |
| 5,655,822 A | 8/1997 | Roberts et al. |
| 5,657,049 A | 8/1997 | Ludolph et al. |
| 5,671,380 A | 9/1997 | Hidaka |
| 5,680,636 A | 10/1997 | Levine et al. |
| 5,687,499 A | 11/1997 | Brnjac |
| 5,701,981 A | 12/1997 | Marshall et al. |
| 5,704,042 A | 12/1997 | Hester et al. |
| D388,639 S | 1/1998 | Dormon et al. |
| 5,712,995 A | 1/1998 | Cohn |
| D390,381 S | 2/1998 | Dormon et al. |
| 5,717,856 A | 2/1998 | Carleton |
| 5,717,939 A | 2/1998 | Bricklin et al. |
| D392,361 S | 3/1998 | Cooper |
| 5,724,778 A | 3/1998 | Cornell et al. |
| 5,732,227 A | 3/1998 | Kuzunuki et al. |
| D393,382 S | 4/1998 | Rutter et al. |
| 5,735,220 A | 4/1998 | Wang |
| 5,738,316 A | 4/1998 | Sweere et al. |
| 5,748,894 A | 5/1998 | Ishizaki et al. |
| 5,754,186 A | 5/1998 | Tam et al. |
| 5,761,419 A | 6/1998 | Schwartz et al. |
| 5,765,315 A | 6/1998 | Nagamitsu et al. |
| 5,767,897 A | 6/1998 | Howell |
| 5,781,727 A | 7/1998 | Carleton et al. |
| 5,790,114 A | 8/1998 | Geaghan et al. |
| 5,790,818 A | 8/1998 | Martin |
| 5,797,666 A | 8/1998 | Park |
| 5,799,320 A | 8/1998 | Klug |
| 5,805,118 A | 9/1998 | Mishra et al. |
| D399,501 S | 10/1998 | Arora et al. |
| 5,819,038 A | 10/1998 | Carleton et al. |
| 5,822,525 A | 10/1998 | Tafoya et al. |
| 5,829,509 A | 11/1998 | Crafton |
| 5,831,211 A | 11/1998 | Gartung et al. |
| 5,831,622 A | 11/1998 | Ayala |
| 5,835,713 A | 11/1998 | FitzPatrick et al. |
| 5,838,914 A | 11/1998 | Carleton et al. |
| 5,870,547 A | 2/1999 | Pommier et al. |
| 5,872,923 A | 2/1999 | Schwartz et al. |
| 5,877,766 A | 3/1999 | Bates et al. |
| 5,889,946 A | 3/1999 | FitzPatrick et al. |
| 5,898,579 A | 4/1999 | Boys |
| 5,903,252 A | 5/1999 | Ogata |
| 5,915,091 A | 6/1999 | Ludwig |
| 5,918,841 A | 7/1999 | Sweere et al. |
| 5,920,694 A | 7/1999 | Carleton et al. |
| 5,923,844 A | 7/1999 | Pommier et al. |
| D413,212 S | 8/1999 | Dame et al. |
| 5,938,724 A | 8/1999 | Pommier et al. |
| 5,940,082 A | 8/1999 | Brinegar et al. |
| 5,943,966 A | 8/1999 | Machado et al. |
| 5,944,785 A | 8/1999 | Pommier et al. |
| 5,948,022 A | 9/1999 | Carleton et al. |
| 5,949,432 A | 9/1999 | Gough et al. |
| 5,967,058 A | 10/1999 | Ambrose et al. |
| 5,987,376 A | 11/1999 | Olson et al. |
| 5,988,076 A | 11/1999 | Vander Park |
| 5,995,096 A | 11/1999 | Kitahara et al. |
| 5,999,208 A | 12/1999 | McNerney et al. |
| 6,008,804 A | 12/1999 | Pommier et al. |
| D418,837 S | 1/2000 | Ishii |
| 6,012,398 A | 1/2000 | Boyce |
| 6,020,863 A | 2/2000 | Taylor |
| 6,038,542 A | 3/2000 | Ruckdashel |
| 6,046,709 A | 4/2000 | Shelton et al. |
| 6,047,314 A | 4/2000 | Pommier et al. |
| 6,057,835 A | 5/2000 | Sato et al. |
| 6,060,993 A | 5/2000 | Cohen |
| 6,061,717 A | 5/2000 | Carleton et al. |
| 6,072,522 A | 6/2000 | Ippolito et al. |
| 6,076,903 A | 6/2000 | Vander Park |
| D427,993 S | 7/2000 | Seal |
| 6,084,638 A | 7/2000 | Hare et al. |
| 6,091,408 A | 7/2000 | Treibitz et al. |
| 6,100,663 A | 8/2000 | Boys |
| 6,115,022 A | 9/2000 | Mayer, III et al. |
| 6,140,921 A | 10/2000 | Baron |
| 6,144,942 A | 11/2000 | Ruckdashel |
| D435,361 S | 12/2000 | Goza |
| 6,158,358 A | 12/2000 | Prendergast |
| 6,160,573 A | 12/2000 | Allen et al. |
| 6,161,487 A | 12/2000 | Chang |
| D435,835 S | 1/2001 | Steck |
| 6,168,127 B1 | 1/2001 | Saylor et al. |
| 6,170,200 B1 | 1/2001 | Cornell et al. |
| 6,170,926 B1 | 1/2001 | Roberts et al. |
| 6,177,905 B1 | 1/2001 | Welch |
| 6,182,580 B1 | 2/2001 | Barrett et al. |
| 6,182,581 B1 | 2/2001 | Boyce |
| 6,189,268 B1 | 2/2001 | Carr et al. |
| 6,199,101 B1 | 3/2001 | Pfaff |
| 6,201,859 B1 | 3/2001 | Memhard et al. |
| 6,203,053 B1 | 3/2001 | Sohrt et al. |
| 6,216,606 B1 | 4/2001 | Kathardekar et al. |
| 6,219,099 B1 | 4/2001 | Johnson et al. |
| 6,223,212 B1 | 4/2001 | Batty et al. |
| 6,237,025 B1 | 5/2001 | Ludwig et al. |
| 6,249,281 B1 | 6/2001 | Chen et al. |
| 6,254,206 B1 | 7/2001 | Petrick et al. |
| 6,262,724 B1 | 7/2001 | Crow et al. |
| 6,266,612 B1 | 7/2001 | Dussell |
| 6,266,691 B1 | 7/2001 | Watanabe et al. |
| 6,267,064 B1 | 7/2001 | Ostertag et al. |
| 6,275,223 B1 | 8/2001 | Hughes |
| D448,018 S | 9/2001 | Arjomand et al. |
| 6,283,043 B1 | 9/2001 | Stern et al. |
| 6,286,794 B1 | 9/2001 | Harbin |
| 6,288,716 B1 | 9/2001 | Humpleman |
| 6,288,753 B1 | 9/2001 | DeNicola et al. |
| 6,297,621 B1 | 10/2001 | Hui |
| 6,298,794 B1 | 10/2001 | Brown et al. |
| 6,304,068 B1 | 10/2001 | Hui |
| D452,692 S | 1/2002 | Fukuda |
| 6,335,739 B1 | 1/2002 | Matsukura et al. |
| 6,340,976 B1 | 1/2002 | Oguchi et al. |
| 6,342,906 B1 | 1/2002 | Kumar |
| 6,343,313 B1 | 1/2002 | Salesky et al. |
| 6,359,711 B1 | 3/2002 | Cole et al. |
| 6,360,101 B1 | 3/2002 | Irvin |
| 6,361,173 B1 | 3/2002 | Vlahos |
| D456,155 S | 4/2002 | DeVriendt |
| 6,363,866 B1 | 4/2002 | Schwartz |
| 6,374,547 B1 | 4/2002 | Baloga et al. |
| 6,382,109 B1 | 5/2002 | Novikoff |
| 6,388,654 B1 | 5/2002 | Platzker et al. |
| 6,394,402 B2 | 5/2002 | Coonan et al. |
| 6,411,988 B1 | 6/2002 | Tafoya et al. |
| 6,415,723 B1 | 7/2002 | Kopish et al. |
| 6,424,623 B1 | 7/2002 | Borgstahl |

(56) References Cited

U.S. PATENT DOCUMENTS

| | | |
|---|---|---|
| D461,822 S | 8/2002 | Okuley |
| 6,427,389 B1 | 8/2002 | Branc et al. |
| 6,434,158 B1 | 8/2002 | Harris |
| 6,434,159 B1 | 8/2002 | Woodward |
| 6,435,106 B2 | 8/2002 | Funk et al. |
| D463,439 S | 9/2002 | Olivo |
| 6,443,073 B1 | 9/2002 | Tsang et al. |
| 6,443,415 B1 | 9/2002 | Sundblad |
| 6,453,826 B1 | 9/2002 | Fookes et al. |
| 6,463,460 B1 | 10/2002 | Simonoff |
| 6,466,234 B1 | 10/2002 | Pyle |
| 6,473,704 B1 | 10/2002 | Ito et al. |
| 6,487,180 B1 | 11/2002 | Borgstahl |
| 6,497,184 B1 | 12/2002 | Whitesitt |
| 6,501,364 B1 | 12/2002 | Hui |
| 6,532,218 B1 | 3/2003 | Shaffer |
| 6,540,094 B1 | 4/2003 | Baloga et al. |
| 6,546,419 B1 | 4/2003 | Humpleman |
| 6,548,967 B1 | 4/2003 | Dowling |
| 6,554,433 B1 | 4/2003 | Holler |
| 6,560,637 B1 | 5/2003 | Dunlap et al. |
| 6,567,813 B1 | 5/2003 | Zhu et al. |
| 6,574,674 B1 | 6/2003 | May et al. |
| 6,587,587 B2 | 7/2003 | Altman et al. |
| 6,587,782 B1 | 7/2003 | Nocek |
| 6,588,346 B1 | 7/2003 | Bockheim et al. |
| 6,594,390 B2 | 7/2003 | Frink et al. |
| 6,598,542 B2 | 7/2003 | Goldberg et al. |
| 6,601,087 B1 | 7/2003 | Zhu et al. |
| 6,608,636 B1 | 8/2003 | Roseman |
| 6,609,691 B2 | 8/2003 | Oddsen, Jr. |
| 6,614,451 B1 | 9/2003 | Hudson et al. |
| 6,629,505 B1 | 10/2003 | Cronk et al. |
| 6,654,032 B1 | 11/2003 | Zhu et al. |
| 6,662,210 B1 | 12/2003 | Carleton et al. |
| 6,662,734 B2 | 12/2003 | Chang |
| D484,886 S | 1/2004 | Matsuoka |
| 6,681,529 B1 | 1/2004 | Baloga et al. |
| 6,691,029 B2 | 2/2004 | Hughes |
| 6,693,661 B1 | 2/2004 | Vanderwilt et al. |
| 6,695,270 B1 | 2/2004 | Smed |
| D487,469 S | 3/2004 | Glaser et al. |
| 6,714,172 B2 | 3/2004 | Matsuzaki et al. |
| 6,724,159 B2 | 4/2004 | Gutta |
| 6,724,373 B1 | 4/2004 | O'Neill, Jr. et al. |
| 6,725,784 B2 | 4/2004 | Crinion |
| 6,728,753 B1 | 4/2004 | Parasnis et al. |
| 6,735,616 B1 | 5/2004 | Thompson et al. |
| D492,311 S | 6/2004 | Suzuki |
| 6,751,914 B2 | 6/2004 | Zeh et al. |
| D493,177 S | 7/2004 | Retuta et al. |
| 6,759,997 B2 | 7/2004 | Someya et al. |
| 6,760,412 B1 | 7/2004 | Loucks |
| 6,760,749 B1 | 7/2004 | Dunlap |
| 6,774,460 B1 | 8/2004 | Herbert et al. |
| 6,780,047 B1 | 8/2004 | Laity et al. |
| 6,783,252 B1 | 8/2004 | Cambron |
| 6,784,925 B1 | 8/2004 | Tomat et al. |
| 6,788,319 B2 | 9/2004 | Matsumoto et al. |
| 6,791,575 B2 | 9/2004 | Abboud |
| 6,803,744 B1 | 10/2004 | Sabo |
| 6,813,074 B2 | 11/2004 | Starkweather |
| 6,816,129 B1 | 11/2004 | Zimmerman |
| 6,831,676 B2 | 12/2004 | Monroe |
| 6,836,870 B2 | 12/2004 | Abrams |
| D500,766 S | 1/2005 | Hanisch et al. |
| 6,839,417 B2 | 1/2005 | Weisman |
| 6,848,741 B2 | 2/2005 | Ford et al. |
| 6,849,794 B1 | 2/2005 | Lau et al. |
| 6,850,837 B2 | 2/2005 | Paulauskas |
| D505,135 S | 5/2005 | Sapp et al. |
| 6,888,438 B2 | 5/2005 | Hui |
| 6,892,650 B2 | 5/2005 | Baloga et al. |
| 6,901,448 B2 | 5/2005 | Zhu et al. |
| 6,906,495 B2 | 6/2005 | Cheng |
| D507,002 S | 7/2005 | Retuta et al. |
| 6,925,645 B2 | 8/2005 | Zhu et al. |
| 6,931,795 B1 | 8/2005 | Baloga et al. |
| D509,221 S | 9/2005 | Suber et al. |
| D512,064 S | 11/2005 | Li |
| 6,989,801 B2 | 1/2006 | Bruning |
| 6,990,909 B2 | 1/2006 | Gosling et al. |
| 7,000,660 B2 | 2/2006 | Chen |
| 7,003,728 B2 | 2/2006 | Berque |
| 7,006,055 B2 | 2/2006 | Sukthankar et al. |
| 7,016,935 B2 | 3/2006 | Lee et al. |
| 7,018,043 B2 | 3/2006 | Castaldi et al. |
| 7,027,035 B2 | 4/2006 | Youden |
| 7,027,995 B2 | 4/2006 | Kaufman |
| 7,032,523 B2 | 4/2006 | Forslund, III et al. |
| 7,042,196 B2 | 5/2006 | Ka Lai |
| 7,043,532 B1 | 5/2006 | Humpleman |
| 7,046,213 B2 | 5/2006 | Campbell et al. |
| 7,058,891 B2 | 6/2006 | O'Neal et al. |
| 7,068,254 B2 | 6/2006 | Yamazaki et al. |
| 7,069,298 B2 | 6/2006 | Zhu et al. |
| D524,291 S | 7/2006 | Tsang |
| D526,973 S | 8/2006 | Gates et al. |
| 7,084,758 B1 | 8/2006 | Cole |
| 7,092,002 B2 | 8/2006 | Ferren et al. |
| 7,095,387 B2 | 8/2006 | Lee et al. |
| D528,545 S | 9/2006 | Crews |
| 7,113,201 B1 | 9/2006 | Taylor et al. |
| 7,119,829 B2 | 10/2006 | Leonard et al. |
| 7,121,670 B2 | 10/2006 | Salvatori et al. |
| 7,124,164 B1 | 10/2006 | Chemtob |
| 7,125,088 B2 | 10/2006 | Haberman |
| 7,130,883 B2 | 10/2006 | Zhu et al. |
| 7,131,068 B2 | 10/2006 | O'Neal et al. |
| D531,998 S | 11/2006 | El Sayed et al. |
| 7,134,079 B2 | 11/2006 | Brown et al. |
| 7,136,282 B1 | 11/2006 | Rebeske |
| 7,139,976 B2 | 11/2006 | Kausik |
| 7,143,134 B2 | 11/2006 | Petrie et al. |
| 7,148,906 B2 | 12/2006 | Sakashita et al. |
| 7,149,776 B1 | 12/2006 | Roy |
| 7,161,590 B2 | 1/2007 | Daniels |
| 7,163,263 B1 | 1/2007 | Kurrasch |
| 7,166,029 B2 | 1/2007 | Enzminger |
| 7,170,531 B2 | 1/2007 | Itoh et al. |
| 7,180,475 B2 | 2/2007 | Slobodin et al. |
| 7,180,503 B2 | 2/2007 | Burr |
| 7,188,317 B1 | 3/2007 | Hazel |
| 7,197,535 B2 | 3/2007 | Salesky et al. |
| 7,198,393 B2 | 4/2007 | Tubidis et al. |
| 7,200,692 B2 | 4/2007 | Singla et al. |
| 7,203,755 B2 | 4/2007 | Zhu et al. |
| 7,207,278 B2 | 4/2007 | Latino et al. |
| D542,280 S | 5/2007 | Taylor |
| 7,212,414 B2 | 5/2007 | Baarman |
| 7,221,937 B2 | 5/2007 | Lau |
| 7,233,318 B1 | 6/2007 | Farag et al. |
| 7,238,231 B1 | 7/2007 | Craig et al. |
| 7,239,110 B2 | 7/2007 | Cheng |
| 7,240,287 B2 | 7/2007 | Qureshi et al. |
| 7,248,017 B2 | 7/2007 | Cheng |
| 7,248,231 B2 | 7/2007 | Hurley et al. |
| 7,266,383 B2 | 9/2007 | Anderson |
| 7,268,682 B2 | 9/2007 | Bialecki, Jr. |
| 7,274,413 B1 | 9/2007 | Sullivan et al. |
| 7,278,360 B2 | 10/2007 | Griepentrog |
| 7,293,243 B1 | 11/2007 | Ben-Shachar |
| D558,767 S | 1/2008 | Solland |
| 7,317,446 B1 | 1/2008 | Murphy |
| 7,340,769 B2 | 3/2008 | Baugher |
| 7,352,340 B2 | 4/2008 | Utt et al. |
| 7,368,307 B2 | 5/2008 | Cok |
| 7,370,269 B1 | 5/2008 | Prabhu |
| 7,373,605 B2 | 5/2008 | Schaper |
| 7,393,053 B2 | 7/2008 | Kurrasch |
| 7,394,405 B2 | 7/2008 | Godden |
| 7,421,069 B2 | 9/2008 | Vernon |
| 7,428,000 B2 | 9/2008 | Cutler et al. |
| 7,434,166 B2 | 10/2008 | Acharya et al. |

(56) References Cited

U.S. PATENT DOCUMENTS

| | | |
|---|---|---|
| D580,413 S | 11/2008 | Tsao |
| 7,451,181 B2 | 11/2008 | Sasaki et al. |
| 7,454,708 B2 | 11/2008 | O'Neal et al. |
| D581,927 S | 12/2008 | Sumii |
| 7,463,238 B2 | 12/2008 | Funkhouser et al. |
| 7,474,058 B2 | 1/2009 | Baarman |
| 7,475,078 B2 | 1/2009 | Kiilerich |
| 7,486,254 B2 | 2/2009 | Suzuki et al. |
| 7,492,577 B2 | 2/2009 | Tomizuka et al. |
| 7,493,565 B2 | 2/2009 | Parupudi et al. |
| 7,495,414 B2 | 2/2009 | Hui |
| D589,046 S | 3/2009 | Pascucci |
| D589,497 S | 3/2009 | Andre et al. |
| 7,499,462 B2 | 3/2009 | MacMullan |
| 7,500,795 B2 | 3/2009 | Sandhu |
| 7,509,588 B2 | 3/2009 | Van Os et al. |
| D590,391 S | 4/2009 | Sumii |
| 7,518,267 B2 | 4/2009 | Baarman |
| 7,519,664 B2 | 4/2009 | Karaki |
| 7,522,878 B2 | 4/2009 | Baarman |
| 7,525,283 B2 | 4/2009 | Cheng |
| 7,526,525 B2 | 4/2009 | Hagale |
| 7,532,196 B2 | 5/2009 | Hinckley |
| 7,535,468 B2 | 5/2009 | Uy |
| 7,542,052 B2 | 6/2009 | Solomon et al. |
| 7,554,316 B2 | 6/2009 | Stevens |
| 7,554,437 B2 | 6/2009 | Axelsen |
| D596,622 S | 7/2009 | Lee |
| 7,558,823 B2 | 7/2009 | Beers et al. |
| 7,561,116 B2 | 7/2009 | Westerinen et al. |
| D598,008 S | 8/2009 | Shimizu |
| D598,018 S | 8/2009 | Sumii |
| 7,576,514 B2 | 8/2009 | Hui |
| 7,577,522 B2 | 8/2009 | Rosenberg |
| D599,323 S | 9/2009 | Petersen |
| D600,694 S | 9/2009 | Sumii |
| 7,583,252 B2 | 9/2009 | Kurtenbach et al. |
| 7,590,941 B2 | 9/2009 | Wee |
| D601,564 S | 10/2009 | Maeno |
| D602,915 S | 10/2009 | Song et al. |
| D602,916 S | 10/2009 | Won et al. |
| 7,605,496 B2 | 10/2009 | Stevens |
| D603,457 S | 11/2009 | Julskjer et al. |
| 7,612,528 B2 | 11/2009 | Baarman |
| 7,615,936 B2 | 11/2009 | Baarman |
| 7,619,366 B2 | 11/2009 | Diederiks |
| 7,622,891 B2 | 11/2009 | Cheng |
| 7,624,192 B2 | 11/2009 | Meyers et al. |
| D606,519 S | 12/2009 | Painter |
| D606,979 S | 12/2009 | Henry |
| 7,634,533 B2 | 12/2009 | Rudolph |
| 7,639,110 B2 | 12/2009 | Baarman |
| 7,639,514 B2 | 12/2009 | Baarman |
| 7,639,994 B2 | 12/2009 | Greene |
| 7,640,506 B2 | 12/2009 | Pratley et al. |
| 7,643,312 B2 | 1/2010 | Vanderelli |
| 7,649,454 B2 | 1/2010 | Singh |
| 7,664,870 B2 | 2/2010 | Baek |
| 7,667,891 B2 | 2/2010 | Cok et al. |
| 7,679,638 B2 | 3/2010 | Eshkoli et al. |
| 7,689,655 B2 | 3/2010 | Hewitt |
| 7,693,935 B2 | 4/2010 | Weber |
| 7,707,249 B2 | 4/2010 | Spataro |
| 7,714,537 B2 | 5/2010 | Cheng |
| 7,715,831 B2 | 5/2010 | Wakefield |
| 7,716,600 B2 | 5/2010 | Sawano |
| D617,847 S | 6/2010 | Royer, II et al. |
| 7,733,366 B2 | 6/2010 | Beavers et al. |
| 7,734,690 B2 | 6/2010 | Moromisato |
| 7,734,802 B1 | 6/2010 | Gay et al. |
| 7,735,918 B2 | 6/2010 | Beck |
| 7,741,734 B2 | 6/2010 | Joannopoulos |
| 7,761,505 B2 | 7/2010 | Krzyzanowski et al. |
| 7,785,190 B2 | 8/2010 | Aida |
| D624,518 S | 9/2010 | Li |
| 7,797,645 B2 | 9/2010 | Stevens et al. |
| D625,295 S | 10/2010 | Nogueira et al. |
| 7,810,025 B2 | 10/2010 | Blair |
| 7,821,510 B2 | 10/2010 | Aksemit et al. |
| 7,825,543 B2 | 11/2010 | Karalis |
| 7,830,409 B2 | 11/2010 | Hwang et al. |
| 7,834,819 B2 | 11/2010 | Dunn et al. |
| 7,844,306 B2 | 11/2010 | Shearer |
| 7,847,675 B1 | 12/2010 | Thyen |
| 7,847,912 B2 | 12/2010 | Nishizawa et al. |
| 7,849,135 B2 | 12/2010 | Agrawal |
| 7,856,473 B2 | 12/2010 | Horikiri et al. |
| 7,863,861 B2 | 1/2011 | Cheng |
| 7,868,482 B2 | 1/2011 | Greene |
| 7,868,587 B2 | 1/2011 | Stevens |
| 7,869,941 B2 | 1/2011 | Coughlin |
| 7,876,287 B2 | 1/2011 | McLarty et al. |
| D632,265 S | 2/2011 | Choi et al. |
| 7,881,233 B2 | 2/2011 | Bieselin |
| 7,884,823 B2 | 2/2011 | Bertolami et al. |
| 7,885,925 B1 | 2/2011 | Strong |
| 7,889,425 B1 | 2/2011 | Connor |
| 7,893,953 B2 | 2/2011 | Krestakos |
| 7,896,436 B2 | 3/2011 | Kurrasch |
| 7,898,105 B2 | 3/2011 | Greene |
| 7,899,915 B2 | 3/2011 | Reisman |
| 7,904,209 B2 | 3/2011 | Podgorny |
| 7,915,858 B2 | 3/2011 | Liu |
| D636,333 S | 4/2011 | Kulikowski |
| 7,922,267 B2 | 4/2011 | Gevaert |
| 7,925,308 B2 | 4/2011 | Greene |
| 7,925,525 B2 | 4/2011 | Chin |
| 7,926,430 B2 | 4/2011 | Bakker et al. |
| 7,932,618 B2 | 4/2011 | Baarman |
| 7,941,133 B2 | 5/2011 | Aaron |
| 7,941,753 B2 | 5/2011 | Meisels |
| 7,948,448 B2 | 5/2011 | Hutchinson |
| 7,952,324 B2 | 5/2011 | Cheng |
| 7,953,369 B2 | 5/2011 | Baarman |
| D639,784 S | 6/2011 | Murayama et al. |
| 7,957,061 B1 | 6/2011 | Connor |
| 7,965,859 B2 | 6/2011 | Marks |
| 7,973,635 B2 | 7/2011 | Baarman |
| 7,973,657 B2 | 7/2011 | Ayed |
| 7,984,381 B2 | 7/2011 | Majava |
| D644,242 S | 8/2011 | Matas |
| D644,243 S | 8/2011 | Matas |
| 7,989,986 B2 | 8/2011 | Baarman |
| 7,995,732 B2 | 8/2011 | Koch et al. |
| 7,999,669 B2 | 8/2011 | Singh |
| 8,004,235 B2 | 8/2011 | Baarman |
| 8,009,412 B2 | 8/2011 | Chen |
| 8,018,579 B1 | 9/2011 | Krah |
| 8,021,164 B2 | 9/2011 | Epstein |
| 8,022,576 B2 | 9/2011 | Joannopoulos |
| 8,024,661 B2 | 9/2011 | Bibliowicz |
| 8,026,908 B2 | 9/2011 | Ku |
| 8,028,020 B2 | 9/2011 | Huck |
| 8,032,705 B2 | 10/2011 | Klitsner |
| 8,035,255 B2 | 10/2011 | Kurs |
| 8,035,340 B2 | 10/2011 | Stevens |
| 8,039,995 B2 | 10/2011 | Stevens |
| 8,040,103 B2 | 10/2011 | Hui |
| 8,041,586 B2 | 10/2011 | Jethani |
| 8,049,301 B2 | 11/2011 | Hui |
| 8,054,854 B2 | 11/2011 | Poslinski |
| 8,055,310 B2 | 11/2011 | Beart |
| 8,055,644 B2 | 11/2011 | Crowley |
| 8,057,069 B2 | 11/2011 | Mangiardi |
| 8,061,864 B2 | 11/2011 | Metcalf |
| 8,069,100 B2 | 11/2011 | Taylor |
| 8,069,465 B1 | 11/2011 | Bartholomay |
| D651,215 S | 12/2011 | Anzures et al. |
| 8,072,437 B2 | 12/2011 | Miller et al. |
| 8,073,614 B2 | 12/2011 | Coughlin |
| 8,074,581 B2 | 12/2011 | Epstein et al. |
| 8,076,800 B2 | 12/2011 | Joannopoulos |
| 8,076,801 B2 | 12/2011 | Karalis |
| 8,077,235 B2 | 12/2011 | Street |

(56) References Cited

U.S. PATENT DOCUMENTS

| | | |
|---|---|---|
| 8,081,083 B2 | 12/2011 | Hinterlong |
| 8,084,889 B2 | 12/2011 | Joannopoulos |
| D653,262 S | 1/2012 | O'Donnell et al. |
| 8,091,029 B1 | 1/2012 | Gay |
| 8,093,758 B2 | 1/2012 | Hussmann |
| 8,097,983 B2 | 1/2012 | Karalis |
| 8,097,984 B2 | 1/2012 | Baarman |
| 8,102,235 B2 | 1/2012 | Hui |
| 8,103,968 B2 | 1/2012 | Cheng |
| 8,106,539 B2 | 1/2012 | Schatz |
| 8,112,100 B2 | 2/2012 | Frank |
| 8,115,448 B2 | 2/2012 | John |
| 8,116,681 B2 | 2/2012 | Baarman |
| 8,116,683 B2 | 2/2012 | Baarman |
| 8,117,262 B2 | 2/2012 | Kumar |
| 8,117,547 B2 | 2/2012 | Parupudi et al. |
| 8,120,311 B2 | 2/2012 | Baarman |
| 8,125,461 B2 | 2/2012 | Weber et al. |
| 8,126,974 B2 | 2/2012 | Lyle |
| 8,127,155 B2 | 2/2012 | Baarman |
| 8,129,864 B2 | 3/2012 | Baarman |
| 8,138,875 B2 | 3/2012 | Baarman |
| 8,138,942 B2 | 3/2012 | Otsuka et al. |
| 8,140,701 B2 | 3/2012 | Rajan |
| 8,141,143 B2 | 3/2012 | Lee |
| 8,149,104 B2 | 4/2012 | Crum |
| 8,150,449 B2 | 4/2012 | Onozawa |
| 8,159,090 B2 | 4/2012 | Greene |
| 8,164,222 B2 | 4/2012 | Baarman |
| 8,170,946 B2 | 5/2012 | Blair |
| 8,174,152 B2 | 5/2012 | Baumann |
| 8,180,663 B2 | 5/2012 | Tischhauser |
| 8,188,856 B2 | 5/2012 | Singh |
| 8,190,908 B2 | 5/2012 | Jazayeri et al. |
| 8,191,001 B2 | 5/2012 | Van Wie et al. |
| 8,199,471 B2 | 6/2012 | Bemelmans et al. |
| 8,200,520 B2 | 6/2012 | Chen |
| 8,204,272 B2 | 6/2012 | Marks |
| 8,204,935 B2 | 6/2012 | Vernon |
| 8,209,618 B2 | 6/2012 | Garofalo |
| 8,212,779 B2 | 7/2012 | Chiang |
| 8,214,061 B2 | 7/2012 | Westrick, Jr. |
| 8,217,869 B2 | 7/2012 | Weisberg et al. |
| 8,219,115 B1 | 7/2012 | Nelissen |
| 8,222,827 B2 | 7/2012 | Kuennen |
| 8,223,508 B2 | 7/2012 | Baarman |
| 8,228,025 B2 | 7/2012 | Ho |
| 8,228,026 B2 | 7/2012 | Johnson |
| 8,234,189 B2 | 7/2012 | Taylor |
| D666,175 S | 8/2012 | Yamada |
| D666,176 S | 8/2012 | Yamada |
| 8,238,125 B2 | 8/2012 | Fells |
| 8,239,890 B2 | 8/2012 | Kooman |
| 8,259,428 B2 | 9/2012 | Mollema |
| 8,262,244 B2 | 9/2012 | Metcalf |
| 8,266,535 B2 | 9/2012 | Brown |
| 8,269,456 B2 | 9/2012 | Hui |
| 8,270,320 B2 | 9/2012 | Boyer |
| 8,280,453 B2 | 10/2012 | Beart |
| 8,280,948 B1 | 10/2012 | Chen |
| 8,290,479 B2 | 10/2012 | Aaron |
| 8,296,669 B2 | 10/2012 | Madonna |
| 8,299,753 B2 | 10/2012 | Hui |
| 8,300,784 B2 | 10/2012 | Choi |
| 8,301,077 B2 | 10/2012 | Xue |
| 8,301,079 B2 | 10/2012 | Baarman |
| 8,301,080 B2 | 10/2012 | Baarman |
| 8,304,935 B2 | 11/2012 | Karalis |
| 8,315,561 B2 | 11/2012 | Baarman |
| 8,315,621 B2 | 11/2012 | Lau |
| 8,315,650 B2 | 11/2012 | Lau |
| 8,324,759 B2 | 12/2012 | Karalis |
| 8,327,410 B2 | 12/2012 | Andersen |
| 8,338,990 B2 | 12/2012 | Baarman |
| 8,339,274 B2 | 12/2012 | Van De Sluis |
| 8,340,268 B2 | 12/2012 | Knaz |
| 8,341,532 B2 | 12/2012 | Ryan |
| 8,346,166 B2 | 1/2013 | Baarman |
| 8,346,167 B2 | 1/2013 | Baarman |
| 8,350,971 B2 | 1/2013 | Malone |
| 8,351,856 B2 | 1/2013 | Baarman |
| 8,352,296 B2 | 1/2013 | Taneja |
| 8,354,821 B2 | 1/2013 | Cheng |
| 8,362,651 B2 | 1/2013 | Hamam |
| 8,364,400 B2 | 1/2013 | Coughlin |
| 8,370,516 B2 | 2/2013 | Salesky |
| 8,373,310 B2 | 2/2013 | Baarman |
| 8,373,386 B2 | 2/2013 | Baarman |
| 8,375,103 B2 | 2/2013 | Lin |
| 8,380,255 B2 | 2/2013 | Shearer |
| 8,380,786 B2 | 2/2013 | Hoffert |
| 8,385,894 B2 | 2/2013 | Takehara |
| 8,390,669 B2 | 3/2013 | Catchpole |
| 8,395,282 B2 | 3/2013 | Joannopoulos |
| 8,395,283 B2 | 3/2013 | Joannopoulos |
| 8,395,713 B2 | 3/2013 | Kondo et al. |
| 8,396,923 B2 | 3/2013 | Salesky et al. |
| 8,400,017 B2 | 3/2013 | Kurs |
| 8,400,018 B2 | 3/2013 | Joannopoulos |
| 8,400,019 B2 | 3/2013 | Joannopoulos |
| 8,400,020 B2 | 3/2013 | Joannopoulos |
| 8,400,021 B2 | 3/2013 | Joannopoulos |
| 8,400,022 B2 | 3/2013 | Joannopoulos |
| 8,400,023 B2 | 3/2013 | Joannopoulos |
| 8,400,024 B2 | 3/2013 | Joannopoulos |
| 8,407,289 B2 | 3/2013 | Chen |
| 8,407,347 B2 | 3/2013 | Zhang et al. |
| 8,410,636 B2 | 4/2013 | Kurs |
| 8,415,897 B2 | 4/2013 | Choong |
| 8,421,407 B2 | 4/2013 | Johnson |
| 8,423,288 B2 | 4/2013 | Stahl |
| 8,432,062 B2 | 4/2013 | Greene |
| 8,433,759 B2 | 4/2013 | Styles et al. |
| 8,438,333 B2 | 5/2013 | Edwards, III |
| 8,441,154 B2 | 5/2013 | Karalis |
| 8,441,354 B2 | 5/2013 | Padmanabhan |
| 8,443,035 B2 | 5/2013 | Chen |
| 8,446,046 B2 | 5/2013 | Fells |
| 8,446,450 B2 | 5/2013 | Mauchly |
| 8,450,877 B2 | 5/2013 | Baarman |
| 8,456,509 B2 | 6/2013 | Khot |
| 8,457,888 B2 | 6/2013 | Ranford |
| 8,461,719 B2 | 6/2013 | Kesler |
| 8,461,720 B2 | 6/2013 | Kurs |
| 8,461,721 B2 | 6/2013 | Karalis |
| 8,461,722 B2 | 6/2013 | Kurs |
| 8,461,817 B2 | 6/2013 | Martin |
| 8,464,184 B1 | 6/2013 | Cook et al. |
| 8,466,583 B2 | 6/2013 | Karalis |
| 8,471,410 B2 | 6/2013 | Karalis |
| 8,473,571 B2 | 6/2013 | Penner |
| D685,790 S | 7/2013 | Tang |
| 8,476,788 B2 | 7/2013 | Karalis |
| 8,482,158 B2 | 7/2013 | Kurs |
| 8,482,160 B2 | 7/2013 | Johnson |
| 8,484,494 B2 | 7/2013 | Siegel |
| 8,487,480 B1 | 7/2013 | Kesler |
| 8,489,329 B2 | 7/2013 | Coughlin |
| 8,494,143 B2 | 7/2013 | DeJana |
| 8,495,520 B2 | 7/2013 | Islam et al. |
| 8,497,601 B2 | 7/2013 | Hall |
| 8,499,119 B2 | 7/2013 | Balraj |
| 8,504,663 B2 | 8/2013 | Lowery |
| 8,508,077 B2 | 8/2013 | Stevens |
| 8,508,573 B2 | 8/2013 | Grimshaw |
| 8,510,255 B2 | 8/2013 | Fadell |
| 8,519,668 B2 | 8/2013 | Hui |
| 8,527,549 B2 | 9/2013 | Cidon |
| 8,527,610 B2 | 9/2013 | Koike |
| 8,528,014 B2 | 9/2013 | Reynolds |
| 8,531,153 B2 | 9/2013 | Baarman |
| 8,531,294 B2 | 9/2013 | Slavin |
| 8,533,268 B1 | 9/2013 | Vernon |
| 8,538,330 B2 | 9/2013 | Baarman |

(56) References Cited

U.S. PATENT DOCUMENTS

| | | | |
|---|---|---|---|
| D692,010 S | 10/2013 | Verghese |
| 8,552,592 B2 | 10/2013 | Schatz |
| 8,554,476 B2 | 10/2013 | Coughlin |
| 8,554,477 B2 | 10/2013 | Coughlin |
| 8,554,897 B2 | 10/2013 | Kim et al. |
| 8,558,411 B2 | 10/2013 | Baarman |
| 8,558,693 B2 | 10/2013 | Martin |
| 8,560,024 B2 | 10/2013 | Beart |
| 8,560,128 B2 | 10/2013 | Ruff |
| 8,560,232 B2 | 10/2013 | Coughlin |
| 8,567,048 B2 | 10/2013 | Singh |
| 8,569,914 B2 | 10/2013 | Karalis |
| 8,587,153 B2 | 11/2013 | Schatz |
| 8,587,154 B2 | 11/2013 | Fells |
| 8,587,155 B2 | 11/2013 | Giler |
| 8,593,105 B2 | 11/2013 | Baarman |
| 8,594,291 B2 | 11/2013 | Bieselin |
| 8,598,721 B2 | 12/2013 | Baarman |
| 8,598,743 B2 | 12/2013 | Hall |
| 8,600,084 B1 | 12/2013 | Garrett |
| 8,600,670 B2 | 12/2013 | Kim |
| 8,604,714 B2 | 12/2013 | Mohan |
| 8,610,400 B2 | 12/2013 | Stevens |
| 8,610,530 B2 | 12/2013 | Singh |
| 8,610,641 B2 | 12/2013 | Hutchinson et al. |
| 8,618,696 B2 | 12/2013 | Kurs |
| 8,618,749 B2 | 12/2013 | Kuennen |
| 8,618,770 B2 | 12/2013 | Baarman |
| 8,620,389 B2 | 12/2013 | Schrager |
| 8,620,484 B2 | 12/2013 | Baarman |
| 8,620,841 B1 | 12/2013 | Filson |
| 8,621,245 B2 | 12/2013 | Shearer |
| D697,475 S | 1/2014 | Regole |
| D697,477 S | 1/2014 | Jonas, III |
| 8,622,314 B2 | 1/2014 | Fisher |
| 8,629,578 B2 | 1/2014 | Kurs |
| 8,629,755 B2 | 1/2014 | Hashim-Waris |
| 8,630,741 B1 | 1/2014 | Matsuoka |
| 8,631,126 B2 | 1/2014 | Veiseh |
| 8,638,062 B2 | 1/2014 | Baarman |
| 8,643,326 B2 | 2/2014 | Campanella |
| 8,650,600 B2 | 2/2014 | Ogle |
| 8,653,927 B2 | 2/2014 | Singh |
| 8,659,417 B1 | 2/2014 | Trundle |
| 8,660,790 B2 | 2/2014 | Stahl |
| D700,904 S | 3/2014 | Miller et al. |
| 8,665,310 B2 | 3/2014 | Verthein |
| 8,666,051 B2 | 3/2014 | Gilzean |
| 8,667,401 B1 | 3/2014 | Lozben |
| 8,667,452 B2 | 3/2014 | Verghese |
| 8,669,676 B2 | 3/2014 | Karalis |
| 8,669,844 B2 | 3/2014 | Walker |
| 8,680,960 B2 | 3/2014 | Singh |
| 8,682,973 B2 | 3/2014 | Kikin-Gil et al. |
| 8,683,345 B2 | 3/2014 | Lee |
| 8,686,598 B2 | 4/2014 | Schatz |
| 8,686,647 B2 | 4/2014 | Ono |
| 8,687,452 B2 | 4/2014 | Kishibe |
| 8,688,100 B2 | 4/2014 | Aaron |
| 8,690,362 B2 | 4/2014 | Wendt |
| 8,692,410 B2 | 4/2014 | Schatz |
| 8,692,412 B2 | 4/2014 | Fiorello |
| 8,692,639 B2 | 4/2014 | Baarman |
| 8,692,641 B2 | 4/2014 | Singh |
| 8,692,642 B2 | 4/2014 | Singh |
| 8,694,026 B2 | 4/2014 | Forstall |
| 8,694,165 B2 | 4/2014 | Smith |
| 8,694,597 B1 | 4/2014 | Raj |
| 8,698,590 B2 | 4/2014 | Singh |
| 8,698,591 B2 | 4/2014 | Singh |
| 8,700,060 B2 | 4/2014 | Huang |
| 8,707,546 B2 | 4/2014 | Singh |
| 8,710,948 B2 | 4/2014 | Singh |
| 8,712,858 B2 | 4/2014 | Blair |
| 8,713,112 B2 | 4/2014 | Hewitt |
| D705,745 S | 5/2014 | Kurs et al. |
| 8,716,903 B2 | 5/2014 | Kurs |
| 8,717,400 B2 | 5/2014 | Ranganath |
| 8,719,070 B2 | 5/2014 | Jabbour |
| 8,723,366 B2 | 5/2014 | Fiorello |
| 8,729,737 B2 | 5/2014 | Schatz |
| 8,731,116 B2 | 5/2014 | Norconk |
| 8,732,373 B2 | 5/2014 | Sirpal et al. |
| 8,742,625 B2 | 6/2014 | Baarman |
| 8,743,171 B2 | 6/2014 | Hiller |
| 8,743,198 B2 | 6/2014 | Padmanabh |
| 8,756,348 B2 | 6/2014 | Beel |
| 8,760,007 B2 | 6/2014 | Joannopoulos |
| 8,760,008 B2 | 6/2014 | Joannopoulos |
| 8,760,265 B2 | 6/2014 | Krueger |
| 8,766,484 B2 | 7/2014 | Baarman |
| 8,766,485 B2 | 7/2014 | Joannopoulos |
| 8,766,487 B2 | 7/2014 | Dibben |
| 8,767,032 B2 | 7/2014 | Rodman |
| 8,768,309 B2 | 7/2014 | Robbins |
| 8,772,971 B2 | 7/2014 | Joannopoulos |
| 8,772,972 B2 | 7/2014 | Joannopoulos |
| 8,772,973 B2 | 7/2014 | Kurs |
| 8,782,527 B2 | 7/2014 | Karlson |
| 8,788,448 B2 | 7/2014 | Fadell |
| 8,797,159 B2 | 8/2014 | Kirkpatrick |
| 8,799,495 B2 | 8/2014 | Wohlert et al. |
| 8,810,379 B2 | 8/2014 | Murphy |
| 8,812,028 B2 | 8/2014 | Yariv |
| 8,813,196 B2 | 8/2014 | Weller |
| 8,819,136 B1 | 8/2014 | Vernon |
| 8,819,138 B2 | 8/2014 | Houston |
| 8,825,597 B1 | 9/2014 | Houston |
| 8,838,681 B2 | 9/2014 | Motes |
| 8,842,152 B2 | 9/2014 | Couse |
| 8,842,153 B2 | 9/2014 | Ranganath |
| 8,843,816 B2 | 9/2014 | Stull |
| 8,849,914 B2 | 9/2014 | Bove |
| 8,856,256 B1 | 10/2014 | Srinivasan |
| 8,866,619 B2 | 10/2014 | Knibbe |
| 8,872,432 B2 | 10/2014 | Kercso |
| 8,875,195 B2 | 10/2014 | Ogle |
| 8,878,439 B2 | 11/2014 | Noguchi |
| 8,878,891 B2 | 11/2014 | Kenoyer et al. |
| 8,887,069 B2 | 11/2014 | Tipirneni |
| 8,896,656 B2 | 11/2014 | Epstein et al. |
| 8,898,231 B2 | 11/2014 | Crawford |
| 8,902,184 B2 | 12/2014 | Rydenhag et al. |
| 8,904,293 B2 | 12/2014 | Bastide |
| 8,909,702 B2 | 12/2014 | Golovchinsky |
| 8,947,488 B2 | 2/2015 | Han et al. |
| 8,965,975 B2 | 2/2015 | Salesky et al. |
| D726,161 S | 4/2015 | Howard et al. |
| 9,019,868 B2 | 4/2015 | Gorti et al. |
| D729,773 S | 5/2015 | Salojarvi et al. |
| 9,070,229 B2 | 6/2015 | Williamson et al. |
| 9,083,769 B2 | 7/2015 | Beel et al. |
| 9,094,526 B2 | 7/2015 | Krutsch et al. |
| D736,166 S | 8/2015 | Kuh et al. |
| 9,098,502 B1 | 8/2015 | Horling |
| 9,104,302 B2 | 8/2015 | Chai et al. |
| 9,116,656 B2 | 8/2015 | Hutchinson et al. |
| 9,161,166 B2 | 10/2015 | Johansson et al. |
| 9,207,833 B2 | 12/2015 | Doray et al. |
| D747,229 S | 1/2016 | Perez |
| D748,078 S | 1/2016 | Nardin et al. |
| 9,247,204 B1 | 1/2016 | Yin et al. |
| 9,253,270 B2 | 2/2016 | Bharshankar et al. |
| 9,254,035 B2 | 2/2016 | Epstein et al. |
| 9,261,262 B1 | 2/2016 | Baloga |
| 9,270,784 B2 | 2/2016 | Ridges et al. |
| 9,294,724 B2 | 3/2016 | Grimshaw |
| 9,317,181 B2 | 4/2016 | Sizelove et al. |
| 9,339,106 B2 | 5/2016 | Epstein et al. |
| 9,351,077 B1 | 5/2016 | Ford |
| 9,380,682 B2 | 6/2016 | Mead |
| 9,420,880 B2 | 8/2016 | Epstein et al. |
| 9,426,422 B2 | 8/2016 | Gandhi |
| 9,430,181 B2 | 8/2016 | Dunn et al. |

(56) References Cited

U.S. PATENT DOCUMENTS

| | | |
|---|---|---|
| 9,448,759 B2 | 9/2016 | Dunn et al. |
| D768,631 S | 10/2016 | Epstein et al. |
| 9,456,686 B2 | 10/2016 | Epstein et al. |
| 9,456,687 B2 | 10/2016 | Epstein et al. |
| 9,462,882 B2 | 10/2016 | Epstein et al. |
| 9,462,883 B2 | 10/2016 | Epstein et al. |
| 9,465,524 B2 | 10/2016 | Epstein |
| 9,465,573 B2 | 10/2016 | Dunn et al. |
| 9,471,269 B2 | 10/2016 | Dunn et al. |
| 9,492,008 B2 | 11/2016 | Epstein et al. |
| 9,510,672 B2 | 12/2016 | Epstein et al. |
| 9,516,269 B2 | 12/2016 | Zhou et al. |
| 9,549,023 B2 | 1/2017 | Ridges et al. |
| 9,571,866 B2 | 2/2017 | Todd |
| 9,596,433 B2 | 3/2017 | Decker |
| 9,621,603 B2 | 4/2017 | Vadla Ravnas |
| 9,641,576 B2 | 5/2017 | LaFata et al. |
| 9,642,219 B2 | 5/2017 | Mead |
| 9,699,408 B1 | 7/2017 | Epstein et al. |
| 9,710,214 B2 | 7/2017 | Lin et al. |
| 9,716,861 B1 | 7/2017 | Poel |
| 9,722,986 B2 | 8/2017 | Brands et al. |
| 9,723,263 B2 | 8/2017 | Lee |
| 9,727,207 B2 | 8/2017 | Dunn et al. |
| 9,736,427 B1 | 8/2017 | Grimshaw |
| 9,759,420 B1 | 9/2017 | Baloga |
| 9,766,079 B1 | 9/2017 | Poel |
| 9,804,731 B1 | 10/2017 | Baloga |
| 9,852,388 B1 | 12/2017 | Swieter |
| 9,858,033 B2 | 1/2018 | Dunn et al. |
| 9,866,794 B2 | 1/2018 | Dunn et al. |
| 9,870,195 B2 | 1/2018 | Dunn et al. |
| 9,871,978 B1 | 1/2018 | Epstein et al. |
| 9,883,740 B2 | 2/2018 | Epstein et al. |
| 9,904,462 B2 | 2/2018 | Dunn et al. |
| 9,921,726 B1 | 3/2018 | Sculley |
| 9,955,318 B1 | 4/2018 | Scheper |
| 10,021,530 B2 | 7/2018 | Sigal |
| 10,051,236 B2 | 8/2018 | Dunn et al. |
| 10,057,963 B2 | 8/2018 | Mead |
| 2001/0005201 A1 | 6/2001 | Digiorgio et al. |
| 2001/0051885 A1 | 12/2001 | Nardulli |
| 2002/0011197 A1 | 1/2002 | Akyuz |
| 2002/0015097 A1 | 2/2002 | Martens |
| 2002/0037668 A1 | 3/2002 | Tseng et al. |
| 2002/0067318 A1 | 6/2002 | Matsuzaki et al. |
| 2002/0083137 A1 | 6/2002 | Rogers et al. |
| 2002/0130834 A1 | 9/2002 | Madarasz |
| 2002/0132216 A1 | 9/2002 | Dohrmann |
| 2002/0140675 A1 | 10/2002 | Ali et al. |
| 2002/0149566 A1 | 10/2002 | Sarkissian |
| 2002/0186236 A1 | 12/2002 | Brown |
| 2002/0194792 A1 | 12/2002 | Feldpausch et al. |
| 2003/0011467 A1 | 1/2003 | Suomela |
| 2003/0054800 A1 | 3/2003 | Miyashita |
| 2003/0058227 A1 | 3/2003 | Nara et al. |
| 2003/0085923 A1 | 5/2003 | Chen et al. |
| 2003/0088570 A1 | 5/2003 | Hilbert et al. |
| 2003/0097284 A1 | 5/2003 | Shinozaki |
| 2003/0098819 A1 | 5/2003 | Sukthankar et al. |
| 2003/0103075 A1 | 6/2003 | Rosselot |
| 2003/0110925 A1 | 6/2003 | Sitrick et al. |
| 2003/0122863 A1 | 7/2003 | Dieberger et al. |
| 2003/0197659 A1 | 10/2003 | Arai |
| 2003/0218537 A1 | 11/2003 | Hoch |
| 2003/0227441 A1 | 12/2003 | Hioki et al. |
| 2004/0001095 A1 | 1/2004 | Marques |
| 2004/0002049 A1 | 1/2004 | Beavers et al. |
| 2004/0024819 A1 | 2/2004 | Sasaki et al. |
| 2004/0051813 A1 | 3/2004 | Marmaropoulos |
| 2004/0125044 A1 | 7/2004 | Suzuki |
| 2004/0135160 A1 | 7/2004 | Cok |
| 2004/0141605 A1 | 7/2004 | Chen |
| 2004/0150752 A1 | 8/2004 | Iwase |
| 2004/0153504 A1 | 8/2004 | Hutchinson |
| 2004/0201628 A1 | 10/2004 | Johanson et al. |
| 2004/0210933 A1 | 10/2004 | Dresti |
| 2004/0215694 A1 | 10/2004 | Podolsky |
| 2004/0227692 A1 | 11/2004 | Yoon |
| 2004/0236825 A1 | 11/2004 | Doi |
| 2004/0252074 A1 | 12/2004 | Schaper |
| 2004/0252185 A1 | 12/2004 | Vernon et al. |
| 2004/0261013 A1 | 12/2004 | Wynn |
| 2005/0018826 A1 | 1/2005 | Benco |
| 2005/0027581 A1 | 2/2005 | Kjesbu |
| 2005/0030255 A1 | 2/2005 | Chiu et al. |
| 2005/0036509 A1* | 2/2005 | Acharya ............ H04L 63/0428 370/466 |
| 2005/0071213 A1 | 3/2005 | Kumhyr |
| 2005/0091359 A1 | 4/2005 | Soin et al. |
| 2005/0091571 A1 | 4/2005 | Leichtling |
| 2005/0091610 A1 | 4/2005 | Frei et al. |
| 2005/0126446 A1 | 6/2005 | Nobles et al. |
| 2005/0132299 A1 | 6/2005 | Jones et al. |
| 2005/0160368 A1 | 7/2005 | Liu |
| 2005/0188314 A1 | 8/2005 | Matthews et al. |
| 2005/0193060 A1 | 9/2005 | Barton |
| 2005/0195221 A1 | 9/2005 | Berger et al. |
| 2005/0198141 A1 | 9/2005 | Zhu et al. |
| 2005/0218739 A1 | 10/2005 | Maddin |
| 2005/0219223 A1 | 10/2005 | Kotzin et al. |
| 2005/0235215 A1 | 10/2005 | Dunn et al. |
| 2005/0235329 A1 | 10/2005 | Karaoguz |
| 2005/0273372 A1 | 12/2005 | Bowne |
| 2005/0273493 A1 | 12/2005 | Buford |
| 2006/0000955 A1 | 1/2006 | Cvek |
| 2006/0003825 A1 | 1/2006 | Iwasaki et al. |
| 2006/0009215 A1 | 1/2006 | Bogod |
| 2006/0010392 A1 | 1/2006 | Noel et al. |
| 2006/0015376 A1 | 1/2006 | Sattler |
| 2006/0017805 A1 | 1/2006 | Rodman |
| 2006/0026162 A1 | 2/2006 | Salmonsen et al. |
| 2006/0026502 A1 | 2/2006 | Dutta |
| 2006/0044148 A1 | 3/2006 | Daniels et al. |
| 2006/0045107 A1 | 3/2006 | Kucenas |
| 2006/0048058 A1 | 3/2006 | O'Neal et al. |
| 2006/0053196 A1 | 3/2006 | Spataro et al. |
| 2006/0080432 A1 | 4/2006 | Spataro |
| 2006/0168618 A1 | 7/2006 | Choi |
| 2006/0218027 A1 | 9/2006 | Carrion |
| 2006/0238494 A1 | 10/2006 | Narayanaswami et al. |
| 2006/0244817 A1 | 11/2006 | Harville et al. |
| 2006/0267726 A1 | 11/2006 | Arai et al. |
| 2007/0002130 A1 | 1/2007 | Hartkop |
| 2007/0040900 A1 | 2/2007 | Castles |
| 2007/0044028 A1 | 2/2007 | Dunn et al. |
| 2007/0054735 A1 | 3/2007 | Palermo |
| 2007/0065096 A1 | 3/2007 | Ando et al. |
| 2007/0069975 A1 | 3/2007 | Gettemy et al. |
| 2007/0080818 A1 | 4/2007 | Yun et al. |
| 2007/0094065 A1 | 4/2007 | Wu |
| 2007/0106950 A1 | 5/2007 | Hutchinson et al. |
| 2007/0118415 A1 | 5/2007 | Chen |
| 2007/0123354 A1 | 5/2007 | Okada |
| 2007/0136095 A1 | 6/2007 | Weinstein |
| 2007/0150842 A1 | 6/2007 | Chaudhri et al. |
| 2007/0157089 A1 | 7/2007 | Van Os et al. |
| 2007/0162315 A1 | 7/2007 | Hodges |
| 2007/0165193 A1 | 7/2007 | Kubo et al. |
| 2007/0197239 A1 | 8/2007 | Sane |
| 2007/0198744 A1 | 8/2007 | Wensley |
| 2007/0214423 A1 | 9/2007 | Teplov et al. |
| 2007/0220794 A1 | 9/2007 | Pitcher et al. |
| 2007/0226034 A1 | 9/2007 | Khan |
| 2007/0242129 A1 | 10/2007 | Ferren et al. |
| 2007/0266266 A1 | 11/2007 | Dubinsky |
| 2007/0282661 A1 | 12/2007 | Franco |
| 2007/0288291 A1 | 12/2007 | Earle |
| 2008/0028323 A1 | 1/2008 | Rosen |
| 2008/0052426 A1 | 2/2008 | Montag |
| 2008/0068566 A1 | 3/2008 | Denoue et al. |
| 2008/0074343 A1 | 3/2008 | Sasser et al. |
| 2008/0091503 A1 | 4/2008 | Schirmer |
| 2008/0122635 A1 | 5/2008 | Fujikawa |

(56) References Cited

U.S. PATENT DOCUMENTS

| | | |
|---|---|---|
| 2008/0148152 A1 | 6/2008 | Blinnikka et al. |
| 2008/0158171 A1 | 7/2008 | Wong et al. |
| 2008/0162198 A1 | 7/2008 | Jabbour |
| 2008/0172695 A1 | 7/2008 | Migos et al. |
| 2008/0184115 A1 | 7/2008 | Back |
| 2008/0194942 A1 | 8/2008 | Cumpson et al. |
| 2008/0201664 A1 | 8/2008 | O |
| 2008/0239994 A1 | 10/2008 | Xiong |
| 2008/0244417 A1 | 10/2008 | Simpson |
| 2008/0244641 A1 | 10/2008 | Ho et al. |
| 2008/0266380 A1 | 10/2008 | Gorzynski et al. |
| 2008/0288355 A1 | 11/2008 | Rosen |
| 2008/0291021 A1 | 11/2008 | Bhogal |
| 2008/0291225 A1 | 11/2008 | Arneson |
| 2008/0300660 A1 | 12/2008 | John |
| 2008/0307324 A1 | 12/2008 | Westen et al. |
| 2009/0019367 A1 | 1/2009 | Cavagnari |
| 2009/0037821 A1 | 2/2009 | O'Neal et al. |
| 2009/0044116 A1 | 2/2009 | Kitabayashi |
| 2009/0055234 A1 | 2/2009 | Li |
| 2009/0055760 A1 | 2/2009 | Whatcott et al. |
| 2009/0063542 A1 | 3/2009 | Bull et al. |
| 2009/0066486 A1 | 3/2009 | Kiekbusch |
| 2009/0076920 A1 | 3/2009 | Feldman et al. |
| 2009/0094533 A1 | 4/2009 | Bozionek |
| 2009/0096965 A1 | 4/2009 | Nagata |
| 2009/0106567 A1 | 4/2009 | Baarman |
| 2009/0121905 A1 | 5/2009 | Griffin, Jr. et al. |
| 2009/0124062 A1 | 5/2009 | Yamazaki et al. |
| 2009/0132925 A1 | 5/2009 | Koehler et al. |
| 2009/0146982 A1 | 6/2009 | Thielman |
| 2009/0149249 A1 | 6/2009 | Sum |
| 2009/0153434 A1 | 6/2009 | Cheng et al. |
| 2009/0164581 A1 | 6/2009 | Bove |
| 2009/0184924 A1 | 7/2009 | Uchida |
| 2009/0210822 A1 | 8/2009 | Schindler |
| 2009/0212637 A1 | 8/2009 | Baarman |
| 2009/0219247 A1 | 9/2009 | Watanabe et al. |
| 2009/0254843 A1 | 10/2009 | Van Wie et al. |
| 2009/0271713 A1 | 10/2009 | Stull |
| 2009/0285131 A1 | 11/2009 | Knaz |
| 2009/0327227 A1 | 12/2009 | Chakra |
| 2009/0327893 A1 | 12/2009 | Terry et al. |
| 2010/0017245 A1 | 1/2010 | Kristiansen |
| 2010/0020026 A1 | 1/2010 | Benko et al. |
| 2010/0023895 A1 | 1/2010 | Benko et al. |
| 2010/0037151 A1 | 2/2010 | Ackerman |
| 2010/0053173 A1 | 3/2010 | Cohen et al. |
| 2010/0070334 A1 | 3/2010 | Monteverde |
| 2010/0073454 A1 | 3/2010 | Lovhaugen et al. |
| 2010/0088239 A1 | 4/2010 | Blair |
| 2010/0102640 A1 | 4/2010 | Joannopoulos |
| 2010/0127575 A1 | 5/2010 | Joannopoulos |
| 2010/0133918 A1 | 6/2010 | Joannopoulos |
| 2010/0133919 A1 | 6/2010 | Joannopoulos |
| 2010/0133920 A1 | 6/2010 | Joannopoulos |
| 2010/0148647 A1 | 6/2010 | Burgess et al. |
| 2010/0153160 A1 | 6/2010 | Bezemer |
| 2010/0153983 A1 | 6/2010 | Philmon |
| 2010/0169791 A1 | 7/2010 | Pering et al. |
| 2010/0179854 A1 | 7/2010 | Shafer |
| 2010/0182518 A1 | 7/2010 | Kirmse et al. |
| 2010/0187911 A1 | 7/2010 | Joannopoulos |
| 2010/0192072 A1 | 7/2010 | Spataro et al. |
| 2010/0207458 A1 | 8/2010 | Joannopoulos |
| 2010/0219694 A1 | 9/2010 | Kurs |
| 2010/0219791 A1 | 9/2010 | Cheng |
| 2010/0231340 A1 | 9/2010 | Fiorello |
| 2010/0235216 A1 | 9/2010 | Hehmeyer |
| 2010/0256823 A1 | 10/2010 | Cherukuri |
| 2010/0259110 A1 | 10/2010 | Kurs |
| 2010/0274855 A1 | 10/2010 | Wassingbo |
| 2010/0277121 A1 | 11/2010 | Hall |
| 2010/0283600 A1 | 11/2010 | Herbert |
| 2010/0293598 A1 | 11/2010 | Collart et al. |
| 2010/0302130 A1 | 12/2010 | Kikuchi et al. |
| 2010/0308939 A1 | 12/2010 | Kurs |
| 2010/0312366 A1 | 12/2010 | Madonna et al. |
| 2010/0312832 A1 | 12/2010 | Allen et al. |
| 2010/0315483 A1 | 12/2010 | King |
| 2010/0318921 A1 | 12/2010 | Trachtenberg et al. |
| 2010/0319066 A1 | 12/2010 | Berry |
| 2011/0025819 A1 | 2/2011 | Gorzynski et al. |
| 2011/0043049 A1 | 2/2011 | Karalis |
| 2011/0043479 A1 | 2/2011 | van Aerle et al. |
| 2011/0047459 A1 | 2/2011 | Van Der Westhuizen |
| 2011/0050975 A1 | 3/2011 | Chung |
| 2011/0072482 A1 | 3/2011 | Lau |
| 2011/0074346 A1 | 3/2011 | Hall |
| 2011/0084804 A1 | 4/2011 | Khorashadi |
| 2011/0088056 A1 | 4/2011 | Ansari |
| 2011/0095618 A1 | 4/2011 | Schatz |
| 2011/0095974 A1 | 4/2011 | Moriwaki |
| 2011/0096138 A1* | 4/2011 | Grimshaw ............ H04M 3/567 348/14.08 |
| 2011/0102539 A1 | 5/2011 | Ferren |
| 2011/0121920 A1 | 5/2011 | Kurs |
| 2011/0126127 A1 | 5/2011 | Mariotti |
| 2011/0149809 A1 | 6/2011 | Narayanaswamy |
| 2011/0153738 A1 | 6/2011 | Bedingfield |
| 2011/0154213 A1 | 6/2011 | Wheatley et al. |
| 2011/0175830 A1 | 7/2011 | Miyazawa et al. |
| 2011/0181603 A1 | 7/2011 | Liang et al. |
| 2011/0183722 A1 | 7/2011 | Vartanian |
| 2011/0223899 A1 | 9/2011 | Hiraide |
| 2011/0225563 A1 | 9/2011 | Kim |
| 2011/0231216 A1 | 9/2011 | Fyke |
| 2011/0244798 A1 | 10/2011 | Daigle |
| 2011/0270952 A1 | 11/2011 | Ray |
| 2011/0279350 A1 | 11/2011 | Hutchinson et al. |
| 2011/0295392 A1 | 12/2011 | Cunnington |
| 2011/0296465 A1 | 12/2011 | Krishnan |
| 2011/0298689 A1 | 12/2011 | Bhomer et al. |
| 2011/0310034 A1 | 12/2011 | Ouchi et al. |
| 2012/0004030 A1 | 1/2012 | Kelly et al. |
| 2012/0007441 A1 | 1/2012 | John |
| 2012/0013539 A1 | 1/2012 | Hogan et al. |
| 2012/0016678 A1 | 1/2012 | Gruber |
| 2012/0022909 A1 | 1/2012 | Ayatollahi |
| 2012/0030567 A1 | 2/2012 | Victor |
| 2012/0032522 A1 | 2/2012 | Schatz |
| 2012/0050075 A1 | 3/2012 | Salmon |
| 2012/0062345 A1 | 3/2012 | Kurs |
| 2012/0066602 A1 | 3/2012 | Chai et al. |
| 2012/0068549 A1 | 3/2012 | Karalis |
| 2012/0068832 A1 | 3/2012 | Feldstein |
| 2012/0072030 A1 | 3/2012 | Elliott |
| 2012/0078676 A1 | 3/2012 | Adams |
| 2012/0081277 A1 | 4/2012 | de Paz |
| 2012/0086284 A1 | 4/2012 | Capanella |
| 2012/0086867 A1 | 4/2012 | Kesler |
| 2012/0089722 A1 | 4/2012 | Enholm |
| 2012/0091794 A1 | 4/2012 | Campanella |
| 2012/0091795 A1 | 4/2012 | Fiorello |
| 2012/0091796 A1 | 4/2012 | Kesler |
| 2012/0091797 A1 | 4/2012 | Kesler |
| 2012/0091819 A1 | 4/2012 | Kulikowski |
| 2012/0091820 A1 | 4/2012 | Campanella |
| 2012/0091949 A1 | 4/2012 | Campanella |
| 2012/0091950 A1 | 4/2012 | Campanella |
| 2012/0098350 A1 | 4/2012 | Campanella |
| 2012/0102111 A1 | 4/2012 | Salesky et al. |
| 2012/0110196 A1 | 5/2012 | Balasaygun et al. |
| 2012/0110509 A1 | 5/2012 | Isozu et al. |
| 2012/0112531 A1 | 5/2012 | Kesler |
| 2012/0112532 A1 | 5/2012 | Kesler |
| 2012/0112534 A1 | 5/2012 | Kesler |
| 2012/0112535 A1 | 5/2012 | Karalis |
| 2012/0112536 A1 | 5/2012 | Karalis |
| 2012/0112538 A1 | 5/2012 | Kesler |
| 2012/0112691 A1 | 5/2012 | Kurs |
| 2012/0119569 A1 | 5/2012 | Karalis |
| 2012/0119575 A1 | 5/2012 | Kurs |
| 2012/0119576 A1 | 5/2012 | Kesler |

(56) References Cited

U.S. PATENT DOCUMENTS

| | | |
|---|---|---|
| 2012/0119698 A1 | 5/2012 | Karalis |
| 2012/0136572 A1 | 5/2012 | Norton |
| 2012/0139355 A1 | 6/2012 | Ganem |
| 2012/0162351 A1 | 6/2012 | Feldman et al. |
| 2012/0176465 A1 | 7/2012 | Triplett et al. |
| 2012/0184338 A1 | 7/2012 | Kesler |
| 2012/0192084 A1 | 7/2012 | Dura |
| 2012/0204272 A1 | 8/2012 | Svensson |
| 2012/0206050 A1 | 8/2012 | Spero |
| 2012/0206096 A1 | 8/2012 | John |
| 2012/0209935 A1 | 8/2012 | Harter et al. |
| 2012/0216129 A1 | 8/2012 | Ng |
| 2012/0223573 A1 | 9/2012 | Schatz |
| 2012/0228952 A1 | 9/2012 | Hall |
| 2012/0228953 A1 | 9/2012 | Kesler |
| 2012/0228954 A1 | 9/2012 | Kesler |
| 2012/0228960 A1 | 9/2012 | Karalis |
| 2012/0233205 A1 | 9/2012 | McDermott |
| 2012/0235500 A1 | 9/2012 | Ganem |
| 2012/0235501 A1 | 9/2012 | Kesler |
| 2012/0235502 A1 | 9/2012 | Kesler |
| 2012/0235503 A1 | 9/2012 | Kesler |
| 2012/0235504 A1 | 9/2012 | Kesler |
| 2012/0235505 A1 | 9/2012 | Schatz |
| 2012/0235566 A1 | 9/2012 | Karalis |
| 2012/0235633 A1 | 9/2012 | Kesler |
| 2012/0235634 A1 | 9/2012 | Hall |
| 2012/0239117 A1 | 9/2012 | Kesler |
| 2012/0239202 A1 | 9/2012 | Voysey |
| 2012/0242159 A1 | 9/2012 | Lou |
| 2012/0243158 A1 | 9/2012 | Gentil |
| 2012/0248886 A1 | 10/2012 | Kesler |
| 2012/0248887 A1 | 10/2012 | Kesler |
| 2012/0248888 A1 | 10/2012 | Kesler |
| 2012/0248981 A1 | 10/2012 | Karalis |
| 2012/0254909 A1 | 10/2012 | Serdiuk |
| 2012/0256494 A1 | 10/2012 | Kesler |
| 2012/0274586 A1 | 11/2012 | Southworth |
| 2012/0284672 A1 | 11/2012 | Madonna |
| 2012/0313449 A1 | 12/2012 | Kurs |
| 2012/0313742 A1 | 12/2012 | Kurs |
| 2012/0324047 A1 | 12/2012 | Diner et al. |
| 2012/0324589 A1 | 12/2012 | Nukala |
| 2012/0331108 A1 | 12/2012 | Ferdowsi |
| 2012/0331394 A1 | 12/2012 | Trombley-Shapiro |
| 2013/0007949 A1 | 1/2013 | Kurs |
| 2013/0013750 A1 | 1/2013 | Butler |
| 2013/0018952 A1 | 1/2013 | McConnell |
| 2013/0018953 A1 | 1/2013 | McConnell |
| 2013/0019195 A1 | 1/2013 | Gates |
| 2013/0020878 A1 | 1/2013 | Karalis |
| 2013/0024821 A1 | 1/2013 | Lee |
| 2013/0033118 A1 | 2/2013 | Karalis |
| 2013/0038402 A1 | 2/2013 | Karalis |
| 2013/0041973 A1 | 2/2013 | Zhou |
| 2013/0054863 A1 | 2/2013 | Imes |
| 2013/0057364 A1 | 3/2013 | Kesler |
| 2013/0062966 A1 | 3/2013 | Verghese |
| 2013/0069441 A1 | 3/2013 | Verghese |
| 2013/0069543 A1 | 3/2013 | Mohan |
| 2013/0069753 A1 | 3/2013 | Kurs |
| 2013/0073094 A1 | 3/2013 | Knapton |
| 2013/0081089 A1 | 3/2013 | Kim et al. |
| 2013/0088154 A1 | 4/2013 | Van Hoof |
| 2013/0091205 A1 | 4/2013 | Kotler et al. |
| 2013/0091440 A1 | 4/2013 | Kotler et al. |
| 2013/0099587 A1 | 4/2013 | Lou |
| 2013/0103446 A1 | 4/2013 | Bragdon et al. |
| 2013/0157509 A1 | 6/2013 | Srivastava |
| 2013/0159917 A1 | 6/2013 | Loebach |
| 2013/0167039 A1 | 6/2013 | Howell |
| 2013/0169687 A1 | 7/2013 | Williamson et al. |
| 2013/0171981 A1 | 7/2013 | Woo |
| 2013/0175874 A1 | 7/2013 | Lou |
| 2013/0181541 A1 | 7/2013 | Karalis |
| 2013/0185665 A1 | 7/2013 | Furukawa et al. |
| 2013/0185666 A1 | 7/2013 | Kenna, III et al. |
| 2013/0194238 A1 | 8/2013 | Sakai |
| 2013/0198653 A1 | 8/2013 | Tse |
| 2013/0199420 A1 | 8/2013 | Hjelm |
| 2013/0200721 A1 | 8/2013 | Kurs |
| 2013/0208186 A1 | 8/2013 | Malone |
| 2013/0218829 A1 | 8/2013 | Martinez |
| 2013/0221744 A1 | 8/2013 | Hall |
| 2013/0222266 A1 | 8/2013 | Gardenfors et al. |
| 2013/0226444 A1 | 8/2013 | Johansson et al. |
| 2013/0227433 A1 | 8/2013 | Doray et al. |
| 2013/0227478 A1 | 8/2013 | Rydenhag et al. |
| 2013/0232440 A1 | 9/2013 | Brown |
| 2013/0234481 A1 | 9/2013 | Johnson |
| 2013/0234531 A1 | 9/2013 | Budgett |
| 2013/0241439 A1 | 9/2013 | Nishigaki |
| 2013/0246529 A1 | 9/2013 | Salesky et al. |
| 2013/0246901 A1 | 9/2013 | Massano |
| 2013/0249410 A1 | 9/2013 | Thompson |
| 2013/0249815 A1 | 9/2013 | Dolan et al. |
| 2013/0262687 A1 | 10/2013 | Avery |
| 2013/0275883 A1 | 10/2013 | Bharshankar et al. |
| 2013/0278073 A1 | 10/2013 | Kurs |
| 2013/0278074 A1 | 10/2013 | Kurs |
| 2013/0278075 A1 | 10/2013 | Kurs |
| 2013/0283325 A1 | 10/2013 | Chiniara |
| 2013/0300353 A1 | 11/2013 | Kurs |
| 2013/0304924 A1 | 11/2013 | Dhara |
| 2013/0307349 A1 | 11/2013 | Hall |
| 2013/0314543 A1 | 11/2013 | Sutter |
| 2013/0320773 A1 | 12/2013 | Schatz |
| 2013/0321340 A1 | 12/2013 | Seo et al. |
| 2013/0334892 A1 | 12/2013 | Hall |
| 2013/0334973 A1 | 12/2013 | Wagenaar Cacciola |
| 2013/0339861 A1 | 12/2013 | Hutchinson et al. |
| 2013/0339880 A1 | 12/2013 | Hutchinson et al. |
| 2013/0339888 A1 | 12/2013 | Hutchinson et al. |
| 2014/0002012 A1 | 1/2014 | McCauley |
| 2014/0006976 A1 | 1/2014 | Hutchinson et al. |
| 2014/0021798 A1 | 1/2014 | Kesler |
| 2014/0028112 A1 | 1/2014 | Hui |
| 2014/0035378 A1 | 2/2014 | Kesler |
| 2014/0035704 A1 | 2/2014 | Efe |
| 2014/0040781 A1 | 2/2014 | Epstein |
| 2014/0044281 A1 | 2/2014 | Ganem |
| 2014/0044293 A1 | 2/2014 | Ganem |
| 2014/0049118 A1 | 2/2014 | Karalis |
| 2014/0051054 A1 | 2/2014 | Wong et al. |
| 2014/0052974 A1 | 2/2014 | Masters |
| 2014/0054961 A1 | 2/2014 | Metcalf |
| 2014/0062211 A1 | 3/2014 | Hamam |
| 2014/0067865 A1 | 3/2014 | Kirigin |
| 2014/0068483 A1 | 3/2014 | Platzer et al. |
| 2014/0074930 A1 | 3/2014 | Kumashio |
| 2014/0084703 A1 | 3/2014 | Hall |
| 2014/0084859 A1 | 3/2014 | Hall |
| 2014/0091636 A1 | 4/2014 | Ofstein |
| 2014/0091756 A1 | 4/2014 | Ofstein |
| 2014/0101577 A1* | 4/2014 | Kwak ................... G06F 1/1618 715/761 |
| 2014/0103738 A1 | 4/2014 | Campanella |
| 2014/0108956 A1 | 4/2014 | Varenhorst |
| 2014/0109210 A1 | 4/2014 | Borzycki |
| 2014/0111304 A1 | 4/2014 | Hashim-Waris |
| 2014/0135648 A1 | 5/2014 | Holoien |
| 2014/0139426 A1 | 5/2014 | Kryze |
| 2014/0150059 A1 | 5/2014 | Uchida |
| 2014/0159589 A1 | 6/2014 | Pandharipande |
| 2014/0159652 A1 | 6/2014 | Hall |
| 2014/0167618 A1 | 6/2014 | Wang |
| 2014/0175898 A1 | 6/2014 | Kurs |
| 2014/0181704 A1 | 6/2014 | Madonna |
| 2014/0181935 A1 | 6/2014 | Beckmann |
| 2014/0195149 A1 | 7/2014 | Yang |
| 2014/0195291 A1 | 7/2014 | Aaron |
| 2014/0195805 A1 | 7/2014 | Koo |
| 2014/0203659 A1 | 7/2014 | Madawala |
| 2014/0203921 A1 | 7/2014 | Baker |

(56) References Cited

U.S. PATENT DOCUMENTS

| | | |
|---|---|---|
| 2014/0215551 A1 | 7/2014 | Allain |
| 2014/0223334 A1 | 8/2014 | Jensen et al. |
| 2014/0223335 A1 | 8/2014 | Pearson |
| 2014/0229578 A1 | 8/2014 | Chu |
| 2014/0236659 A1 | 8/2014 | Hapse |
| 2014/0240445 A1* | 8/2014 | Jaynes ............... G06F 3/1454 348/14.07 |
| 2014/0244043 A1 | 8/2014 | Foster |
| 2014/0253813 A1 | 9/2014 | Bakar |
| 2014/0259047 A1 | 9/2014 | Bakar |
| 2014/0267554 A1 | 9/2014 | Yu et al. |
| 2014/0269531 A1 | 9/2014 | Luna |
| 2014/0274005 A1 | 9/2014 | Luna |
| 2014/0277757 A1 | 9/2014 | Wang |
| 2014/0277763 A1 | 9/2014 | Ramachandran |
| 2014/0278057 A1 | 9/2014 | Berns |
| 2014/0282013 A1 | 9/2014 | Amijee |
| 2014/0285113 A1 | 9/2014 | Huang |
| 2014/0297758 A1 | 10/2014 | Kidron |
| 2014/0300277 A1 | 10/2014 | Ono |
| 2014/0302795 A1 | 10/2014 | Chacon |
| 2014/0354429 A1 | 12/2014 | Henderson |
| 2014/0359435 A1 | 12/2014 | Zheng et al. |
| 2015/0022342 A1 | 1/2015 | Will et al. |
| 2015/0035440 A1 | 2/2015 | Spero |
| 2015/0042885 A1* | 2/2015 | Epstein ............... H04N 5/268 348/705 |
| 2015/0069915 A1 | 3/2015 | Ogawa |
| 2015/0087236 A1 | 3/2015 | Eun et al. |
| 2015/0144034 A1 | 5/2015 | Epstein et al. |
| 2015/0179012 A1 | 6/2015 | Sharpe |
| 2015/0201480 A1 | 7/2015 | Ogawa |
| 2015/0227166 A1 | 8/2015 | Lee et al. |
| 2015/0229644 A1 | 8/2015 | Nozawa |
| 2015/0296061 A1 | 10/2015 | Geiger et al. |
| 2015/0296594 A1 | 10/2015 | Blum |
| 2015/0330780 A1 | 11/2015 | Yuzawa |
| 2015/0356943 A1 | 12/2015 | Dunn et al. |
| 2015/0370272 A1 | 12/2015 | Reddy |
| 2016/0028993 A1 | 1/2016 | Epstein et al. |
| 2016/0162250 A1 | 6/2016 | Dunn et al. |
| 2016/0171566 A1 | 6/2016 | Pugh |
| 2016/0327922 A1 | 11/2016 | Sekiguchi |
| 2016/0342950 A1 | 11/2016 | Pignataro |
| 2017/0208664 A1 | 7/2017 | Mead |

FOREIGN PATENT DOCUMENTS

| | | |
|---|---|---|
| AU | 2013203919 A1 | 5/2013 |
| AU | 2013203947 A1 | 5/2013 |
| CA | 2806804 A1 | 8/2013 |
| CN | 102239633 A | 11/2011 |
| CN | 102439669 A | 5/2012 |
| CN | 202602701 U | 12/2012 |
| CN | 102870338 A | 1/2013 |
| CN | 202773002 U | 3/2013 |
| DE | 3100660 A1 | 7/1982 |
| DE | 8533571 U1 | 1/1986 |
| DE | 19652108 A1 | 6/1998 |
| DE | 29910262 U1 | 8/1999 |
| EP | 0223091 A2 | 5/1987 |
| EP | 0230236 A1 | 7/1987 |
| EP | 0264589 A2 | 4/1988 |
| EP | 0279558 A1 | 8/1998 |
| EP | 0935263 A2 | 8/1999 |
| EP | 0992921 A2 | 4/2000 |
| EP | 0801342 B1 | 1/2003 |
| EP | 1659487 A2 | 5/2006 |
| EP | 1986087 A2 | 10/2008 |
| EP | 1780584 B1 | 7/2009 |
| EP | 2367146 A1 | 9/2011 |
| EP | 2388977 A1 | 11/2011 |
| EP | 2400764 A1 | 12/2011 |
| EP | 2439686 A1 | 4/2012 |
| EP | 2444882 A1 | 4/2012 |
| EP | 2464082 A1 | 6/2012 |
| EP | 2632187 A1 | 8/2013 |
| EP | 2665296 A2 | 11/2013 |
| EP | 2680551 A1 | 1/2014 |
| GB | 2365662 A | 2/2002 |
| JP | 61288655 A | 12/1986 |
| JP | 62179268 A | 8/1987 |
| JP | 11332674 A | 12/1999 |
| JP | 2000236329 A | 8/2000 |
| JP | 2001217977 A | 8/2001 |
| JP | 2002049453 A | 2/2002 |
| JP | 2003031079 A | 1/2003 |
| JP | 2006122645 A | 5/2006 |
| KR | 20140007006 A | 1/2014 |
| WO | 0017737 A1 | 3/2000 |
| WO | 0131397 A1 | 5/2001 |
| WO | 2001031397 A1 | 5/2001 |
| WO | 0212992 A2 | 2/2002 |
| WO | 0243386 A1 | 5/2002 |
| WO | 2004075169 A2 | 9/2004 |
| WO | 2005099263 A1 | 10/2005 |
| WO | 2006048189 A1 | 5/2006 |
| WO | 2006130750 A1 | 12/2006 |
| WO | 2007008646 A2 | 1/2007 |
| WO | 2007143297 A2 | 12/2007 |
| WO | 2008022464 A1 | 2/2008 |
| WO | 2008036931 A3 | 3/2008 |
| WO | 2008043182 A1 | 4/2008 |
| WO | 2008118178 A1 | 10/2008 |
| WO | 2009085896 A1 | 7/2009 |
| WO | 2009108958 A1 | 9/2009 |
| WO | 2009108959 A1 | 9/2009 |
| WO | 2010017039 A2 | 2/2010 |
| WO | 2010033036 A1 | 3/2010 |
| WO | 2010093997 A1 | 8/2010 |
| WO | 2011005318 A2 | 1/2011 |
| WO | 2011034759 A2 | 3/2011 |
| WO | 2011041427 A2 | 4/2011 |
| WO | 2011084245 A2 | 7/2011 |
| WO | 2011099873 A1 | 8/2011 |
| WO | 2011112795 A1 | 9/2011 |
| WO | 2011133590 A1 | 10/2011 |
| WO | 2011149560 A1 | 12/2011 |
| WO | 2012015625 A2 | 2/2012 |
| WO | 2012036389 A3 | 3/2012 |
| WO | 2012037279 A1 | 3/2012 |
| WO | 2012037523 A1 | 3/2012 |
| WO | 2012048007 A2 | 4/2012 |
| WO | 2012100001 A1 | 7/2012 |
| WO | 2012116464 A1 | 9/2012 |
| WO | 2012162411 A1 | 11/2012 |
| WO | 2012170278 A3 | 12/2012 |
| WO | 2013008252 A2 | 1/2013 |
| WO | 2013009092 A1 | 1/2013 |
| WO | 2013021385 A2 | 2/2013 |
| WO | 2013023183 A1 | 2/2013 |
| WO | 2013029162 A1 | 3/2013 |
| WO | 2013059441 A1 | 4/2013 |
| WO | 2013074102 A1 | 5/2013 |
| WO | 2013112185 A2 | 8/2013 |
| WO | 2013122483 A1 | 8/2013 |
| WO | 2013124530 A1 | 8/2013 |
| WO | 2013154827 A1 | 10/2013 |
| WO | 2013154829 A1 | 10/2013 |
| WO | 2013154831 A1 | 10/2013 |
| WO | 2013156092 A1 | 10/2013 |
| WO | 2014007656 A1 | 1/2014 |
| WO | 2014011059 A1 | 1/2014 |
| WO | 2014035260 A1 | 3/2014 |
| WO | 2014035263 A1 | 3/2014 |
| WO | 2014038966 A1 | 3/2014 |
| WO | 2014054953 A1 | 4/2014 |

(56) References Cited

FOREIGN PATENT DOCUMENTS

| | | |
|---|---|---|
| WO | 2014094107 A1 | 6/2014 |
| WO | 2014139781 A2 | 9/2014 |

OTHER PUBLICATIONS

Stone, Office Space: Designing Your Next Office—A Workplace That Will Know Who You Are, Where You Are and What You're Doing, Newsweek, Apr. 19, 2003, 2 pages, http://msnbc.msn.com/id/3068812/.
Microsoft Corporation, Enhanced Microsoft Exhibit Offers Sneak Peek at Office of the Future, Mar. 22, 2004, 6 pages, http://www.microsoft.com/presspass/features/2004/mar04/03-22CIW.asp.
Coursey, Microsoft's Vision of Tomorrow Sparks Wonder, Fear, eWEEK.com, Jul. 12, 2004, 3 pages, http://www.eweek.com/print_article/0,1761,a=131281,00.asp.
Polycom, Polycom RealPresence Experience (RPX) User Guide, Feb. 2007 Edition, Version 1.0, 3 pages.
Elecom, DTS-TS8 (Japanese), 2 pages, undated.
Coeno-Storyboard: An Augmented Surface for Storyboard Presentations, c 2005, Medientechnik und—design, 14 pages.
Brunswick, The Frameworx Line: Center Design and Functionality that Works for Everyone, http://www.brunswickbowling.com/frameworx_line, Jul. 2, 2007, 4 pages.
Polycom, Administrator's Guide for the VSX Series, Feb. 2007 Edition, Version 8.5.3, 3 pages.
European Patent Office, Extended European Search Report, Application No. 08252300.2, dated Oct. 4, 2011.
European Patent Office, Communication, Application No. 08252300. 2, dated May 7, 2014.
Beaudouin-Lafon, et al., Multisurface Interaction in the WILD Room, IEEE Computer, IEEE, 2012, Special Issue on Interaction Beyond the Keyboard, 45(4):48-56.
Karma Laboratory, The Petri Dish: Pretty Lights, http://karma-laboratory.com/petridish/2004/11/pretty_lights.html, Nov. 20, 2004, 2 pages.
Takanashi, et al., Human-Computer Interaction Technology Using Image Projection and Gesture-Based Input, NEC Technical Journal, 2013, 7(3):122-126.
Weiss, et al., BendDesk: Dragging Across the Curve, ITS 2010: Displays, Nov. 7-10, 2010, Saarbrucken, Germany, Copyright 2010 ACM, pp. 1-10.
CITRIX, GoToMeeting User Guide, Copyright 2015 Citrix Systems.
join.me forum and FAQ, Apr. 3, 2014.
CISCO, WebEx Meeting Center User Guide for Hosts, Presenters, and Participants, Version 8.23, Copyright 1997-2011 Cisco and/or its affiliates.
Krumm, et al., The NearMe Wireless Proximity Server, UbiComp 2004, The Sixth International Conference on Ubiquitous Computing, pp. 283-300, Sep. 7-10, 2004.
NFS Technology Group, Rendezvous—Technology for Meeting Room, Desk Scheduling and Event Management, http://myrendezvous.net/rendezvous-event-booking-software/calendar-management/.
CITRIX, GoToWebinar User Guide, Copyright 2015 Citrix Systems.
CiviCRM Books: User and Administrator Guide for Version 4.5, Published Sep. 2014, http://book.civicrm.org/user/current/email/scheduled-reminders/.
Lee, TechnicLee—My Thoughts on Technology, Business, and Innovation, Posted in Outlook, Scripting, Jan. 20, 2012, http://techniclee.wordpress.com/2012/01/20/sending-a-meeting-reminder-email-in-outlook/.
Events and Room Reserve Scheduled Task Setup for Email Notifications, Article No. 268, Apr. 22, 2013, http://kb.evanced.info/article.php?id=268.
Oracle Communications, Oracle Data Sheet—Calendar Server, Copyright 2015 Oracle and/or its affiliates, http://www.oracle.com/us/industries/communications/communications-calendar-server-ds-071728.pdf.
Stirworks, Inc., The Height-Adjustable, Standing Stir Kinetic Desk, http://www.stirworks.com/, Copyright 2015 Stirworks, Inc., 6 pages.
New:scape—NBI Workshop Pre-read and Homework, date unknown, 9 pages.
Appliance Studio, The New Knowledge Environment, by Bill Shame, Copyright 2002 by The ApplianceStudio Ltd., 36 pages.
Appliance Studio, Affordances, Mar. 2002, 11 pages.
Steelcase Inc., Executive Pre-Read Real Time Team Room MeetingWizard Project Review, Nov. 25, 2002, 57 pages.
Mikroprojekt, Sparrowhawk FX 6x2 Video Switcher Demo, Development Offer, MPP151201, Rev. 1.1, Dec. 16, 2015, 24 pages.
Collaboration Partner Opportunities, Nov. 2017, 14 pages.
Steelcase, Conference Room Collaboration & Content Amplification, Nov. 2017, Partnership Pipeline, Copyright 2017 KITE Solutions Inc., 14 pages.
Wilkhahn + Hahne GmbH + Co., InterWall. ConsulTable. ConAction range, 12 page brochure, no date.
PCT International Search Report and Written Opinion, Application No. PCT/US2005/011366, dated Aug. 4, 2005.
PCT International Preliminary Report on Patentability, Application No. PCT/US2005/011366, dated Oct. 12, 2006.
PCT International Search Report, Application No. PCT/US2006/021233, dated Oct. 6, 2006.
PCT International Preliminary Report on Patentability, Application No. PCT/US2006/021233, dated Dec. 6, 2007.
PCT International Search Report and Written Opinion, Application No. PCT/US2007/082202, dated Jun. 5, 2008.
PCT International Search Report, Application No. PCT/US2007/012671, dated Jan. 3, 2008.
PCT International Preliminary Report on Patentability, Application No. PCT/US2007/0012671, dated Dec. 3, 2008.

* cited by examiner

CONTENT AMPLIFICATION SYSTEM AND METHOD

CROSS-REFERENCE TO RELATED APPLICATIONS

This application is related to and claims priority from U.S. provisional patent application Ser. No. 62/434,755 which is titled "Content Amplification System And Method" which was filed on Dec. 15, 2016 and which is incorporated herein in its entirety by reference.

STATEMENT REGARDING FEDERALLY SPONSORED RESEARCH OR DEVELOPMENT

Not applicable.

BACKGROUND OF THE INVENTION

In many cases when people work together there is a need to share information during meetings. In the past, when information was available in a printed form, people would make hard copies of documents prior to a meeting and then distributes those copies at the beginning of a meeting or, sometimes, as a meeting progressed. One problem with hard copies was that meeting attendees or a meeting leader had to assess, prior to a meeting, which information would be relevant at the meeting. In many instances, during a meeting one or more attendees would realize that other content, other information, perhaps also in printed form, and not present at the meeting, would have added value or been handy as a reference. Thus, in many cases attendees would end up promising to deliver other information to the larger group at some other temporally disjointed time.

Another problem with printed paper information sharing is that the printed copies have to be obtained by attendees upon arriving for a meeting and then, during a meeting as attendees refer to different sheets of the printed materials, all attendees have to page back and forth within the materials to view referenced information. In addition to increasing overall sloppiness of a meeting space, the machinations associated with multiple attendees paging back and forth through printed materials had a disruptive effect on overall meeting flow.

Yet one other problem with printed paper information sharing is that, often, too few copies of paper documents would be available at a meeting and therefore two or more attendees would be forced to share their copies, again causing shuffling and sloppiness overall.

One other problem with paper based information sharing is that attendees may not be looking at the same materials all the time as some attendees look forward or backward in their copies or as some attendees simply get confused as to which page or information is currently being discussed or referenced.

One solution to address at least some of the shortcomings with paper-based content sharing has been to provide a projector in a conference space where digital content stored on a laptop or other personal portable computing device can be shared one item or image at a time. While more efficient, projector based solutions have their own drawbacks such as, for instance, requiring disruption when a second attendee takes over presenting content from a first attendee and needs to swap a cord linked to the projector from the first attendee's device to the second attendee's device, inability to use the projector system without a personal computing device, etc.

Perhaps the best prior commercially available solution to information and content sharing tasks within a conference space is a MediaScape system (hereinafter an "MS system") designed and made commercially available by Steelcase, Inc., of Grand Rapids Mich., the present applicant. The MS system includes a plurality of flat panel display screens arranged at an end of an elongated table and a power/control assembly mounted in an opening in a system tabletop. The power/control assembly includes a storage compartment within and generally below the tabletop, a switcher device and a plurality of cable assemblies. Each cable assembly includes a cable and a control device that resembles a hockey puck (hereinafter "puck") attached to a central portion of the cable where one end of the cable is linked to the switcher device and the other end of the cable includes a plug to be linked to a portable computing device. Here, in operation, an attendee pulls the plug end on one of the cables from a storage location in the storage compartment and links the plug to her computing device. Once a cable is linked to a personal portable computing device, the puck on the cable lights up with buttons for selecting one or a subset of the display screens for sharing the desktop (e.g., current and dynamic image) from the linked computing device on the selected display screen.

In addition to including the storage compartment and cable assemblies, the control assembly includes power receptacles so that attendees can plug their computing devices in to charge and receive power during a meeting. Thus, to have a data link and also link to power, an attendee has to link both a control cable and a power cable to her computing device.

In current versions of the MS system, control of the system display screens is completely egalitarian so that any linked attendee can take control of any of the system display screens at any time without requiring any permission or action by any other attendee. Thus, with first and second computing devices used by first and second attendees linked to first and second control cables and the first device desktop shared on a first system display screen, the second attendee may select a share button on her control puck to swap the desktop image from the second computing device for the desktop image from the first computing device without any permission from or action by the first attendee.

While the MS system is relatively efficient and is an improved solution for sharing content when compared to prior solutions, the MS system and other similar systems have several shortcomings. For example, having to link two cables to each portable computing device, one for data and one for power, results in a relatively cluttered arrangement, especially when several attendees link to several cable assemblies at the same time.

As another example, whenever a cable linked to a device like a mechanical device that is routinely moved as is the case with the control cable assemblies that include pucks in the MS system, substantial strain is often placed on the cable to device connections and the cables themselves which can result in cable and device damage or malfunction. To avoid cable damage, the MS system control cable assemblies have been designed to be extremely robust, including high gauge cables and beefed up connectors for connection of the cable to the switching device, and the cable to the puck device. While robust cable assemblies work well in most cases, the cable assemblies still become damaged from time to time. In addition, while robust cable assemblies are a viable solution, they increase system costs appreciably.

As one other example, if an MS cable assembly is damaged or malfunctions, it is not easy to replace the assembly as the connection to the switching device is typically hidden from easy access and requires a special knowledge of the system to be addressed. In many cases, because an MS system includes several (e.g., 4, 6, etc.) cable assemblies, if one or two cable assemblies malfunction, users simply use the other assemblies instead of getting the malfunctioning assemblies fixed. While the other cable assemblies work well independent of malfunctioning assemblies, the malfunctioning assemblies can be bothersome as other attendees that use the system may be unaware of malfunctioning assemblies or may be frustrated as they hunt for a working cable assembly.

As one other example, it is not easy to increase the number of cable assemblies in an MS system to expand connection capabilities to support additional attendees. In this regard, if a system is delivered with and programmed to support four cable assemblies, adding two additional assemblies is not easy requiring reconfiguration of mechanical system components as well as system programming modifications. Similarly, the puck devices are designed to control content sharing on a maximum of four common display screens. It is envisioned that in the near future, many more than four screens or emissive surface windows or fields will be available for content sharing.

As yet one other example, the current MS system only allows an attendee to share her instantaneous desktop image on the system display screens. This means that an attendee cannot use her personal computing device to view a second set of content while sharing a first content set via a common screen. Thus, if a first attendee has a first video presentation application and a second internet browser application open on her computer, she cannot share the video application while independently using the browser to look for some other content she wants to share with a group. Similarly, the attendee cannot share different content on different system display screens or in different sharing windows of fields on a single display screen at the same time so if the attendee above wanted to show the video application output on a first common screen and the browser application on a second common screen, the attendee could not do that with a current MS system.

As yet one other example, with the MS system there is no way to enhance a user's experience beyond simply sharing and observing shared content on the emissive surfaces presented by the system displays. Thus, the emissive surfaces are routinely wasted between content sharing sessions and even during sharing activities when no content is presented.

A more recent solution includes a wireless sharing system where a virtual sharing tool including display screen selection buttons is presented on a user's personal computer device that hovers over a user's desktop image. This solution deals at least in part with the cluttered cable problem associated with the MS system, although power cables are still necessary. This solution also deals with the control cable strain problem as the control cables are eliminated.

Wireless content sharing also has several problems, however. For example, in most wireless sharing cases there is no way to indicate who is currently controlling content. Additionally, wireless systems often require the installation of a dedicated application on content providers' devices. Thus, the system does not support users who do not have the application downloaded, and taking time before or during a meeting to download, install, and configure the necessary software may be disruptive and time consuming. Wireless systems also are not be as intuitive as the physical MS puck device that is dedicated to the MS system and that includes clearly defined buttons for selecting sharing options. The non-intuitive nature of the wireless systems is especially apparent when a new user enters an MS system space and has to go through an unfamiliar access process in order to get on screen sharing tools. Additionally, as with the MS system, there may be no ability to modify the number or configuration of inputs and outputs remotely or to fix the switcher device remotely.

Still further portable devices that do not include wireless capabilities may be incompatible with pure wireless systems. Moreover, users may have a perception, valid or not, that cable connections are more secure. Such a sentiment may even be reflected in a formal company policy prohibiting or otherwise restricting wireless sharing of at least some types of documents and information. In those cases, a wireless system is simply not an option.

BRIEF SUMMARY OF THE DISCLOSURE

Some embodiments of the present disclosure include a digital content conference sharing system comprising a first large common emissive surface arranged for viewing by users within a conference space, a first conference table assembly located in the conference space and including at least a first worksurface member and a plurality of indicator devices that form a plurality of user stations including at least first and second user stations, the first and second user stations including first and second station worksurfaces and first and second indicator devices spatially associated with the first and second worksurfaces, the first indicator device controllable to indicate at least first and second visually distinct states, the second indicator device controllable to indicate at least the first visually distinct state and a third visually distinct state that is distinct from the first and second states, a processor programmed to perform the steps of (i) while a source device is associated with the first station and capable of sharing but is not sharing content on the common emissive surface, controlling the first indicator to indicate the first state, (ii) while a source device is associated with the second station and capable of sharing but is not sharing content on the common emissive surface, controlling the second indicator to indicate the first state, (iii) while a source device is associated with the first station and is sharing content on the common emissive surface, controlling the first indicator to indicate the second state and (iv) while a source device is associated with the second station and is sharing content on the common emissive surface, controlling the second indicator to indicate the third state.

In some cases the content is presented in non-overlapping content fields on the common emissive surface, the processor presenting a first indicator that indicates the second state spatially proximate any field including content from a source device associated with the first station and presenting a second indicator that indicates the third state spatially proximate any field including content from a source device associated with the second station. In some cases each first indicator includes at least a first light bar of a first color along an edge of a content sharing field in which content from a source device associated with the first station is presented and each second indicator includes at least one light bar of a second color along an edge of a content sharing field in which content from a source device associated with the second station is presented.

In some embodiments each first indicator includes a full illuminated frame about an associated sharing field and each second indicator includes a full illuminated frame about an associated sharing field. In some cases the first and second indicators are light devices capable of generating light in a plurality of different colors and wherein the first, second and third states are indicated by different illumination colors. In some cases the system further includes a user location sensor linked to the processor, the processor further programmed to control the first and second indicator devices to, upon the processor detecting a user proximate the at least a first worksurface that is not associated with a station, illuminate one of the indicators at one of the stations that is not currently associated with a source device to indicate a fourth state that is visually distinct from the first, second and third states to guide the user toward the associated station.

In some embodiments the first, second, third and fourth states are indicated by generating different colored illumination. In some cases the first indicator device includes a plurality of light devices that substantially outline at least a portion of the first worksurface at the first station and the second indicator device includes a plurality of light devices that substantially outline at least a portion of the second worksurface at the second station. In some cases each user station further includes an interface assembly that includes selectable buttons for controlling system content sharing states.

Tin some cases each interface includes at least first and second selectable buttons for identifying first and second fields for sharing content on the common display. In some cases the processor controls the appearance of the selectable buttons. In some cases the processor controls the first interface first and second buttons to indicate the first state when a source device associated with the first station is not sharing content in the first and second fields, respectively, and to indicate the second state when a source device associated with the first station is sharing content in the first and second fields, respectively, and controls the second interface first and second buttons to indicate the first state when a source device associated with the second station is not sharing content in the first and second fields, respectively, and to indicate the third state when a source device associated with the second station is sharing content in the first and second fields, respectively. In some embodiments each interface also includes at least third and fourth selectable buttons for identifying third and fourth fields for sharing content on the common display.

In some cases the processor controls the first interface third and fourth buttons to indicate the first state when a source device associated with the first station is not sharing content in the third and fourth fields, respectively, and to indicate the second state when a source device associated with the first station is sharing content in the third and fourth fields, respectively, and controls the second interface third and fourth buttons to indicate the first state when a source device associated with the second station is not sharing content in the third and fourth fields, respectively, and to indicate the third state when a source device associated with the second station is sharing content in the third and fourth fields, respectively. In some embodiments the plurality of user stations includes at least a third user station that includes at least a third indicator device and a third interface.

In some cases the system further includes at least one wireless transceiver linked to the processor, the transceiver for communicating wirelessly with the source devices. In some cases the wireless transceiver includes first and second separate near field communication devices proximate the first and second user stations. In some cases each station includes a separate near field communication device. In some cases each station further includes a content sharing interface integrated into the worksurface member.

In some cases the at least a first worksurface member includes a separate work surface member for each of the user stations. In some cases the system further includes a second large common emissive surface arranged for viewing by users within a second conference space and at least a second conference table assembly located in the second conference space and including at least a second worksurface member and a plurality of indicator devices that form a plurality of user stations including at least third and fourth user stations, the third and fourth user stations including third and fourth station worksurfaces and third and fourth indicator devices spatially associated with the third and fourth worksurfaces, the third indicator device controllable to indicate at least the first and a fourth visually distinct states, the fourth indicator device controllable to indicate at least the first visually distinct state and a fifth visually distinct state that is distinct from the other states, the content presented on the second common emissive surface replicating the content presented on the first common emissive surface, the processor programmed to further perform the steps of (i) while a source device is associated with the third station and capable of sharing but is not sharing content on the common emissive surfaces, controlling the third indicator to indicate the first state, (ii) while a source device is associated with the fourth station and capable of sharing but is not sharing content on the common emissive surfaces, controlling the fourth indicator to indicate the first state, (iii) while a source device is associated with the third station and is sharing content on the common emissive surface, controlling the third indicator to indicate the third state and (iv) while a source device is associated with the fourth station and is sharing content on the common emissive surface, controlling the fourth indicator to indicate the fourth state.

Other embodiments include a digital content conference sharing system comprising a first large common emissive surface arranged for viewing by users within a conference space, a first conference table assembly located in the conference space and including at least a first worksurface member and a plurality of indicator devices that form a plurality of user stations, each user station including a station specific section of the worksurface member and indicator devices spatially associated with the station, each indicator device controllable to indicate at least first and second visually distinct states wherein each first state is indicated in a first visually distinct manner and each second state is indicated in an indicator specific second visually distinct manner that is different for each of the indicators, each state including the first state and each of the indicator specific second visually distinct states indicated by generating light of a state specific and visually distinct color, a processor programmed to perform the steps of (i) while a source device is associated with a user station and capable of sharing but is not sharing content on the common emissive surface, controlling the indicator associated with the station to indicate the first state, (ii) while a source device is associated with a user station and is currently sharing content in a field on the common emissive surface, controlling the indicator associated with the station to indicate the indicator specific second state and presenting an on screen indicator that also indicates the indicator specific second state associated with the user station.

Other embodiments include a digital content conference sharing system comprising a first large common emissive surface arranged for viewing by users within a conference space, a first conference table assembly located in the conference space and including at least a first worksurface member and a plurality of indicator devices that form a plurality of user stations, each user station including a station specific section of the worksurface member and indicator devices spatially associated with the station, each indicator device controllable to indicate at least first and second visually distinct states wherein each first state is indicated in a first visually distinct manner and each second state is indicated in an indicator specific second visually distinct manner that is different for each of the indicators, each state including the first state and each of the indicator specific second visually distinct states indicated by generating light of a state specific and visually distinct color, each station further including a station specific user interface integrated into the worksurface member including at least first and second selectable content sharing buttons associated with at least first and second fields on the common emissive surface, the buttons operable to control content sharing in an egalitarian fashion, a processor programmed to perform the steps of (i) while a source device is associated with a user station and capable of sharing but is not sharing content on the common emissive surface, controlling the indicator associated with the station to indicate the first state, (ii) while a source device is associated with a user station and is currently sharing content in a field on the common emissive surface, controlling the indicator associated with the station to indicate the indicator specific second state and presenting an on screen indicator that also indicates the indicator specific second state associated with the user station.

Some embodiments include a digital content sharing system comprising a conference table assembly including a tabletop member having a substantially flat and horizontal top surface, a plurality of user stations arranged about an edge of the tabletop member, a separate opening formed in the top surface at least of the user stations, a large common display screen, a switching device linked to the display screen for presenting content in sharing fields thereon and a plurality of multi-purpose connection ports, a separate one of the connection ports mounted within each of the openings formed in the top surface to be accessible from above the top surface, each connection port linked to the switching device as a separate input.

In some cases each connection port is a USB-C port. Ion some cases each user station further includes a user interface. In some cases each user interface is integrated into the tabletop member. In some cases each user interface is arranged adjacent a lateral edge of an associated user station. In some cases each user station further includes at least one light indicator device integrated into the tabletop member proximate the station where the indicator light is controlled to indicate content sharing states associated with content presented on the large common display. In some cases each indicator device includes a light device that generates light surrounding an associated port and opening at a station and wherein the indicator device indicates a content sharing state for a source device associated with the station.

Some embodiments include a digital content sharing system comprising a large common emissive surface supported for viewing within a conference space, a conference table assembly located in the conference space adjacent the common emissive surface, the table assembly including a tabletop member and a plurality of user stations, each station including a tabletop space and an interface assembly integrated into the tabletop assembly along at least one lateral edge of the associated tabletop space, each interface presenting N+1 content sharing field options up to a total of M where N is the total number of current content sharing fields.

Some embodiments include a method for use with a digital content sharing system located in a conference space including at least a first large common emissive surface and a conference table assembly that includes a plurality of user stations arranged about an edge of a tabletop, each user station including at least a first light type indicator device generally viewable within the conference space, the method comprising the steps of upon detection of a user that is not currently associated with the content sharing system within the conference space, illuminating a first indicator device that is associated with a first user station with a first color light as an invitation to the detected user to occupy the associated station, upon the detected user associating a user content source device with the associated station and prior to sharing content on the common emissive surface, illuminating the first indicator device with a second color light as an indication that the user is able to share content from the user's content source device on the common emissive surface and upon the detected user sharing content from the user's content source device on the emissive surface, illuminating the first indicator device with a third color light as an indication that the user is currently sharing content on the common emissive surface.

In some cases the method further includes the steps of, upon the detected user associating a user content source device with a station other than the associated station and prior to sharing content on the common emissive surface, illuminating the indicator device associated with the other station with the second color light and turning off the first indicator device.

Other embodiments include a digital content sharing system comprising a large common emissive surface arranged for viewing in a conference space, a processor linked to the emissive surface and including several inputs for receiving content from linked user source devices, the processor programmed to perform the steps of (i) presenting at least first and second content non-overlapping sharing fields on the emissive surface for sharing content where the content shared in the sharing fields is changed during a conference session so that different input source devices drive the sharing fields at different times with different content, (ii) presenting forward and reverse options via at least a first interface enabling at least one conference user to select options to step forward and backward in the shared content so that the content presented in the sharing fields can be reviewed.

Other embodiments include a digital content sharing system comprising a large common emissive surface supported in a conference space for viewing, a switching device linked to the emissive surface and including several source device inputs linkable to content source devices, at least a first interface assembly including selectable content sharing options including at least an option to replicate an instantaneous dynamic user device desktop on the emissive surface, to freeze an image of an instantaneous dynamic user device desktop on the emissive surface while the user's source device is used to access other content and to cause a user's desktop application output to be replicated on the emissive surface while the user's source device is used to access other applications or content.

Yet other embodiments include a digital content sharing system comprising a large common emissive surface supported in a conference space for viewing, the emissive surface presenting at least first and second non-overlapping content sharing fields, a switching device linked to the emissive surface and including several source device inputs linkable to content source devices, a processor linked to the switching device for controlling content delivered to the content sharing fields, the processor programmed to perform the steps of presenting a freeze image of a previous desktop image from a first source device in the first field and presenting an instantaneous dynamic desktop from the first source device in the second field.

Other embodiments include a digital content sharing system comprising a large common emissive surface supported in a conference space for viewing, the emissive surface presenting at least first and second non-overlapping content sharing fields, a switching device linked to the emissive surface and including several source device inputs linkable to content source devices, a processor linked to the switching device for controlling content delivered to the content sharing fields, the processor programmed to perform the steps of receiving content from at least first and second applications run by a first user source device and causing the switching device to present the content from the first and second applications in the first and second fields, respectively.

Some embodiments include a digital content sharing system comprising at least a first large common emissive surface supported for viewing within a conference space, the emissive surface presenting at least a first content sharing field, a conference table assembly including a tabletop adjacent the emissive surface, at least a first interface device integrated into the tabletop and including at least a separate selectable option for each content sharing field on the emissive surface and a touch pad for controlling a first pointing icon on the common emissive surface.

In some cases the system further includes at least a second interface device integrated into the tabletop and including at least a separate selectable option for each content sharing field on the emissive surface and a touch pad for controlling a pointing icon on the common emissive surface. In some cases the pointing icon controllable via the second interface is a second pointing icon that is independent of the first pointing icon. In some cases the first interface further includes at least one add field option for adding an additional content sharing field on the emissive surface and wherein, when an additional field is added to the emissive surface, an additional filed selection option is added to the first interface that is associated with the newly added field.

Still other embodiments include a digital content sharing system comprising at least a first large common emissive surface supported for viewing within a conference space, an emissive surface control processor linked to the emissive surface and linkable to source devices for receiving content therefrom and presenting the content on the emissive surface, the processor programmed to perform the steps of receive control commands from at least first and second linked source devices and to control the common emissive surface like an extension screen for each of the first and second linked source devices so that content can be dragged from first and second display screens of the first and second source devices to the common emissive surface for simultaneous content presentation on the common emissive surface from the first and second source devices.

Some cases include a digital content sharing method for use with a plurality of portable user computing devices, the method comprising the steps of causing a first portable computing device to identify other portable computing devices within a threshold range of the first portable computing devices, presenting a list of the other portable computing devices within the threshold range via a display on the first portable computing device, receiving selection of at least a subset of the other portable computing devices from the list, establishing a network between the selected portable computing devices, presenting a control interface on the first portable computing device display screen and on each display screen of a portable computing device linked to the network wherein each interface includes a share option for sharing an instantaneous and dynamic desktop from an associated computing device, upon selection of one of the share options, replicating the instantaneous and dynamic desktop from the associated computing device in fields on each of the displays of the computing devices that are linked to the network, while content from one computing device is replicated on other computing device displays, enabling each computing device to replace the shared content in an egalitarian fashion and also enabling each computing device to open an additional content sharing field on each device display for simultaneously sharing content from at least two computing devices.

In some cases content sharing fields are presented in an overlapping fashion with desktop images so that computing device users have access to their own desktops during a sharing session.

Other embodiments include a digital content sharing system comprising at first and second large common emissive surfaces supported for viewing within a conference space, the second emissive surface being touch sensitive, an emissive surface control processor linked to the emissive surfaces and linkable to source devices for receiving content therefrom and presenting the content on the emissive surfaces, the processor programmed to perform the steps of detecting at least a first portable user source device and associating the source device with the system for content sharing, presenting a user interface to the user at a user station useable to share a desktop from the source device on the first emissive surface, detecting that a user associated with the first user source device located proximate the second emissive surface and presenting a small representation of the instantaneous and dynamic desktop from the first portable device proximate the user on the second emissive surface along with a replicated user interface useable to share the desktop on the first emissive surface.

Some embodiments include a workplace affordance configuration comprising a table assembly including a tabletop member for use by a system use where the tabletop member includes an edge portion along which the user is positioned during use, at least a first directional speaker supported proximate the table assembly and including a field of sound (FOS) that is directed toward location along the tabletop member edge at which the user is positioned during use so that a user's head is located in a column of sound generated by the speaker.

In some cases the configuration further includes a sound absorbing member on a side of the space to be occupied by a user opposite the speaker. In some cases the at least a first speaker is mounted within a ceiling above the table assembly. In some cases the at least a first speaker is mounted within the tabletop member so that sound is directed toward the space occupied by a user in a generally upward and outward direction. In some cases the configuration further includes a user head tracking sensor device wherein a processor is programmed to steer the speaker FOS toward a user's head as the user moves about at the tabletop edge.

Still other embodiments include a digital content sharing system comprising a first content sharing arrangement located at a first conference space and including at least a first large common emissive surface for viewing in the first conference space, the first content sharing arrangement further including a first switching device for receiving content from any of a plurality of user source devices linked to first switching device inputs and for presenting shared content in fields on the first emissive surface, a second content sharing arrangement located at a second conference space and including at least a second large common emissive surface for viewing in the second conference space, the second content sharing arrangement further including a second switching device for receiving content from any of a plurality of user source devices linked to second switching device inputs and for presenting shared content in fields on the second emissive surface, wherein, the common emissive surface at the first location is capable of presenting more large format content sharing fields than the common emissive surface at the second location and, wherein, when more large format content sharing field are presented at the first location than at the second location, the fields at the first location that are not presented in the large format at the second location are visually distinguished.

In some cases the second location presents small format fields on the second emissive surface that replicate content from the large format fields at the first location that are not presented in a large format at the second location.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE DISCLOSURE

Figure 1:
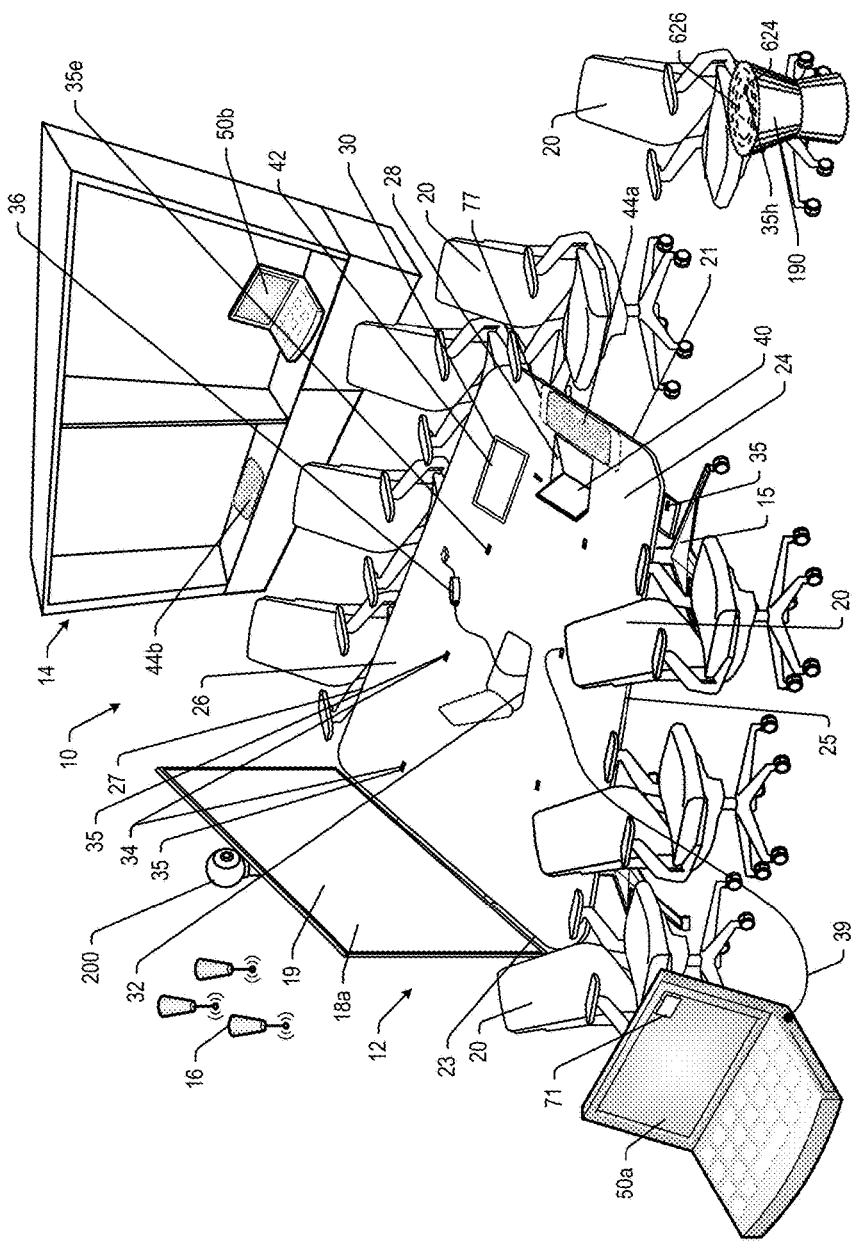
FIG. 1 is a perspective view of an exemplary content sharing system that is consistent with at least some aspects of the present disclosure.

Referring now to the drawings wherein like reference numbers correspond to similar elements throughout the several views and, more specifically, referring to FIGS. 1 through 3, the present disclosure will be described in the context of a content sharing system 10 including a system table assembly 12, a storage assembly 14, a wireless communication system represented by wireless access points 16, and a plurality of task chairs collectively identified by numeral 20. Other system components that are housed within table or other space affordance structure are shown schematically in FIG. 6 which will be described in greater detail below.

Figure 2:
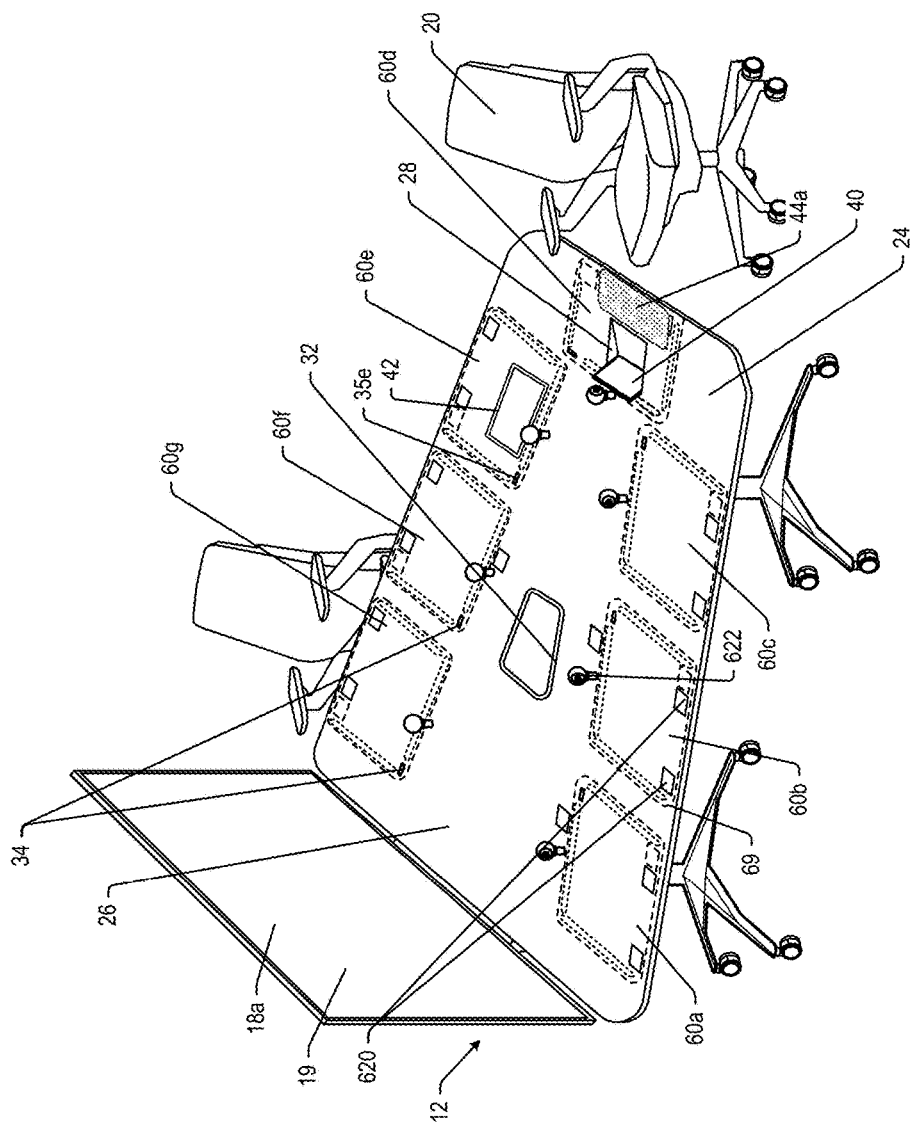
FIG. 2 is a second perspective view of the system shown in FIG. 1.
Figure 3:
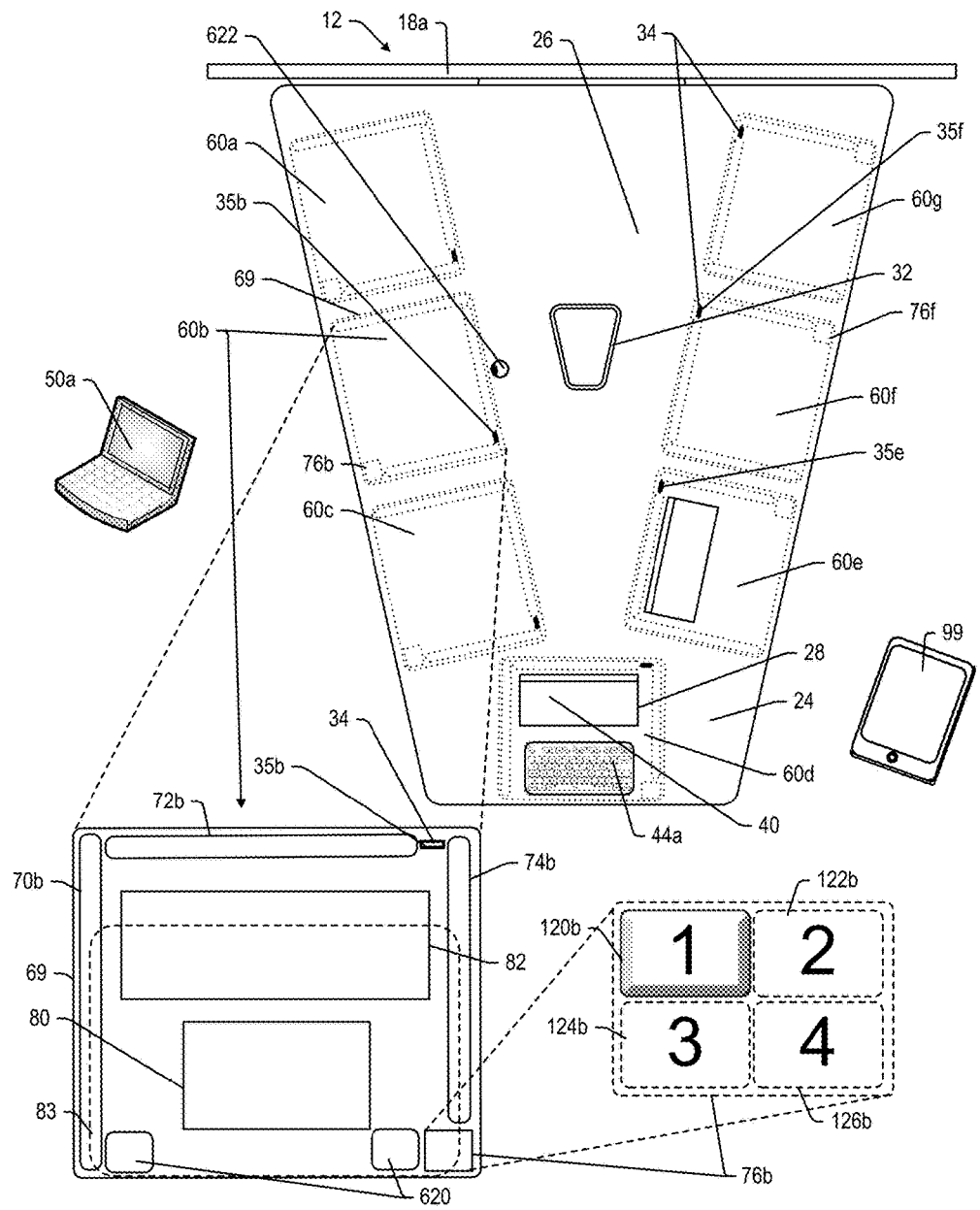
FIG. 3 is a top plan view of the system shown in FIG. 1 including detail related to an exemplary user station along an edge of a system tabletop.

Referring still to FIGS. 1 through 3, table assembly 12 includes a leg support structure 15, a tabletop member or assembly 24, large display screen 18a (See also FIG. 6) and a power/control assembly 32. Leg structure 15 supports the tabletop assembly 24 so that a top flat surface 26 thereof is substantially horizontal. Tabletop member 24 has a polygonal shape with a front edge 21 and an opposite and parallel rear edge 23 and first and second lateral side edges 25 and 27, respectively, where the side edges traverse the distance between ends of the front and rear edges. Rear edge 23 is longer than front edge 21 so that the side edges 25 and 27 angle toward each other when moving from the rear edge toward the front edge and the side edges are symmetrical and straight so that if the tabletop member 24 were divided down the middle from front to rear edges, the two sides would mirror each other.

Referring still to FIGS. 1 through 4, tabletop member 24 forms several openings in top surface 26 including connection port openings collectively identified by numeral 34. Connection port openings 34 include connectors or ports 35 for linking personal portable computing or source devices to a system switching device 104 (see also FIG. 6). In particularly advantageous embodiments, each port 35 may include a multipurpose connector port for at least power and data connections. Here, a data connection means that the port is capable of many types of data communication including but not limited to audio and video. One particularly useful and currently available multipurpose connector is the USB-C connector that is widely available. Unless indicated otherwise, hereafter each port 35 will be referred to as a USB-C port of connector unless indicated otherwise. Because ports 35 are multipurpose a single USB-C cable or other multipurpose cable 39 including a USB-C or other suitable male connector can link a portable computing device to the system for audio and video as well as control and other data transfer and also for power.

In at least some embodiments, port 35 is mounted within opening 34 so that the port is substantially flush with or slightly recessed from tabletop top surface 26 and so that no part of the port or structure there around stands proud of the tabletop surface 26. In advantageous embodiments water or liquid proof USB-C ports are used so that if any liquid is inadvertently spilled on tabletop surface 26 and makes its way to opening 34, the liquid will not damage the port, cables or any electronic devices linked thereto. Liquid proof USB-C ports are widely available on the market today and any suitable port may be utilized. Even in cases where a USB-C port is liquid proof, in some embodiments a raised lip 41 (see phantom in FIG. 5) may be provided about opening 34 to block at least some liquid from entering opening 34 when an inadvertent spill occurs.

Figure 5:
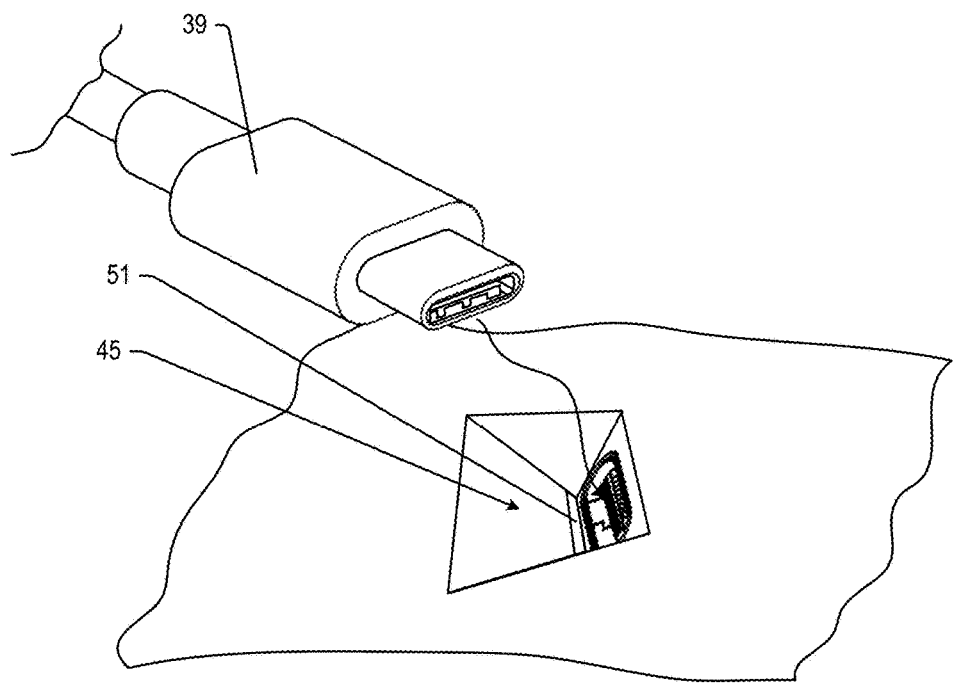
FIG. 5 is similar to FIG. 4, albeit showing different embodiment.

In other embodiments tabletop member 24 may include either a raised portion (not shown) or a recessed portion as shown at 45 in FIG. 5 where a USB-C receptacle is located on an at least partially vertical wall member so that it is angled with horizontal to minimize the possibility of liquid entering the port 35. Here, an opening 51 at the bottom of the recessed portion may be provided to divert liquid away from the port if any liquid enters the recessed area.

Referring again to FIGS. 1 through 3, in the illustrated embodiment the tabletop includes seven USB-C ports 35 that are spaced about, three generally arranged along each of the side edge portions 25 and 27 and a single port located for use by an attendee positioned adjacent front edge 21 of top member 24. An exemplary USB-C connector port 35 has an extremely small configuration required to accommodate a USB-C connector that is approximately 8.4 mm wide by less than 2.6 mm high.

USB-C ports and connecting cables have several advantages over prior cable connection systems. First, most system users will already be familiar with USB-C or other USB type ports and therefore, using one of the ports 35 to link for power and data sharing should be extremely intuitive to most system users.

Second, in most cases it is envisioned that system users that want to use the USB-C ports to link to the sharing system will have to supply their own USB-C cables 39 which can be readily obtained at any computer store and other types of retail stores. It is believed that users may be more careful with their own cable devices than with system integrated cable assemblies.

Third, USB-C cables, connectors and ports are extremely robust and therefore do not malfunction or become damaged very often. For this reason, a system including USB-C ports and requiring USB-C cables should be substantially more robust that other cable based systems.

Fourth, even in cases where a USB-C cable becomes damaged or malfunctions for some reason, the solution is to simply use a different USB-C cable, perhaps borrowed from a meeting mate or someone in the general area of system 10. Here, there is no need to wait for a maintenance person to fix the system.

Fifth, because the USB-C ports and accommodating openings 34 are extremely small and can be integrated into the tabletop to be substantially flush with top surface 26, the ports 35 simply do not obstruct other use of the tabletop surface there around when not used for sharing content. In addition, because the ports 35 provide no obstruction above the tabletop surface 26 in at least some embodiments, the ports can easily be placed at any location within the table top without affecting tabletop use.

Sixth, because the USB-C ports can be placed anywhere without obstructing tabletop use, the ports can be placed immediately adjacent user stations about the top member and even within the portion of the tabletop surface that is to be used by a user at a specific station. By placing ports immediately near where they will be used, the length of USB-C cable required to link to a port is reduced appreciably. In addition, even if a user uses a longer connection cable, the intermediate portion of that cable can be positioned adjacent the edge of the tabletop and need not extend into a central tabletop area. Shorter connection cables or cables that do not have to extend to a centrally located connection assembly result in less clutter and a better overall appearance.

Sixth, any security concerns about wireless content sharing systems can be eliminated where USB-C or other port types are utilized in a sharing system. No wireless sharing means no possibility of unintended and inadvertent data sharing or access. At least some entities that install sharing systems already demand cabled systems for security purposes and the USB-C and other port types integrated into the system facilitate peace of mind.

In at least some cases system users that intend to take advantage of the USB-C ports 35 may be required to bring their own USB-C cables to link devices to the system. Requiring users to bring their own cables is not particularly burdensome as many and in some cases most users are already accustomed to carrying their own connection cables for charging and other connection purposes. In other cases one or a set of USB-C cables may be stored in a system space on a shelf or in some other storage affordance proximate the table assembly 12.

Referring again to FIGS. 1 through 3, the seven USB-C ports are integrated into the exemplary tabletop surface 24 adjacent first through seventh user spaces or stations 60*a* through 60*g* (see also FIG. 6) that will be referred to herein as first through seventh "user stations" 60*a* through 60*g*, respectively. Each of the user stations 60*a* through 60*g* may include a specific tabletop sub-portion such as, for instance, a 2½ foot by 2 foot rectangular area adjacent the tabletop edge. In some embodiments the user stations may not be visually distinguished at all and system designers may simply rely upon the locations of ports 35 to help guide users to different user locations about the tabletop edge. In other cases, printed indicia on the tabletop surface or along an edge of the tabletop surface may distinguish one user station from adjacent user stations. To this end, in FIGS. 2 and 3, phantom boxes, one labelled 69, are shown at each of the user stations 60*a* through 60*g*. While shown in phantom, the station boxes may include paint, print or even some mechanical machination in the top surface (e.g., a recessed line, a rib, etc.) that distinguish adjacent stations.

In other embodiments it is contemplated that light devices integrated into the tabletop 24 below tabletop surface 26 may generate light to distinguish adjacent stations. Here, in some cases, a top surface layer of tabletop member 24 may be translucent yet opaque so that light generated there below passes through the top layer to distinguish an associated station from tabletop surface protons there around, but where the station space is not distinguishable from adjacent tabletop portions when the light is deactivated. For instance, the top surface layer may include an opaque/translucent plastic material. U.S. patent application Ser. No. 15/170,550 which was filed on Jun. 1, 2016 and which is titled "Space Guidance And Management System And Method" teaches, in FIGS. 20 and 21, one way to integrate light devices and input interface buttons into a tabletop structure so that the devices are not viewable unless illuminated and that reference is incorporated herein in its entirety by reference. Unless indicated otherwise, hereafter, an opaque/translucent tabletop assembly where light can be transmitted therethrough to distinguish one top surface portion from others but where the portions are indistinguishable when the light is not activated will be referred to as a "translucent tabletop".

Figure 6:
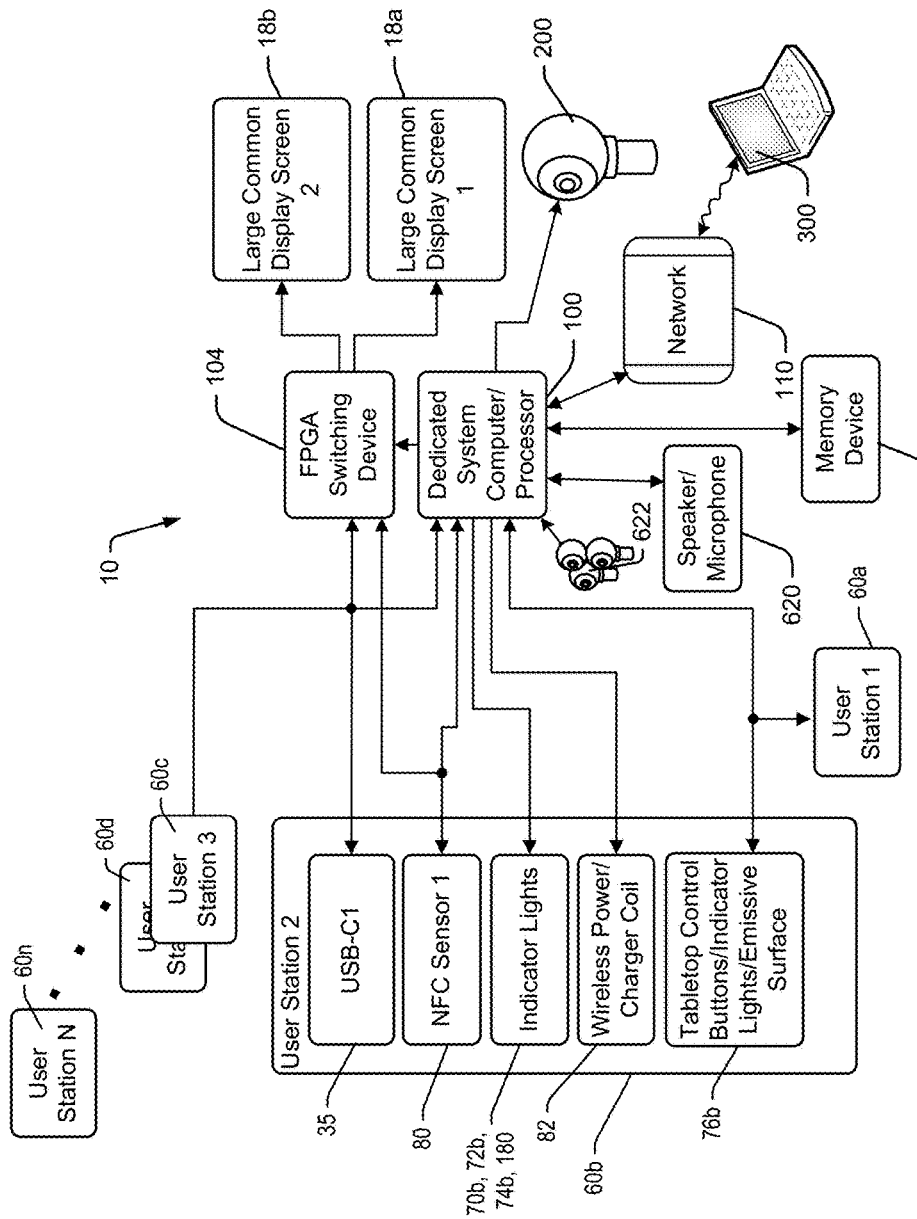
FIG. 6 is a schematic view of various components of the system shown in FIG. 1.

Referring now to FIG. 6, each USB-C port 35 is linkable through system switching device 104 to a common display 18*a* for sharing content thereon. While system control command signals may be provided directly to switching device 104 in some embodiments, in other embodiments system 10 may include a dedicated system computer/processor 100 that receives control commands and drives switching device 104 based on those commands. Programs run by processor 100 are stored in a memory device 102 or database and/or may be accessible via a network connection 110.

In order to control content sharing on display 18*a*, each user has to have some type of input device to provide commands to switching device 104 or to the controlling processor 100. In some embodiments it is contemplated that a virtual interface may be provided on each user's laptop or other portable communication device. To this end, exemplary virtual control interfaces for a content sharing system is described in U.S. patent application Ser. No. 14/568,938 which is titled "Personal Control Apparatus And Method For Sharing Information In A Collaborative Workspace" and which was filed on Mar. 23, 2016 at FIGS. 16, 17, 18, 20, 21 and 34-37 and that reference is incorporated herein in its entirety by reference. In some cases, when a user links her portable computing device via a USB-C cable to one of the ports 35, the system processor 100 may be programmed to automatically present a virtual control interface including one or more selectable virtual buttons that hover over the desktop image presented on the users device screen. In this regard, see the exemplary hovering virtual interface at 71 in FIG. 1. Here, when only one sharing field is presented on the common screen 18*a*, only one selectable virtual button is presented at 71. If two independent sharing fields are presented on surface 18*a*, two selectable buttons, one for each field, may be presented at 71 where the buttons are arranged in a juxtaposition that mirrors the juxtaposition of the fields on surface 18*a*.

If an attendee linked via a cable 39 disconnects the cable or disconnects her portable device from the cable, processor 100 may automatically revert to a default state in which any content from the disconnected device that was presented on the common surface prior to disconnection, is removed from surface 18*a*. In some cases where a first source device was linked to display 18*a* when a second source device was used to take control of the display 18*a*, if the second device is delinked from the switching device or if the user of the second device elects to remove her desktop image from display 18*a*, the default state may revert to presenting the instantaneous desk top image from the first device, assuming that first device remains linked to switcher 104.

In other cases, instead of providing a virtual control interface on a user's personal portable computing device display screen, a set of control interfaces may be integrated directly into table assembly 12 and, more specifically, into either the tabletop member 24 or into the edges of the tabletop. To this end, see 76*b* in FIG. 3 (see also FIG. 6) that includes a tabletop integrated interface assembly adjacent the second user station 60*b* along the edge of tabletop member 24 for controlling content presented on display 18*a*. In at least some embodiments interface 76*b* includes first through fourth capacitive touch sensitive buttons 120*b*, 122*b*, 124*b* and 126*b*, respectively, integrated into the tabletop member 24, each of which can be selected by user contact. Other station interfaces akin to interface 76*b* are provided at each of the other user stations 60*a* and 6*oc* through 60*g*. U.S. patent application Ser. No. 15/170,550 which is referenced and incorporated in its entirety by reference above teaches one type of capacitive table integrated button which may be used in the present case. Here, it should suffice to say that each of the buttons that form interface 76*b* includes a capacitive touch sensor mounted below the tabletop surface 26 where contact with the portion of top surface 26 above the button is sensed and identified as a button selection. In other cases the interface may include more than four or less than four selectable buttons.

As is the case with visually distinguishing different user stations described above, some type of printed or painted indicia or even some type of mechanically differentiated indicia may be presented on or formed in the tabletop surface 24 just above the capacitive buttons to guide a user on where to touch to select one or more of the buttons. In other cases, where a top layer member is translucent as described above, each of the buttons 120*b*, 122*b*, etc., may include a light device (e.g., one or more LEDs) mounted below the top layer that, when activated, generate light that passes up through the top layer and is visually distinguishable from above surface 26 to determine button locations.

Each of the table integrated interfaces (e.g., 76*b*) is at least spatially aligned with one of the USB-C ports 35 so that a user should be able to spatially discern the association. Thus, for instance, in FIG. 3, interface 76*b* is aligned with port 35*b*, interface 76*f* is aligned with port 35*f*, etc.

Referring again to FIG. 3, in at least some embodiments selection of the buttons 120*b*, 122*b*, 124*b* and 126*b* may cause content from an associated linked portable device (e.g., the instantaneous desktop image from a device linked to an aligned one of the ports (e.g., 35*b*)) to be displayed in an egalitarian fashion on display 18*a*. If only one desktop is shared at a point in time, that desktop image may be large and centrally located on surface or display 18*a* and may cover substantially all of the surface. While a first desktop from one portable device is shared on display 18*a*, if a second desktop is to be shared in parallel with the first, the user intending to share the second desktop may select second virtual interface button 122*b*, thereby causing the first desktop on surface 18*a* to shrink to a smaller size so that the first and second desktops can be presented side by side (see also FIG. 11). Third and fourth buttons 124*b* and 126*b* likewise can be selected causing processor 100 to split the space on surface even further.

In some embodiments, if a first user is currently presenting her desktop in a first field associated with first button 120*b* and a second user selects the second button on her interface 76*f* while her portable device is linked to port 76*f*, instead of presenting the second desktop simultaneously with the first, the second desk top may be swapped in for the first desktop in the first field. Referring again to FIGS. 1 and 3, if a first user is currently presenting her desktop in the first field on display 18*a* and selects the first interface button 120*b* at her station, the selection while presenting desktop may cause the desktop to be removed from display 18*a*.

While not absolutely necessary in some embodiments, particularly advantageous embodiments will include some indicating functionality to indicate different system states and, in some cases, to indicate who is sharing content during a meeting. For instance, as described in the already incorporated U.S. patent application Ser. No. 14/568,938, in the case of a virtual control interface 71 that includes a different virtual button for each field in which content may be shared on display 18*a*, user names of users currently sharing content in specific fields may be presented on the associated buttons (e.g., a first user's name "John" may appear in an upper left hand control button on all linked portable device interfaces when a user John is sharing content on in an upper left hand window of display 18*a*). In this way, anyone can instantaneous determine who is posting or sharing content by viewing their own personal interface 71.

Figure 4:
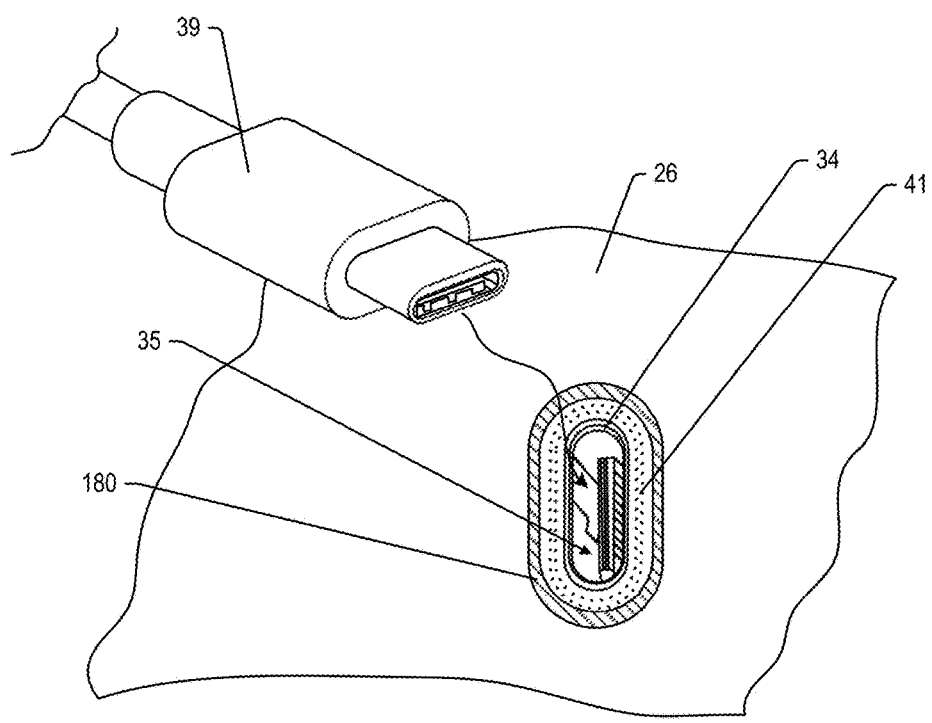
FIG. 4 is a view of a connector and a port that are used in at least some embodiments of the present disclosure.

As another instance, referring again to FIG. 4, a separate light indicator device 180 may be provided proximate or surrounding each of the ports 35. In FIG. 4 the light device is shown as an oval shaped light device in left down to right cross hatching but that device may take any of several other different forms. In some cases the light device may include a lens or transparent cover member having a top surface that is substantially flush with the top surface 26 of tabletop member 24. In other cases, the light device may be integrated into the table assembly with an LED or other light source positioned below the portion of a translucent tabletop member 26 about an associated port so that when the light device is off, presence of that device cannot be discerned and, when the light device 180 is illuminated, the portion of top surface 26 adjacent the associated port is lit up or glows. In some cases the light generated by device 180 may always be a single color when illuminated and may simply indicate that content is being shared by a linked source device (e.g., when the light 180 is activated) or that no content is being shared (e.g., when device 180 is off). In this case, if two users are simultaneously sharing desktops in first and second display fields via ports 35*b* and 35*f*, both port indicator lights 180 may be illuminated the same color to simply indicate that devices linked to each port are currently driving the displayed content.

In still other cases integrated light devices that shine through portions of a translucent tabletop member 24 and that define user stations 60*a* through 60*g* may be used to indicate at least two control states for a source device at that station including not sharing content and sharing content. In this regard, see the translucent light constructs represented at 70*b*, 72*b* and 74*b* in FIG. 3 that, when lit and shining through a top translucent layer of tabletop 24, define the tabletop section assigned to the second user station 60*b*. Thus, when indicator devices 70*b*, 72*b* and 74*b* are not lit, a device linked to port 35*b* may not be sharing content while lit indicators 70*b*, 72*b* and 74*b* may indicate that a device linked to port 35*b* is sharing content.

While three indicator light bars 70*b*, 72*b*, 74*b* are shown at each user station in the exemplary system 10, in other embodiments the station light indicators may take other forms such as a single indicator bar 72*b*, a circular indicator (not shown), etc.

In still other cases, the control buttons associated with the table integrated interfaces (e.g., 79 in FIG. 3) may include built in light devices for indicating different control states. For instance, interface 79 in FIG. 3 may include first through fourth light devices located below portions of a translucent top layer of the tabletop assembly 24 where a non-lit button indicates no sharing and a lit button indicates sharing.

In any of the embodiments described above that include light indicator devices integrated into the tabletop member 24, indicators may be capable of and controlled to indicate any of three different control states. To this end, for instance, referring again to FIG. 3, each of the light indicator devices associated with buttons 120*b*, 122*b*, 124*b* and 126*b* may be controllable to generate three or more distinctly different colors of light where each color indicates a different state. For instance, a first red color may simply indicate that a port 35*b* and associated control interface 79*b* is available for use if a user wants to link into the port to connect to the system 10. A second yellow color may indicate when a user has successfully linked her device to the port 35*b* but is not currently sharing content and a green indicator may indicate when a user's device at station 60*b* is linked and sharing content of the common display 18*a*.

Hereinafter, unless indicated otherwise, a non-cross hatched button or indicator in the drawings will indicate that the button or indicator is not illuminated at all, vertical hashing (see 70*b* in FIG. 7) will indicate red illumination used for guiding an attendee to a specific user station associated with system 10 and/or for indicating that an attendee can link to the system at an associated station for sharing content, left up to right hatching (see 70*b* in FIG. 8) will indicate yellow illumination and that an associated attendee is linked to system 10 for sharing content but is not currently sharing content, and double cross hatching (e.g., left up to right and right up to left, see 70*b* in FIG. 9) will indicate green illumination. Other colors are indicated by other hatching effects. For instance, blue will be indicated by left down to right hatching (see button 122*b* in FIG. 12) and pink will be indicated by horizontal hatching (see button 124*b* in FIG. 12).

In at least some cases, the user station interfaces (e.g., 76*b* in FIG. 3) at occupied user stations 60*a* through 60*g* may be controlled to indicate only display fields that are currently being used to present content and one additional field thereby offering system users the option to either take control of one of the fields currently used to present content or to create an additional field for presenting new content simultaneously with existing content. For example, see in FIG. 8 that no content is currently shared on display 18*a* and that only button 120*b* is illuminated yellow in interface 76*b* (e.g., the other interface buttons 122*b*, 124*b* and 126*b* are not hatched and therefore not illuminated). Yellow button 120*b* indicates that the user's device is linked to system 10 and that the user is able to share content on display 18*a* if button 120*b* is selected. See in FIG. 9 that once a first user 89*b* selects button 120*b*, content 210 for that user is shared on display 18*a* and button 120*b* is now illuminated green (e.g., double cross hatched) while button 122*b* is illuminated yellow to indicate that user 89*b* can also open a second filed on display 18*a* to share content on in a second field.

In some cases a frame indicator may be presented on a common display around each presented content field to help system users mentally connect control interface buttons to the display 18*a*. For instance, see in FIG. 8 that a yellow (e.g., left up to right hatched) frame 130 is presented around an instructional field 19 to indicate that field 19 is associated with the similarly yellow illuminated button 120*b* on interface 76*b* which is selectable to share content in field 19. See in FIG. 9 that a frame indicator 136 has been changed to green (e.g., double diagonal hatched) to associate content field 210 with now green button 120*b* and that an "Add Field" field icon 240 is presented on display 18*a* as a selectable option associated with now yellow button 122*b*.

Where two content sharing fields are simultaneously presented on display 18*a*, in at least some embodiments, it is contemplated that a differently colored frame may be presented for each sharing field where the frame colors match interface button colors to help users mentally associate specific buttons with specific sharing fields. For instance, see FIG. 11 where green buttons 120*b* and 120*f* at stations 60*b* and 60*f* are associated with field 210 that is circumscribed by green frame 136 and where blue buttons 122*b* and 122*f* at stations 60*b* and 60*f* are associated with field 212 that is circumscribed by blue frame 137. Thus, in FIG. 11, a first attendee 89*b* at station 60*b* can mentally associate, via color, buttons 120*b* and 122*b* with fields 210 and 212 and a second attendee 89*f* at station 60*f* has the same capability.

In still other cases, at least some set of indicators at each user station 60*a* through 60*g* may provide some type of indication of which attendee at a meeting is currently controlling content on display 18*a* or in each of the content sharing fields on display 18*a* when more than one field is presented. For instance, see FIG. 12 where first, second and third system users 89*b*, 89*f* and 89*d*, respectively, are located at stations 60*b*, 60*f* and 60*d*. In some embodiments, a separate color may be associated with each user that attends a meeting. For instance, the colors green, blue and pink may be associated with the first, second and third attendees 89*b*, 89*f* and 89*d*, respectively. Instead of a content sharing state being indicated by green light for each meeting user (e.g., where any shared content is indicated by green light framed, buttons, bars, etc.), sharing states for the first, second and third attendees may be indicated by their assigned colors green, blue and pink, respectively, and those assigned colors may be indicated by the light bars or some other indicator device at each user station that is viewable by users at other stations. Thus, for instance, in FIG. 12 where users 89*b*, 89*f* and 89*d* are sharing content in fields 210, 212 and 214 respectively, in addition to presenting green, blue and pink circumscribing frames 136, 137 and 216 about the content fields and green, blue and pink buttons (e.g., see 120*b*, 122*b* and 124*b* in FIG. 12) at each of the interfaces, the indicator bars at each occupied user station also indicate the color assigned to the user at each specific station. For example, to indicate that second attendee 89*f* is controlling field 212 content that is framed blue, indicator bars 70*f*, 72*f* and 74*f* at station 60*f* are illuminated blue (e.g., left down to right hatched). Similarly, to indicate that third attendee 89*d* is controlling field 214 content that is framed pink, indicator bars 70*d*, 72*d* and 74*d* at station 60*d* are illuminated pink (e.g., horizontally hatched).

Figure 12:
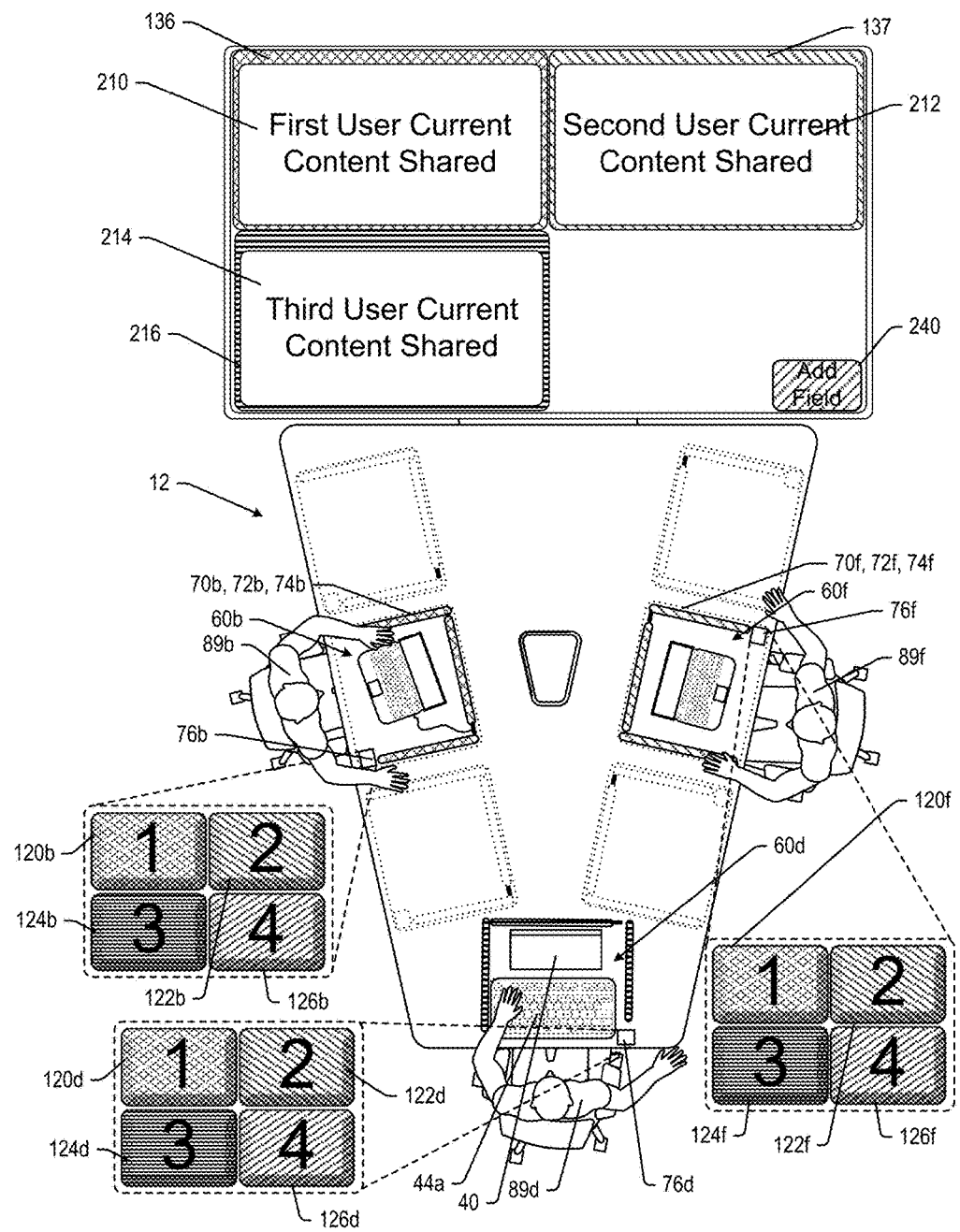
FIG. 12 is similar to FIG. 7, albeit showing the system in a different operating state.

Referring still to FIG. 12, consider the first user 89*b*'s instantaneous experience as illustrated. First user 89*b* can confirm that she is sharing content in field 210 by seeing that her assigned color is green as indicated by bar indicators 70*b*, 72*b* and 74*b* that match green frame 136. First user 89*b* can also see the blue and pink colored frames 137 and 216 about field 212 and 214 and the bar indicators at stations 60*f* and 60*d* that are blue and pink, respectively, and can discern that second user 89*f* and third user 89*d* are controlling the content in fields 212 and 214, respectively. Looking at her interface 76*b*, first user 89*b* also sees green, blue and pink buttons 120*b*, 122*b* and 124*b* that are color coded to match the colors assigned to the first, second and third attendees as indicated by the station bar indicators (e.g., 70*b*, 72*b* and 74*b*; 70*f*, 72*f* and 74*f*; and 70*d*, 72*d* and 74*d*) so that first user 89*b* can discern from interface 76*b* who is controlling which field on display 18*a*. In addition, fourth button 126*b* on interface 76*b* is illuminated yellow as an invitation to first user 89*b* to open an addition or fourth field for sharing on display 18*a*.

Figure 13:
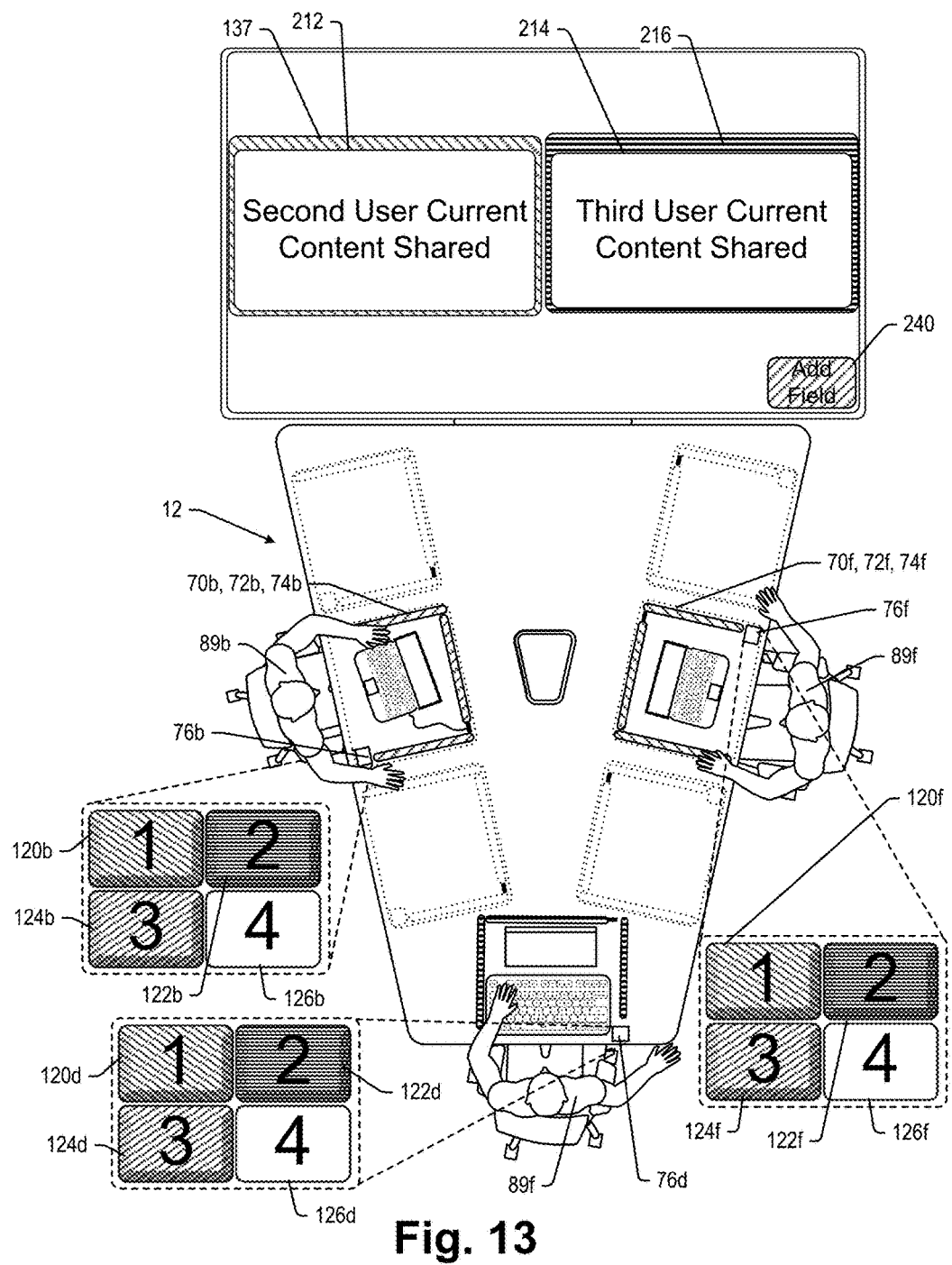
FIG. 13 is similar to FIG. 7, albeit showing the system in a different operating state.

In FIG. 12, if first user 89*b* selects first button 120*b* to yield field 210, field 210 would be eliminated from display 18*a* and fields 212 and 214 are rearranged for side by side centered presentation as shown in FIG. 13. In addition, upon yielding field 210 in FIG. 12, the control indicator bars 70*b*, 72*b* and 74*b* are colored yellow as shown in FIG. 13 to indicate that first user 89*b* remains connected to system 10 for sharing but is not currently sharing. Moreover, because only two fields are presented on display 18*a*, the fourth button 126*b* on interface 76*b* is not illuminated as a fourth field is not presented as an option on display 18*a* until a third sharing field has been created. Furthermore, interface 76*b* buttons 120*b*, 122*b* and 124*b* are colored blue, pink and yellow to indicate second user 89*f* control of field 137, third user control of field 214, and to invite the first user to open a third field on display 18*a* for sharing content.

While USB-C ports that require USB-C cables are optimal in many embodiments, it is understood that, for at least the foreseeable future, legacy portable devices will persist that simply cannot link up to the system 10 via USB-C ports. For this reason, in at least some cases, other source device to system 10 linking technologies or functions may be supported in system 10. For example referring again to FIGS. 1 through 3, in at least some embodiments a control assembly including control devices linked to cable assemblies may be provided as at 32 in addition to the USB-C ports. U.S. Pat. No. 9,492,008 which issued on Nov. 15, 2016 and which is titled "Personal Control Apparatus And Method For Sharing Information In A Collaborative Setting" is incorporated herein in its entirety by reference and teaches one control assembly type that may be installed at 32. Here, it should suffice to say that the control assembly represented in FIG. 1 by a single control puck device 36 includes at least one and perhaps two or more cable and puck assemblies that can be retracted into a storage compartment through an opening at 32 or pulled out of the opening to be linked to a laptop or other portable device if desired. Thus, any user of system 10 will have the choice to link to either one of the USB-C ports 35 or to one of the control cable assemblies that includes a controller 36.

In at least some cases, it is contemplated that each or at least one of the cables linked to control device 36 may constitute a USB-C connector so that even the cabled control assembly at 32 is more robust. Where the control device 36 cables are USB-C type cables, overall system cost should be reduced, robustness of the system should increase and maintenance costs in both time and money should be reduced appreciably. In addition, where USB-C cables link a user device to system 10, even through a mechanical subassembly 36, power can be provided via the USB-C cable to the linked source device.

As another example, in at least some cases a system 10 may also be useable with a wireless area network to receive control commands from user devices and to control virtual interfaces on user device displays to indicate current control states. To this end, see again FIG. 1 that includes an area wireless system represented by access points 16. U.S. patent application Ser. No. 15/078,633 which has been incorporated above by reference teaches a wireless content sharing system where user's can link their portable source devices to a content sharing system which may be provided in addition to the USB-C ports or in addition to both the USB-C ports 35 and the cabled control assembly located at 32.

As another example, referring again to FIG. 3, in at least some embodiments a separate near field communication (NFC) sensor device 80 (see also FIG. 6) may be integrated into the tabletop assembly 24 at each of the user stations 60*a* through 60*g*. Each user laptop or other portable computing device may include an RF ID tag or device or may operate a wireless identifier application that can cooperate with an NFC sensor 80 to form an association between the user's portable source device and the station (e.g., 60*b*) at which the sensing NFC sensor is located. Thus, when a user places her source device in a specific NFC sensor zone 83 (shown in phantom in FIG. 3), the sensor may sense the user source device and associate the sensor device station with the specific user source device. Once a user's source device is associated with a specific station, the source device may communicate with system processor 100 through the NFC sensor or through some other transceiver integrated into the table assembly that only wirelessly communicates within the user station space and therefore only with the user's associated source device.

In other cases, wireless communication for content sharing and state signaling may be via the area wireless system 16 once a user's source device is associated with a particular station (e.g., 60*b*). Thus, initial association may be via a station specific NFC sensor integrated into the table assembly 12 and wireless communication between processor 100 and a source device may be via the area wireless network. In this case, the NFC sensor devices in table assembly 12 may reaffirm that a user's device is at a station periodically (e.g., every 5 seconds) and, if a user's source device is not at a station during one or a consecutive set (e.g., three consecutive) affirm attempts, processor 100 may delink the user's device and remove any content shared thereby from the common display 18*a*.

As yet one other example, it has been recognized that in many cases one or more meeting attendees may not bring personal portable computing devices to a meeting. For instance, some attendees may not have portable personal devices for sharing content. In other cases an attendee may simply neglect to bring her portable source device or may purposefully not bring her device to a meeting. Despite arriving at a system 10 for a meeting without a personal device, an attendee that still wants to share some content should have the ability to do so. For this reason, in at least some cases one or more interfaces that fully enable an attendee to access her personal data, documents and digitally stored files may be integrated into system 10 in addition to the ports 35 and other linkage systems described above. In FIG. 1, first and second exemplary integrated content accessing interface assemblies are indicates at 40 and 42. The first interface assembly 40 is mounted in a tabletop opening 28 for movement between a stored position and a use position. Similarly, second interface assembly 42 is mounted in a tabletop opening 30 for movement between a stored position and a use position. Second interface assembly 42 is shown in the stored position while first interface assembly 40 is shown in an opened or use position.

Each of the interface assemblies 40 and 42 has a similar construction and operates in a similar fashion and therefore, in the interest of simplifying this explanation, only assembly 40 will be described here in any detail. Interface assembly 40 includes a flat panel display screen that has a front emissive surface and an oppositely facing rear surface that is flat and completely planar and that, in at least some embodiments, is finished with the same type of material used to provide tabletop surface 26. In some embodiments, the assembly 40 display screen may be mounted near a bottom edge near the rear of the opening 28 so that the top end thereof can rotate about a horizontal axis between the stored position with the rear surface material substantially flush with the tabletop surface 26 (see 42 in FIG. 1) and an open or use position extending upward from the rear portion of opening 28 at a slight rearward angle with the display emissive surface facing a user position along the front edge 21 of top member 24. In some embodiments, once rotated upward, the screen may also slide a few inches downward so that it sinks part way into opening 28 so that the top edge of the display moves down and the interface is less pronounced when in the use position.

In some embodiments a portion of the tabletop between opening 28 and the adjacent tabletop edge 21 may include an emissive surface (see phantom at 77 in FIG. 1) and, when interface 40 is placed in the open use position, the emissive surface may automatically provide an virtual interface tools for accessing and controlling personal digital content associated with a system user. In some cases, the virtual tools may include a virtual keyboard where keys are selectable via touch like a conventional mechanical keyboard.

In other cases, instead of providing an emissive surface that is flush with the tabletop surface 26, a capacitive keyboard may be integrated directly into the tabletop structure like the other interface buttons 120*b*, 122*b*, etc., described above where a top layer of the tabletop assembly 24 covers the keyboard and where light devices within the keyboard light up so that the keys and board are visible through the tabletop top surface when the keys are illuminated but are indiscernible when the board is not illuminated. Here, again, the keyboard may automatically light up and persistently remain lit once interface 40 is moved to the use position. In either of the emissive surface keyboard or the capacitive integrated keyboard cases, the keyboard may persist for a period while not in use and may fade off or its intensity may be reduced once a threshold period of non-use occurs. Here, a simple initial touch may restore the keyboard to its brightest setting so that the keyboard is useable.

In still other cases it is contemplated that one or more wireless mechanical keyboards 44a, 44b (see again FIG. 1) may be provided within a space in which system 10 is located for use with interfaces 40, 42, etc. Here, when a keyboard is placed on the surface portion between interface 40 and adjacent edge 21, the keyboard may automatically pair with interface 40 as opposed to other integrated interfaces (e.g., 42). To this end, in at least some cases it is contemplated that keyboard 44a may have an RF ID attached and a near field communication (NFC) sensor device (see again phantom 77 in FIG. 1) may be integrated into the tabletop assembly 24. When the RF ID is in the sensing field of the NFC sensor, system processor 100 may automatically pair the keyboard with interface 40 and may provide some visual or audible feedback like, for instance, a pairing confirmation message via interface 40, by lighting up some integrated light device under the tabletop top translucent layer or material or by illuminating an LED or the like within the keyboard itself.

In still other cases it is contemplated that an interface integrated into the table assembly 12 may include a completely emissive horizontal surface at a user station that a user may associate. In this regard, U.S. patent application Ser. No. 14/995,367 which is titled "Emissive Shapes And Control Systems" and which was filed on Jan. 1, 2016 describes an emissive table structure that provides desktop content to an associated user and that application is incorporated herein in its entirety by reference and any of the teachings therein may be used to provide a fully emissive table integrated interface at station 60d or at station 60e or at any of the other stations.

Referring yet again to FIG. 1, in the illustrated embodiment first and second integrated interfaces 40 and 42 are provided proximate each other and near the front edge 12 of the top member opposite the display 18a along the rear edge 23. Here, it is contemplated that in most cases the optimal location(s) for viewing display 18a will be at the tabletop end opposite the display and therefore users at stations 60d and 60e may have optimal locations.

In at least some embodiments it is contemplated that each station that includes an integrated interface may also include other system component described above so that a user can use her personal portable computing device instead of the table integrated devices at a station that includes integrated devices if she prefers. For instance, in FIGS. 1 through 3, a user that assumes a position at station 60e may choose to leave integrated interface 42 in the stored position and may instead link her laptop (not illustrated) to USB-C port 35e or may rely on a wireless NFC initiated connection to link to the system at station 60e.

In at least some embodiments, once interface 40 and an associated keyboard are activated, a user may be prompted for a user name and password so that the station interface 40 can be associated with the specific user thereby enabling the user to access her personal digitally stored data, documents, files and software applications for accessing other data and information.

In cases where a user wirelessly (e.g., without connection to one of the ports 35 or via a cabled assembly at 32) associates her portable source device with a specific user station, once associated with the station, all control interface components and state indicators associated with the station may be enabled to provide functionality for the associated source device. Thus, for instance, in FIG. 3, if laptop 50a is wirelessly associated with station 60b via an NFC pairing or the like as described above, the user interface control buttons that comprise interface 76b may be presented (e.g., light devices associated therewith may be illuminated) and activated so that that those buttons can be used to control content sharing from laptop 50a to common display 18a. Similarly, sharing capability and sharing states for laptop 50a may be indicated by any of the indicating light devices or assemblies described above once device 50a is paired with station 60b. For instance, buttons 120b, 122b, 124b and 126b may be illuminated with different colors to indicate sharing capability as well as sharing state as described above and in greater detail hereafter. As another instance, the station defining light devices 70b, 72b and 74b may be illuminates to indicate capability and state in a similar fashion. Thus, in some cases, for instance, a user may move her laptop 50a into the NFC sensing zone 83 associated with NFC sensor 80 so that the sensor senses the user's laptop and associates the laptop with station 60b. Once laptop 50a is associated with station 60b, laptop may wirelessly communicate with system processor 100 for content sharing purposes while the NFC sensor is used to persistently confirm that laptop 50a remains located at station 60a. Upon initial laptop to station pairing, LEDs or other light devices at 70b, 72b and 74b as well as a light device associated with button 120b may be illuminated yellow to confirm the pairing and also to indicate that the user can share her desktop on display 18a by selecting button 120b. Once button 120b is selected to share content, the content from laptop source device 50a may be presented on display 18a and the indicator lights at 70b, 72b and 74b as well as at button 120b may be illuminated green to indicate content sharing in the first field on display 18a. Many other state indicating protocols are contemplated.

In still other embodiments a user's portable source device may be automatically (or based on a user selection) paired with a user station so that the source device provides a sharing interface while a table integrated emissive surface or display presents a user's desktop at the user's paired station. To this end, see, for instance the tablet computing device 99 shown in FIG. 3. Here, similar to the laptop 50a that may include an RF ID tag or that may run an application program useable to associate with a user station via NFC sensing, tablet device 99 may include a similar RF ID tag or may run a similar application program. In this case, once a user's tablet device is associated with a station such as, for instance, station 60d, the user's desktop image may be automatically presented on integrated display 40 while user input tools are provided as a virtual interface on the user's tablet device 99 display screen. The interface tools may include a virtual keyboard and/or a content sharing interface (e.g., akin to interface 76b shown in FIG. 3). In this case, any of the table integrated indicator light devices at the associated station 60d may be used to indicate sharing capability and sharing states as described above. Thus, user content may be presented via a station integrated emissive surface, user input to that station for content sharing and control may be via a paired user tablet type device and sharing capability and states may be indicated via station integrated indicating light devices.

Many portable user computers or source devices are now configured to include wireless charging components so that the devices can be charged when placed on or proximate a surface associated with a charging assembly. In at least some embodiments it is contemplated that one, a subset or perhaps all of the user stations will be equipped with charging assemblies integrated into tabletop assembly 24. To this end, see exemplary charging assembly 82 shown at station 60*b* in FIG. 3 (see also FIG. 6). Here, it is contemplated that whenever a wirelessly chargeable computing device is placed at station 60*b*, charging assembly 82 will automatically commence charging the proximate device. Successful coupling for charging may be indicated via the user's device or via some other table or station integrated indicator, either visually or audibly or both.

Referring again to FIG. 1, in some embodiments one or more USB-C connection ports 35*h* may be provided in a second table assembly 190 in the space that accommodates table assembly 12 where port 35*h* is linked to or associated with system 10 so that a user that is spaced from the edge of tabletop member 24 can also link to system 10 and share content. Here, many of the features and aspects described above with respect to table assembly 12 may also be implemented in assembly 190. For instance, interface buttons 626 and light indicators 624 akin to those described above with respect to FIGS. 1 through 3 may be integrated into the top surface of second table 190. As another instance, an NFC sensor and/or wireless charging assembly (not shown) may be integrated into the second table top surface.

Referring again to FIGS. 1 and 6, in at least some cases system 100 may include other sensing devices like, for instance, one or more cameras 200 that can be used to generate images or other sensing signals that processor 100 can use to determine user proximity to table assembly 12 or even to the separate user stations at the table. While a camera 200 is shown as a sensor device, it should be appreciated that two or more cameras may be provided for generating images for tracking user locations. In addition, the camera is only exemplary of a location or presence sensing device and other location and presence sensor devices and assemblies are contemplated. Here, in at least some cases, when processor 100 determines that a user is proximate assembly 10, processor 100 may control at least a subset of the table integrated light indicator devices as well as common display 18*a* content in various ways, some of which are described in some detail hereafter.

Referring yet again to FIGS. 1 through 3 and 6, it should be understood that many different combinations of system features are contemplated and therefore many different system embodiments are envisaged. In at least some cases, various system linking processes and hardware may be provided within a single system 10 to accommodate different types of user source devices, different corporate linking requirements and different user preferences. For example, in a meeting including seven local attendees, first through third meeting attendees may prefer to link to system 10 via USB-C cables and ports 35, fourth and fifth attendees may prefer to link to system 10 wirelessly, a sixth attendee may prefer to link to system 10 via the cabled assembly at 32 and a seventh attendee may not have brought her portable source device and may therefore have to link to the system via one of the integrated interfaces 40 or 42.

Next, exemplary control processes or methods for supporting system 10 users will be described. In the descriptions that follow, referring to FIG. 7, unless indicated otherwise, it will be assumed that the user stations 60*a* through 60*c* and 60*e* through 60*g* each includes the exemplary station affordances described above in the context of user stations 60*b* as shown at 69 in FIG. 3 while station 60*d* at the front edge end of table assembly 12 includes all of the station affordances associated with above described station 60*b* as well as the integrated interface display 40 where a mechanical keyboard 44*a* is used as an input device. It will also be assumed that first, second and third arriving users or attendees 89*b*, 89*f* and 89*d* for a meeting choose to link to the system via a USB-C port, wirelessly, and via the integrated interface systems 40/44*a*, respectively.

Prior to any user approaching system 10, in at least some cases it is contemplated that none of the table integrated visual indicators will be illuminated. Here, because no user is linked to system 10, no user content is shared on display 18*a*. At this time, in at least some embodiments, processor 100 (see again FIG. 6) may be programmed to provide other content on display 18*a*. For instance, other content may include a news feed, a stock ticker, a company social feed, a commercial for use of system 10, or any other feed that makes sense. Referring again to FIG. 6, processor 100 may provide a content feed to one of a plurality of switching device inputs and may control the switching device to select that input while in the non-content sharing state.

Referring again to FIG. 7, when first user 89*b* approaches system 10, system processor 100 may use images from camera 200 or signals from some other sensor device(s) to identify that the user is approaching system 10. Other presence sensor type devices may include, for instance, Bluetooth wireless sensors (see sensor 600 in FIG. 7) integrated into the table assembly 12 or located within a space egress (e.g., a doorway) into the space that includes the table assembly 12 or at some other suitable location. Here, users may wear badges or other wearable devices or may carry smart phone or other personal portable computing devices that are detectable via Bluetooth communication so that the users can be detected within a typical Bluetooth range of the table assembly 12. In some cases the Bluetooth range will be limited to within a short distance (e.g., 6 feet) from table assembly 12 so that user detection proximate assembly 12 may only be indicated when a user is relatively close to tabletop 26

Referring again to FIG. 7, in some embodiments, if user 89*b* is located within 8 feet of tabletop 26 and is moving toward system 10, processor 100 may ascertain that the user is approaching table assembly 12. Upon determining that user 89*b* is approaching assembly 12, processor 100 may select user station 60*b* as an optimal station at which to locate the first arriving user 89*b* and may illuminate (see vertical hatching of indicator bars 70*b*, 72*b* and 74*b* indicating red illumination) or otherwise indicate station 60*b* and no other stations to encourage first user 89*b* to assume a position at station 60*b*. Here, in at least some cases the optimal first station to encourage may be predefined based on some rules of thumb. For instance, in most cases at least two users will use a system 10 at the same time and an optimal positioning of two users may generally be along opposite lateral edges 25 and 27 of tabletop 26 so that first and second arriving attendees face each other. For this reason, in FIG. 7, the first arriving user 89*b* is encouraged to assume a position at lateral edge station 60*b* and the second arriving user will eventually be encouraged to assume a position across tabletop 26 from the first attendee at station 60*f*.

Figure 7:
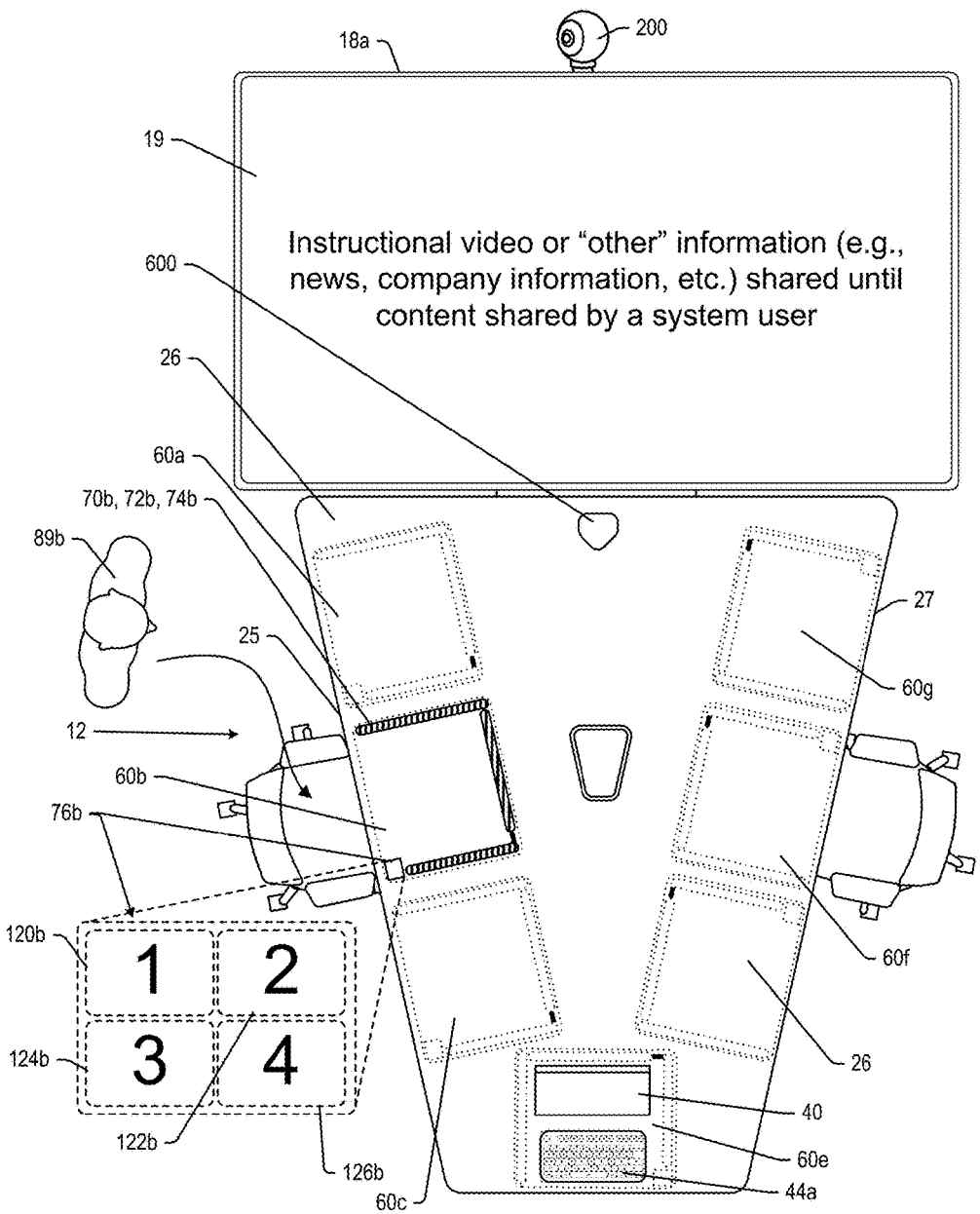
FIG. 7 is a top partially plan and partially laid out view of the system shown in FIG. 1.

In other cases, every available station that is not already associated with a user may be lit up red to offer those stations to a newly arriving user. In FIG. 7, while station 60*b* is lit up red to encourage first user 89*b* to assume a position at that station, in at least some cases it is contemplated the first user 89*b* may be able to assume a position at any of the user stations 60*a* through 60*g* that is not currently associated with some other user. In FIG. 7, for instance, if user 89*b* were to move over to and assume a position at station 60*g*, processor 100 would be programmed to turn off indicator bar 70*b*, 72*b* and 74*b* illumination and to instead illuminate station 60*g* indicator bars red until user 89*b* links to system 10 for sharing content, at which time, consistent with the description above, processor 100 illuminates the station 60*g* indicator bars yellow to indicate linkage for sharing but an instantaneous non-sharing state.

In cases where a user wears a badge or other wearable device or carries a portable computing device that is capable of some type of audible or visual indication, upon detecting the user proximate the table assembly 12, the system processor may transmit an indicator control signal to the user's device causing the device to generate a "welcome" type indication prior to actual arrival at the edge of tabletop 26. The welcome indicator may be simple such as illuminating an LED indicator on a badge in a way that is associated with a welcome message. In other cases the welcome indicator may be more sophisticated such as, for instance, a screen shot presented on a smart phone device display screen that welcomes the user to the assembly 12.

In at least some cases low energy Bluetooth or other similar low energy wireless communication may be used to sense users and start the welcoming process and, once a user is linked to the system for sharing content and for other purposes, wireless communication between the user's computing device and the system processor may be via some more robust wireless protocol such as, for instance, near field communication (NFC).

Figure 8:
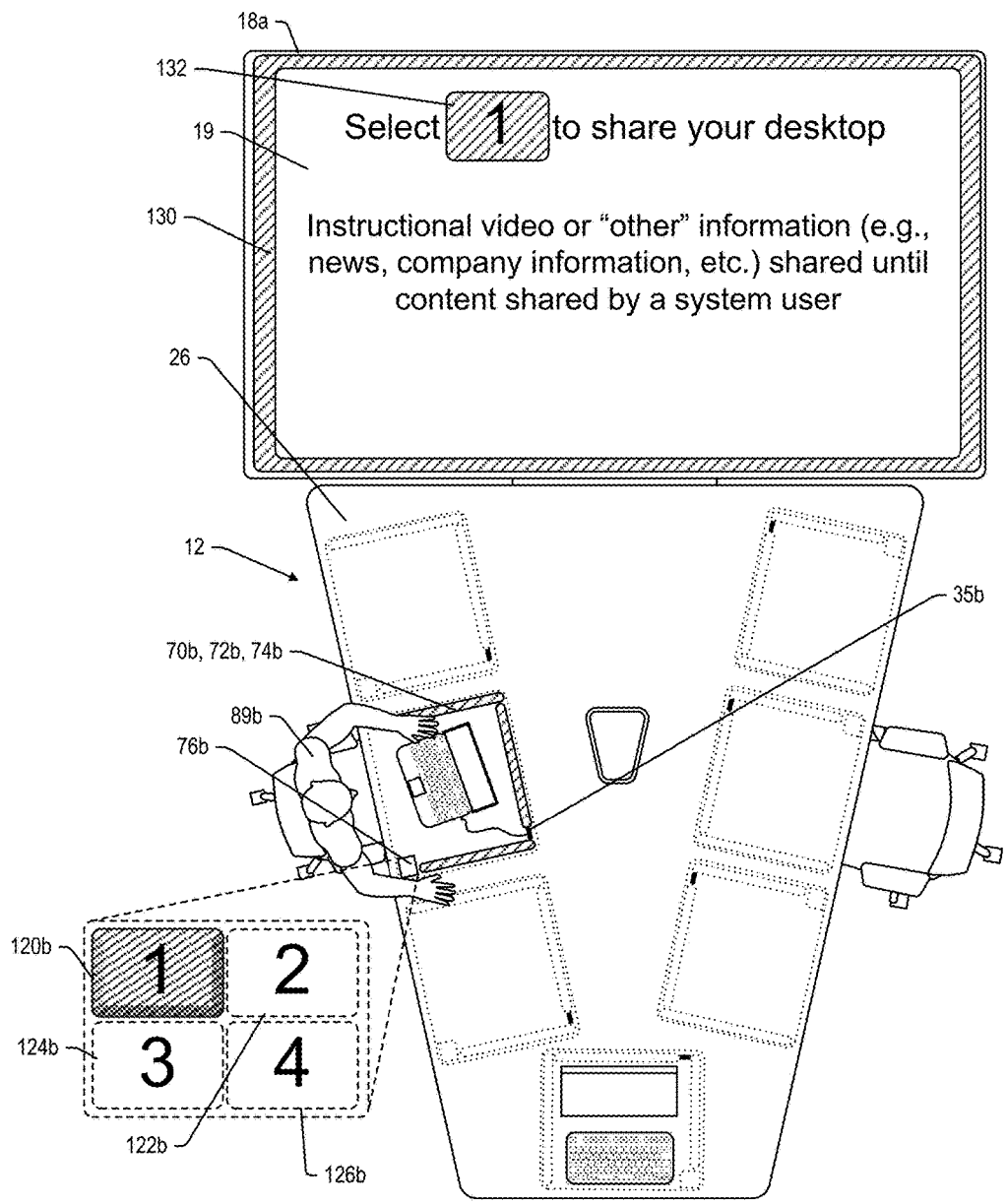
FIG. 8 is similar to FIG. 7, albeit showing the system in a different operating state.

Referring to FIG. 8, in the present example first user 89*b* moves to station 60*b* and uses a USB-C cable to link her portable laptop computer to station USB-C port 35*b* and hence to system 10 for content sharing. To indicate that content sharing is enabled but that no content is instantaneously shared, the circumscribing frame 130 about a content field 19 on display 18*a* is illuminated yellow as is the first control button 120*b* on interface 76*b* at station 60*b*. In addition, to further indicate that the first user's source device is linked to the system for sharing but is not instantaneously sharing, the station indicator bars 70*b*, 72*b* and 74*b* are changed from red to yellow. Notice that only indicator bars and the interface buttons at occupied or user associated stations are illuminated in this example. Thus, in FIG. 8, because only the first user 89*b* is present at system 10, only the station 60*b* associated with first user 89*b* is illuminated. Similarly, in FIG. 12, because first, second and third users 89*b*, 89*f* and 89*d* are located at stations 60*b*, 60*f* and 60*d*, only stations 60*b*, 60*f* and 60*d* are illuminated.

Referring again to FIG. 8, instructions to select the yellow illuminated button 120*b* are presented at 132 on display 18*a*. Consistent with the description above, in this embodiment other interface buttons 122*b*, 124*b* and 126*b* are not illuminated and, in at least some embodiments, would not be viewable through the translucent top layer member of tabletop 26 at this point.

Figure 9:
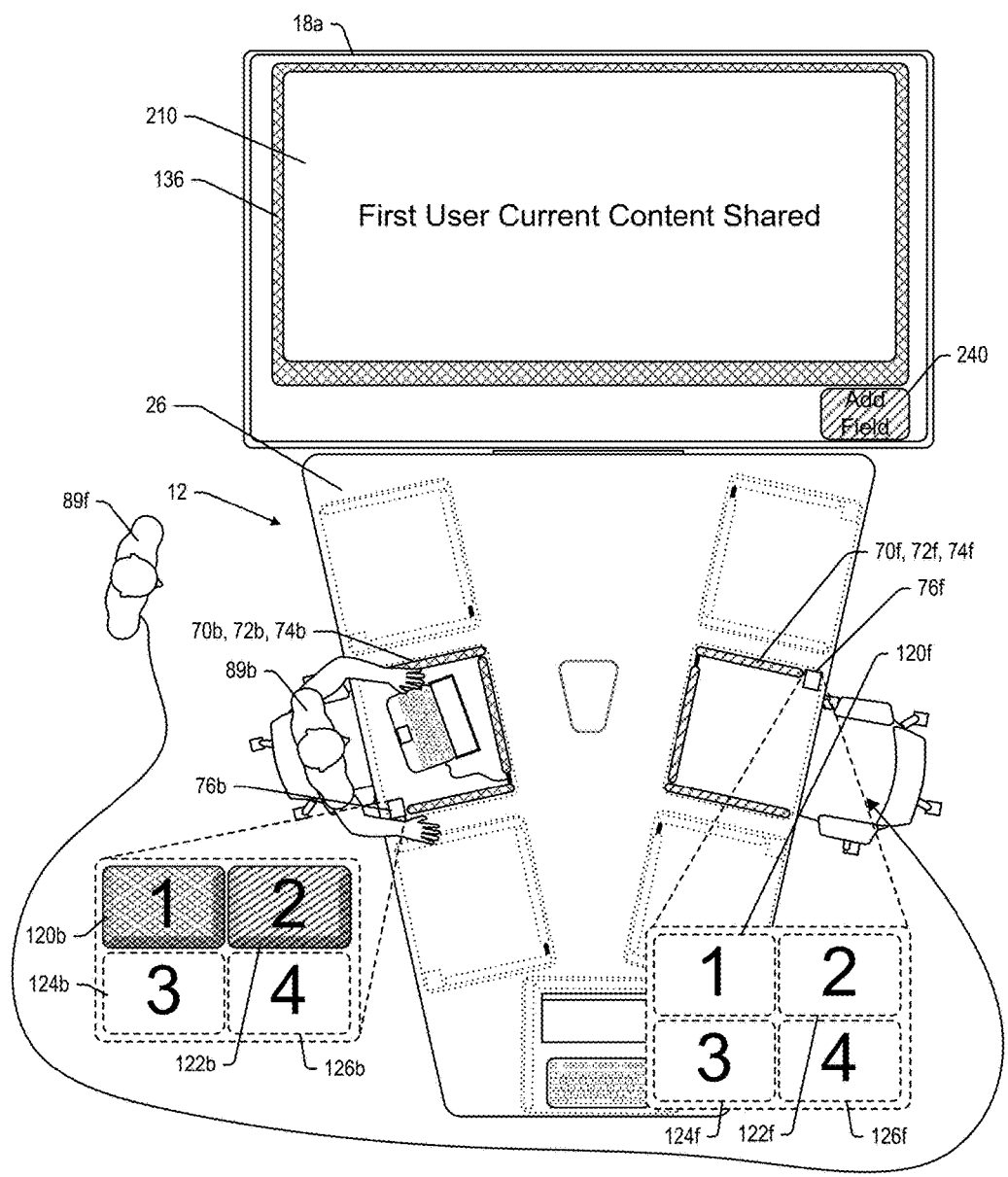
FIG. 9 is similar to FIG. 7, albeit showing the system in a different operating state.
Figure 10:
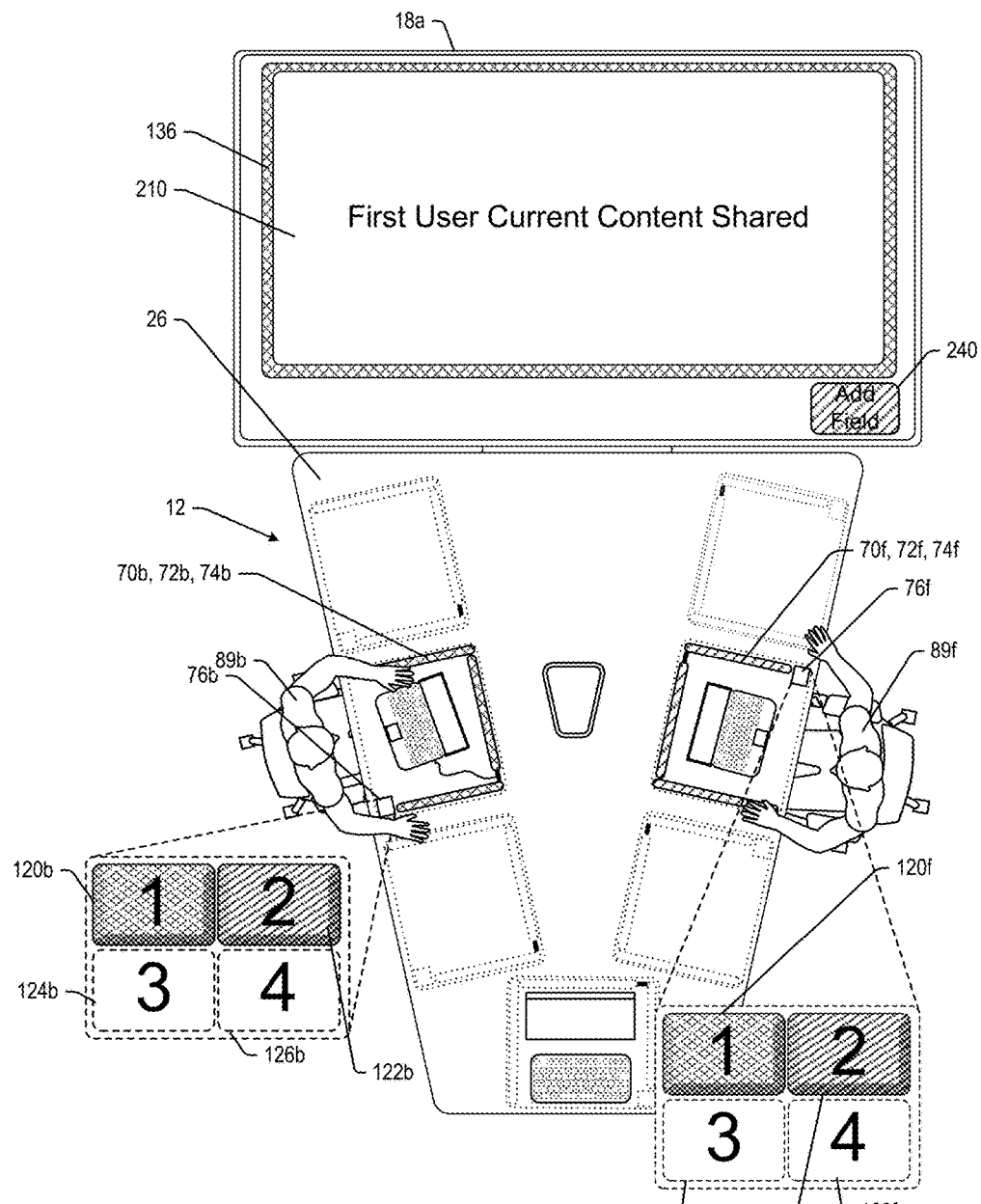
FIG. 10 is similar to FIG. 7, albeit showing the system in a different operating state.

Referring now to FIG. 9, upon selecting first interface button 120*b* to present her desktop image on large common display 18*a*, the first user 89*b*'s content is presented in field 210, button 120*b*, the indicator bars 70*b*, 72*b* and 74*b* and the circumscribing frame 136 are all changed from yellow to green to indicate instantaneous content sharing, the "Add Field" option is indicated at 240 for adding a second content sharing field and each of the Add Field option 240 and the associated second interface button 122*b* are illuminated yellow to indicate that the first user is linked to share via a second field but is not instantaneously sharing via that second field. Referring still to FIG. 9, first user 89*b* may select the green button 120*b* a second time to release first field 210 which would cause the system to revert back to the state shown in FIG. 8 where no content is shared on display 18*a* and where the option to share is again presented in the form of yellow first button 120*b* shown in FIG. 8.

Referring still to FIG. 9, eventually second user 89*f* arrives proximate table assembly 12 and is sensed by processor 100 using images from camera 200. Processor 100 automatically identifies an optimal user station based on rules of thumb to suggest to second user 89*f*. Again, the optimal station for a second user where the first user is located at station 60*b* may be directly across from the first user at station 60*f*. Processor 100 illuminates station 60*f* to guide second user 89*f* to that station for use. Again, the second user may be free to take any open user station along the edge of tabletop 26 despite guidance to use statin 60*f*.

Upon assuming a position at station 60*f*, second user 89*f* performs some wireless association process to wirelessly link her laptop source device to system 100 and more specifically to station 60*f* so that indicator bars 70*f*, 72*f* and 74*f* and the station interface 76*f* are associated with the second user 89*f*'s laptop device. For instance, the NFC sensor device (e.g., see again 80 in FIG. 3) at station 60*f* may sense the user's laptop or other portable computing device on the portion of tabletop surface 26 at station 60*f* and may automatically wirelessly associate with the user's device. In an alternative embodiment, an initial association may be automatic resulting in an invitation transmitted to the user's device to log into the system to create a coupling association for content sharing and state indication between the user's device and station 60*f* affordances.

Once the second user's source device is linked to or associated with station 60*f*, system processor 100 changes the color of indicator bars 70*f*, 72*f* and 74*f* from red to yellow to indicate that sharing has been enabled for the second user but that the second user 89*f*'s source device is not currently sharing content. In addition, interface 76*f* at station 60*f* is illuminated so that first and second control buttons 120*f* and 122*f* are green and yellow to indicate that the first user 89*b* is currently sharing content in field 210 on display 18*a* and that the second user 89*f* can select the second button 122*f* to add a content sharing field on display 18*a*.

Figure 11:
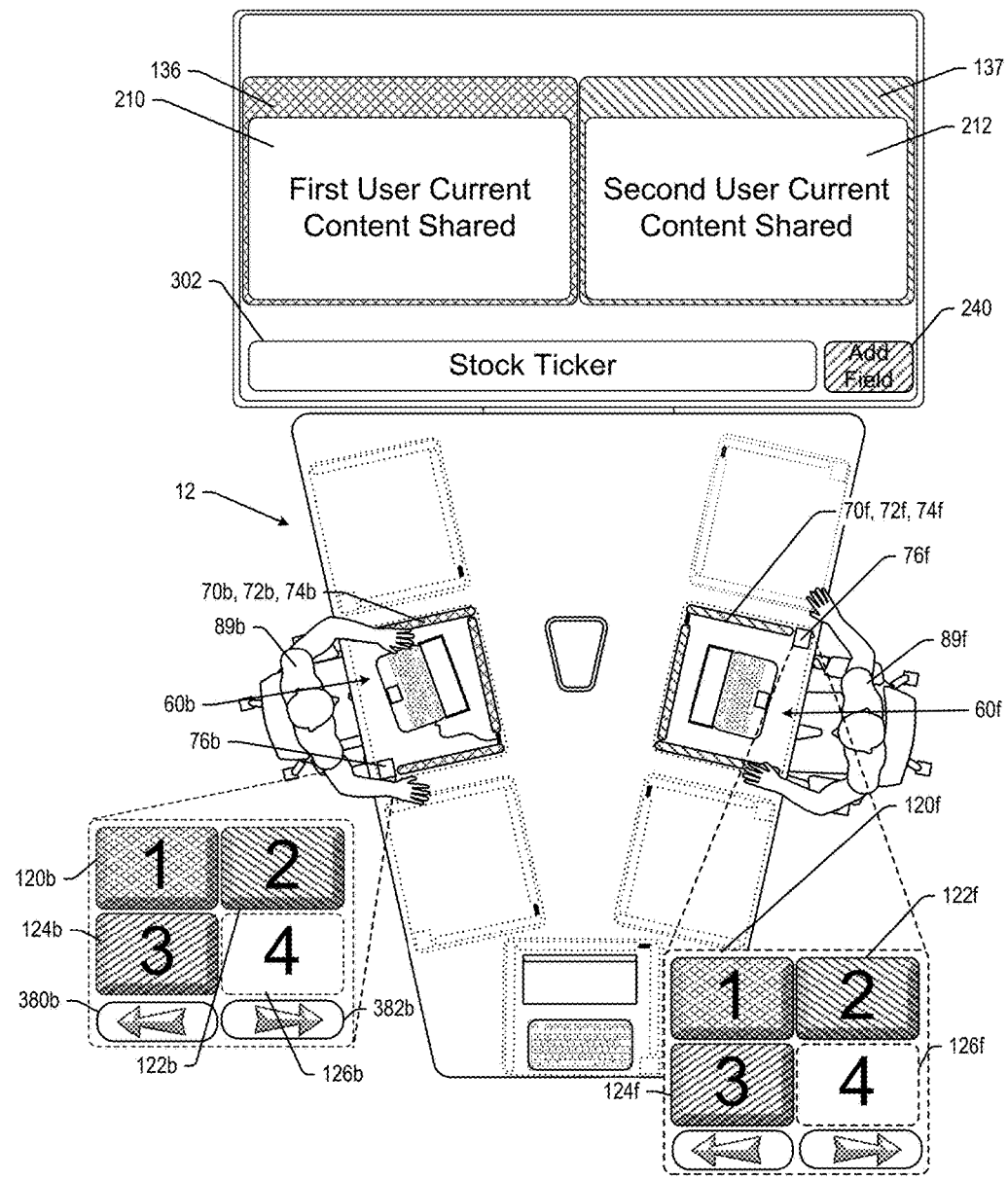
FIG. 11 is similar to FIG. 7, albeit showing the system in a different operating state.

Referring now to FIG. 11, with first user 89*b* persistently sharing content in field 210, second user 89*f* selects the second button 122*f* at station 60*f* to add a second sharing window 212 to display 18*a* and to share her desktop image in the second field 212. In addition to opening second sharing field 212, selection of second control button 122*f* causes processor 100 to change the color of the indicator bars 70*f*, 72*f* and 74*f* as well as the second button 122*f* from yellow (e.g., sharing enabled but no instantaneous sharing) to blue (e.g., left down to right hatched where blue is the color assigned to the second user 89*f*) to indicate that second user 89*f* is now sharing content and to clearly present the color associated with second user 89*f* for first user 89*b* and any other users proximate assembly 12 to see. Moreover, the circumscribing frame 137 about field 212 is also colored blue to associate the content in field 212 with second user 89*f* as indicated by indicator bars 70*f*, 72*f* and 74*f*. Furthermore, the appearance of at least a subset of the control buttons at station 60*b* used by first user 89*b* are also automatically altered to reflect the new content sharing state of the overall system 10. In this regard, see that buttons 120*b*, 122*b* and 124*b* are illuminated green, blue and yellow to indicate first user control of field 210, second user control of field 212 and that the first user 89*b* can open a third sharing field on display 18*a*, respectively.

Referring yet again to FIG. 11, at the illustrated point in time, first user 89*b* has the options to select green button 120*b* to remove field 210 and her desktop image from display 18*a*, select the blue button 122*b* to replace second user 89*f*'s content in field 212 with the first user's desktop image and select the yellow button 124*b* to open a third field (not illustrated in FIG. 11) for replicating the content from first field 210. Similarly second user 89*f* has the options to select green button 120*f* to replace first user 89*b*'s content in field 210 with the second user's desktop image, select blue button 122*f* to remove field 212 and her desktop image from display 18*a*, and select the yellow button 124*f* to open a third field (not illustrated in FIG. 11) for replicating the content from second field 212.

Referring now to FIG. 12, eventually third user 89*d* moves into a zone associated with table assembly 12 and, after being encouraged to assume a position at a specific user station, obtains a keyboard and assumes a position at station 60*d*. Third user 89*d* uses keyboard 44*a* to log into the system and access her application programs, documents, files, multi-media materials, etc. Upon entering a user name and password, third user 89*d* is linked for content sharing to system 10 via keyboard 44*a* and display 40 and the third user's ability to share content via system 10 is initially indicated. In this regard, while not shown, upon initial linking and association with station 60*d*, the bar indicators 70*d*, 72*d* and 74*d* would be illuminated yellow to indicate connection but no instantaneous sharing. In addition, after associating with station 60*d*, interface 76*d* would replicate the interfaces 76*b* and 76*f* presented to first and second users 89*b* and 89*f* as shown in FIG. 11 to indicate to the third user that first user 89*d* and second user 89*f* currently control the first and second content sharing fields 210 and 212 and that the third user can select a yellow third button to add a third sharing field and to present her instantaneous desktop image in the third field.

FIG. 12 shows a state after third user 89*d* has selected the third button 124*d* on interface 76*d* to open the third sharing field and share the third attendee's desktop. Upon selection of button 124*d* to share content, in addition to opening third field 214 on common display 18*a*, processor 100 provides the pink circumscribing frame 216 about field 214, turns the bar indicators 70*d*, 72*d* and 74*d* at station 6*d* pink to indicate the third user 89*d*'s assigned color and to indicate association between the third user 89*d* and the content shared in field 214, turns each of the third control buttons 124*b*, 124*f* and 124*d* blue to indicate third user control of the third field and illuminates each fourth button 126*b*, 126*f* and 126*d* yellow to offer the option to add a fourth shared field for content sharing.

Referring again to FIG. 12, with the system in the illustrated state, the first attendee has the options to select green button 120*b* to yield first field 210 and remove her desktop image from display 18*a*, select one or both of the blue button 122*b* and the pink button 124*b* to replace the second user 89*f*'s desktop image and the third user 89*d*'s desktop image with the first user's desktop image, or to select fourth yellow button 126*b* to open a fourth sharing field and to replicate the first user's desktop image in the fourth field. The second and third users 89*f* and 89*d* have a similar four options. Again, FIG. 13 shows the state of system 10 if first user 89*b* selects the first green button 120*b* to yield field 210.

In still other embodiments it is contemplated that different tabletop shapes and different numbers of common display screens may be provided as part of an overall content sharing system. For instance, see FIG. 14 that shows another system embodiment including a table assembly represented by top member 150, first and second common display screens or displays 18*a* and 18*b* and a plurality of task chairs to support local system users. Although not shown, the system in FIG. 14 would also include components similar to those described above with respect to FIG. 6. Tabletop 150 includes straight short and parallel first and second end edges 260 and 262 and first and second lateral edges 262 and 266 that each include two straight side edge sections that form a convex outward shape between the two end edge portions 260 and 262. Twelve user stations are located along the lateral edges as illustrated where only one user station 60*b* is labelled. The first and second display 18*a* and 18*b* are arranged along the short end edges 260 and 262, respectively, to face each other and generally face the space above tabletop 150.

Figure 14:
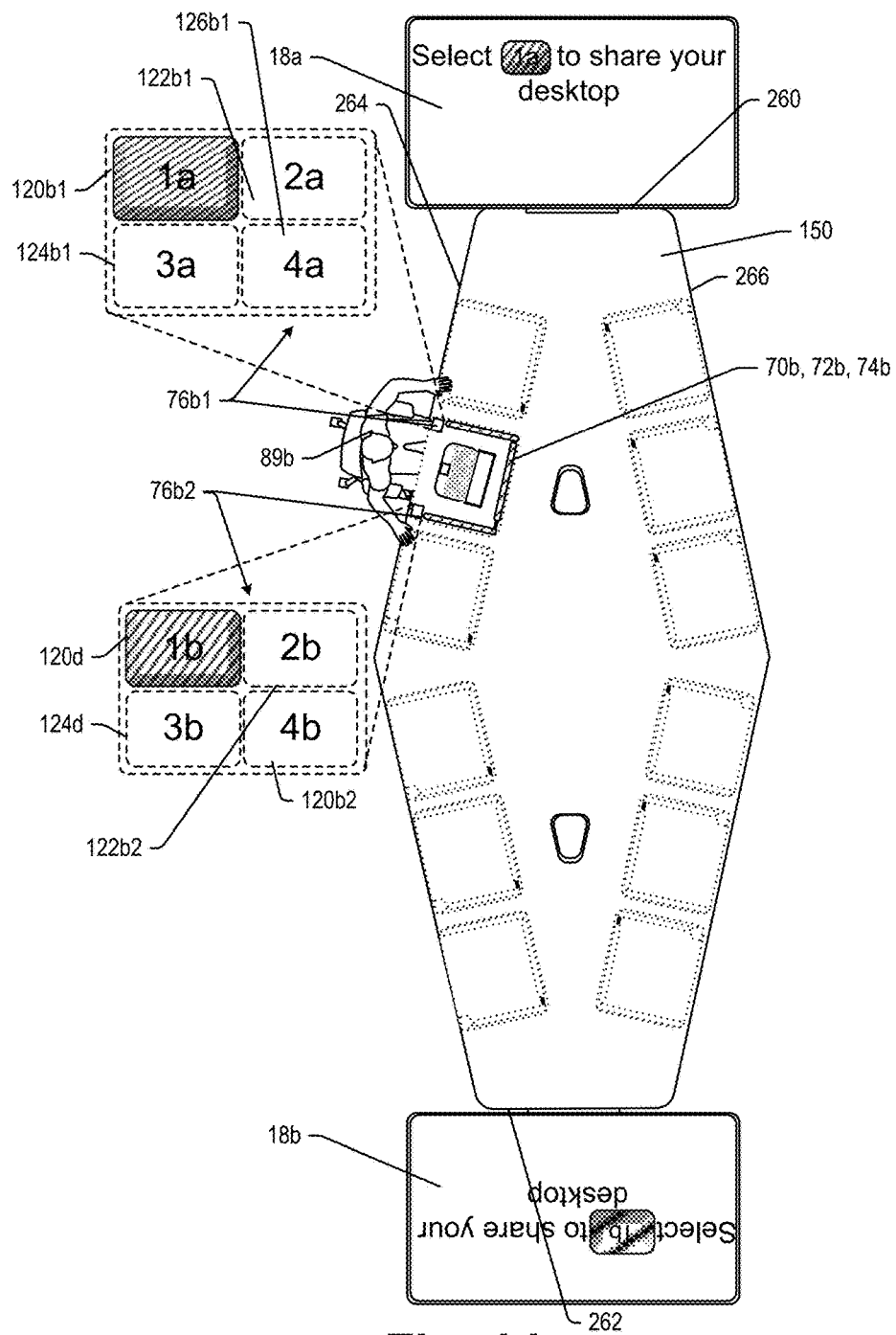
FIG. 14 is similar to FIG. 7, albeit showing a system with a larger tabletop assembly and a second display screen opposite a first.

Referring still to FIG. 14, each of the user stations at table assembly 150 is similar and operated in a similar fashion and therefore, in the interest of simplifying this explanation, only station 60*b* will be described here in any detail. Station 60*b* in FIG. 14 is similar to station 60*b* described above with respect to FIG. 3 with one exception. In at least some embodiments that include more than one sharable display screen 18*a*, 18*b*, a separate control interface may be provided for each of the common displays. In this regard, see that station 60*b* includes first interface 76*b*1 and second interface 76*b*2 arranged on opposite sides of the station, the first interface 76*b*1 on the same side as display 18*a* controllable thereby and the second interface 76*b*2 on the same side as display 18*b* controllable thereby. In its illustrated state, no common content is presented on either of the first or second displays 18*a* and 18*b* and therefore, the only button illuminated on each of the displays is a yellow button 120*b*1 and 120*b*2 offering the user the options to present content on either display. Here, the first user may select one or both buttons 120*b*1 and 120*b*2 to present her desktop on either the first or second or both displays 18*a* and 18*b*. Similar dual interfaces at each user station where the interfaces are generally positioned in an intuitive location with respect to associated common sharing displays are contemplated.

Referring again to FIG. 6, in particularly advantageous embodiments switching device 104 includes some type of programmable video processing device as opposed to a pure hardware based switching device. One particularly advantageous and currently available programmable video processing device includes a field programmable gate array (FPGA) switching device. While other types of programmable switching devices are contemplated, unless indicated otherwise, hereafter the switching device 104 will be referred to as an FPGA in the interest of simplifying this explanation. Exemplary FPGA switching devices that may be used with system 10 include devices manufactured by Black Magic Design PTY. LTD., a company based in Australia. The advantage of an FPGA device is that the device can be configured and reconfigured after manufacture and hence, in the "field" after deployment. In short, an FPGA switching device includes an array of programmable logic blocks and a hierarchy of reconfigurable interconnects that allow the blocks to be wired together similar to the way digital logic gates can be inter-wired in different configurations. FPGA device 104 is linked to the system processor or computer 100 which is in turn linked to the internet or other network 110.

One advantage associated with the FPGA switching device 104 is that the device can be delivered to an installation site and then, based on specific characteristics of a system 10 being configured, the switching device 104 can be programmed in the field to support different system requirements. For instance, a specific FPGA switching device 104 may be configured to drive either the FIG. 1 system or the FIG. 14 system despite each system supporting different numbers of user stations.

Another advantage associated with FPGA devices is that the devices can be reconfigured after installation. For instance, in FIG. 1 an initial installation may only include table assembly 12 and, thereafter, the additional side table 190 may be added to system 10 to allow an additional user device linkage. In this case, an originally installed FPGA switching device 104 may be reconfigured to add the additional input and switching functionality to support side table assembly 190.

One other advantage associated with FPGA devices is that those devices can be programmed and reprogrammed remotely. To this end, referring again to FIG. 6, a remote computer 300 can be linked via the internet or some other network device 110 to the system processor 100 and in turn to FPGA switching device 104 for troubleshooting any system 10 malfunctions or for reconfiguring to support additional or less functionality.

Yet one other advantage associated with FGPA devices is that those devices typically have more capability than required for a content sharing system like those contemplated here and therefore an FPGA device has built in redundant capabilities so that, if a switching path through the FPGA device 104 fails for some reason, the switching device can typically be reconfigured to provide the failed functionality via some other device path.

One other advantage to an FPGA device 104 is that new devices have the ability to be programmed to soften graphic effects that occur when video sources are switched or output video is reconfigured. For instance, instead of simply replacing one video input from a first user source device with a second input from a second user source device, at least some FPGAs can be programmed to have special replacement effects like having a first input video move off to the right on a common display and a second input video move on to the common display from the left. As another instance, the first video input may fade to dark and then the second video input may fade from dark to on to replace the first user input with the second user input. Many other switching graphics effects are contemplated.

Referring yet again to FIG. 6, dedicated system processor or computer 100 can be used within system 10 in several different ways. In addition to receiving control commands from user interfaces, controlling switching device 104, providing user output via interface or state indicating devices, facilitating network linkage and operating as a surrogate to support users that do not have personal portable computing devices to link to system 10, computer 100 may also operate as a data feed to switching device 104 to provide a content feed as suggested above. Here, again, the content feed may include any data feed of interest including a running news feed, an instructional video or commercial associated with system 10, a company news feed, etc.

In addition, in at least some embodiments, computer 100 may be programmed to operate along with switching device 104 to combine two or more input videos to effectively overlap one input on another thereby adding decorative or functional graphics on a common display to present a richer and more detailed content sharing experience. For instance, referring again to FIG. 11, in at least some embodiments, the circumscribing boarder frames 136, 137, etc., may be generated by providing the frame graphics as a separate input to FPGA switching device 104 which then presents those graphics as an overlay over the content field including user shared content. Here, the computer may also receive information regarding which user is presenting in each field and may provide a name or other indicator within the borders for each field to indicate current control. When control switches from one source to another, the computer may present an indicator overlay indicating who is taking control of a presentation field (e.g., the indicator overlay may fade on and then off for 4 seconds to indicate the new controlling source or associated attendee). As another example, a stock ticker or other data feed as seen at 302 in FIG. 11 may be added as an overlay to shared content in common display fields. The overlay may also include borders or other display screen artifacts that define the output interface such as a toolbar. Many other graphics and content based overlays and combinations with shared user content are contemplated. Computer 100 may also operate as a link to a telepresence system to receive one or more live video feeds of remote meeting participants and feed that video to one or more fields on common display 18a. In addition, it may be possible for dedicated computer 100 to receive control commands from a dedicated system mouse or other input interface device to recognize at least a subset of content control commands.

Figure 15:
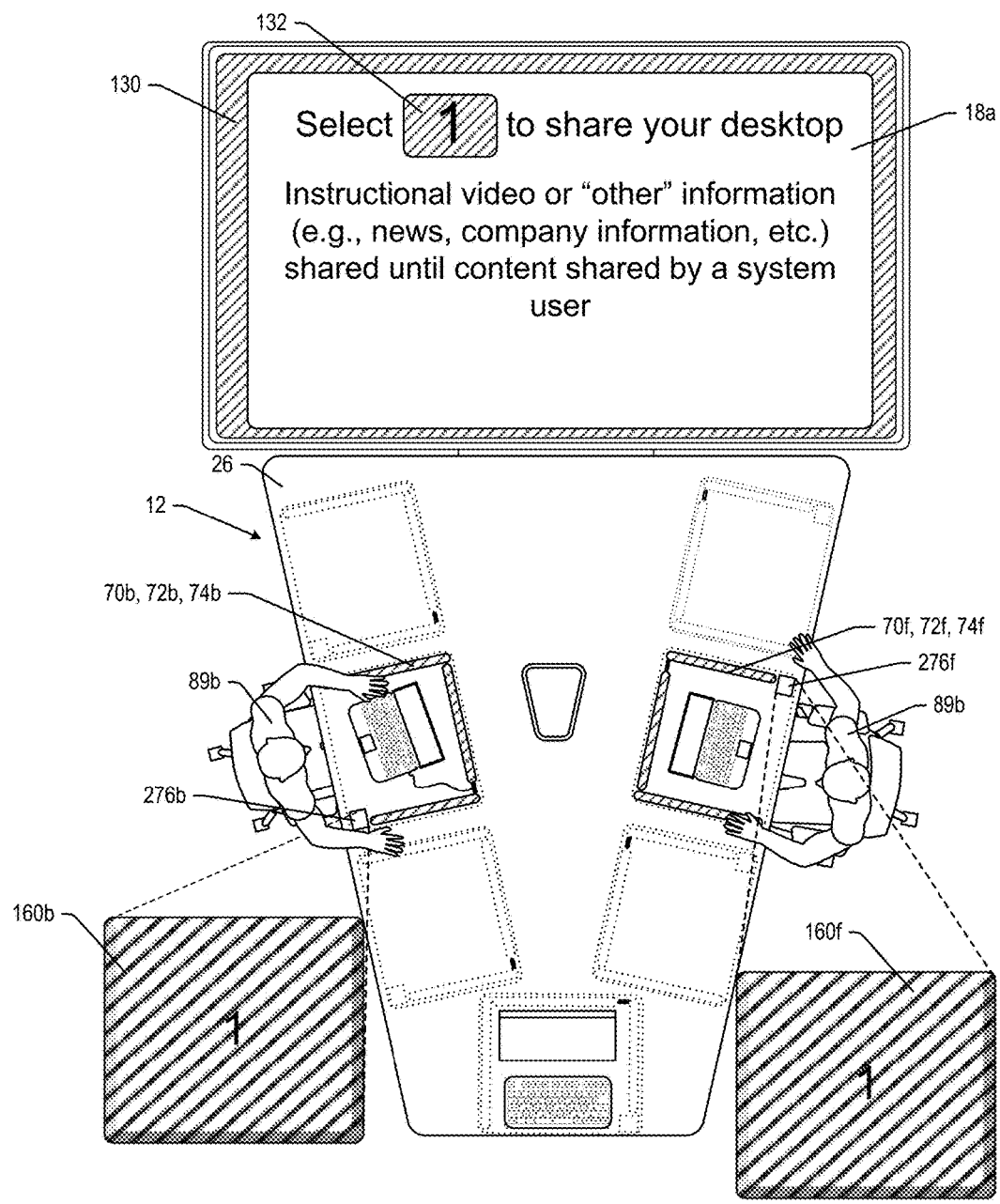
FIG. 15 is similar to FIG. 7, albeit including an emissive surface interface at east user station about a tabletop member.

In still other embodiments other interface assemblies that are integrated into a tabletop are contemplated. For instance, instead of having integrated illuminated buttons like interfaces 76b, 76f, etc., in other embodiments each interface may include a dedicated touch sensitive flat panel display having a top surface that is flush with the tabletop surface. To this end, see FIG. 15 where the illuminated button type interfaces described above have been replaced by touch screen 276b, 276f, etc. In this case, because interfaces 276b, 276f, etc., are graphic and fully controllable, the sharing options can be reflected in a more elegant way. For example, at a time when no content is shared as in FIG. 15, in at least some cases, the entire touch surface of each interface may present a single selectable yellow button inviting each user to share content. Here, if first user 89b shares content, each touch interface 276b and 276f is modified to include two buttons, a first colored green to indicate that first user 89b is controlling the instantaneously shared content and a second colored yellow that is selectable to open a second sharing field and to share content in the second field automatically. To this end see the interfaces 276b and 276f in FIG. 16.

Other content control features may also be available via the integrated interface devices 276b such as, ability to zoom in and out on shared content in one of the common fields, ability to annotate content, ability to store specific content for persistent association with a specific session or project, etc. None of the tools required to support these functions are shown in the figures but each would be provided as virtual control buttons and tools in at least some embodiments.

In addition to enabling more elegant control interfaces with the functionality described above, display screen type interfaces like 276b can be used to facilitate more complex content sharing features and functions. For example, in at least some cases it is contemplated that a single user may want to share a first content set in a common display field but may want to access other content via her portable computing source device. Thus, for instance, referring again to FIG. 16, while first user 89b is sharing content in field 210, first user 89b may want to access and use or preview other content on her portable laptop 290.

To facilitate sharing a first content set while previewing or otherwise accessing a second content set, in at least some cases system processor 100 may be programmed to present additional "persistent" sharing options via the graphic touch sensitive interfaces 276b, 276f, etc., to a user whenever the user shares content. In some embodiments, two different types of persistent content sharing are contemplated including persistent desktop image sharing and persistent application sharing. In the case of persistent image sharing, a user may decide to freeze an instantaneous image of the user's desktop in a common sharing field. In this case, while the selected image is frozen in the common field, the user may use her desktop to perform any other process including modifying the frozen image on her computer, accessing other images, documents, etc., running any application programs, to access the internet or some other communication network or database, etc. In these cases, because the shared image is frozen, as the user accesses other content on her laptop, the image in the shared field remains unchanged until replaced by any user that selects the field occupied by the frozen image to share other content or until some other user takes control of the field in which the shared image is presented. Thus, for instance, if a user freezes the output of a video application while the application is instantaneously presenting a video, while the video will continue to progress on the user's laptop, once the user freezes the common field image, the video output remains frozen in the common field as a still image until the field is closed out or the image is replaced by other content.

In the case of persistent application sharing, a user may decide to cause her instantaneous desktop to "persist" in a common display field while the user accesses other content via her portable source device 290. Here, the term "persist" means that all applications or other dynamic content that comprises the user's instantaneous desktop remains active and operational even as the user that shared the persistent desktop accesses other content or runs other applications on her device 290. Thus, for instance, if a video application is present on a user's desktop and is showing a first video when that user causes her desktop to persist, the video application and instantaneous video presented thereby would remain in the common sharing field even if the user opens and maximizes a word processor application on her laptop device 290.

In the case of a persistent desktop, in at least some cases, any application providing output to a user's desktop when the desktop persist option is selected may continue to operate on the user's portable source device to generate persistent output to system switching device 104 even if the user minimizes or even closes out the application on her portable source device 290. Thus, for instance, in the above example, if first user 89b is running a video program to generate a video when a desktop persist option is selected, that application may continue to run on first user 89b's source device 290 to drive the common sharing field 210 despite first user 89b minimizing or even closing out the video application on her device. In effect, the video application in this example simply continues to operate in the background on device 290 even though the first user may be unaware of its operation.

In other cases, the system processor or computer 100 (see again FIG. 6) may have access to one or several common application programs stored in memory 102 so that processor 100 can run at least some applications to provide output to drive the common display fields when a user selects a desktop persist option. In these cases, when a user selects a persist option while an application program is running to generate content for the user's desktop, instead of the user's portable source device persistently running the application in the background, content associated with the application (e.g., a video file) may be transmitted from the source device to system memory 102 and may be used to drive the application program operating on system computer 100. The file transfer may happen immediately upon a user running the file in a source device application so that if the user selects the desktop persist option, the application program on the system computer 100 is ready to go. In the alternative, file transfer may occur upon selection of an application freeze option.

Figure 16:
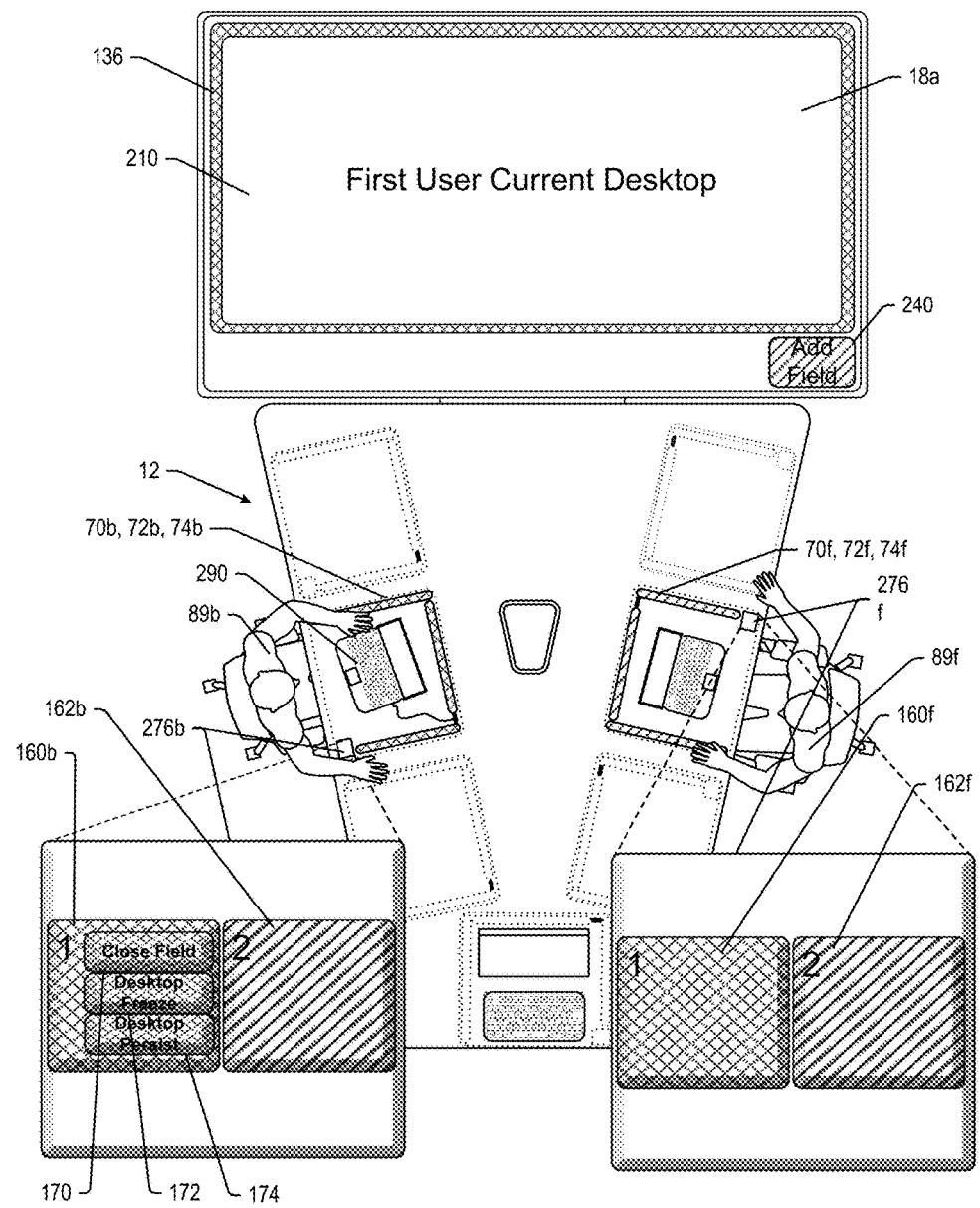
FIG. 16 is similar to FIG. 15, albeit including an emissive surface interface at east user station about a tabletop member.

Referring now to FIG. 16, high definition touch panel emissive surface or display interfaces 276b and 276f are shown where first user 89b is sharing content in common field 210, where indicator bars 70b, 72b and 74b are green to indicate content sharing as well as to present the color associated with first user 89b and where the circumscribing frame 136 and first selectable control buttons 160b and 160f on each of the interfaces 276b and 276f are also colored green to indicate who (e.g., the first user 89b) is currently sharing content in field 210. Each interface 276b and 276f also includes a second selectable control button 162b and 162f colored yellow offering the option to open a second sharing field on display 18a.

In cases where interfaces include high definition emissive surfaces (e.g., 276b in FIG. 15), in at least some cases the interface will be used to support many different space and affordance capabilities in addition to the content sharing capabilities described in this specification. For instance, in some cases lighting, space HVAC, space audio systems and other capabilities may be controllable via interface 276b by accessing other application programs. In some cases at least some of those other capabilities and systems may be tied to the content sharing system so that affordances associated therewith are controlled automatically in concert with the content sharing system. For instance, in some cases ambient light devices mounted to a ceiling, in walls, etc., may be linked to the content sharing system and automatically controlled by the system processor or server to adjust lighting effects based on content sharing states. For example, initially ambient lighting may be bright to help users move about in a space associated with a configuration 10 and, once users are seated as sensed by a space camera or the like, the lighting about the periphery of the space may be dimmed to help users focus on shared content. In this case, when a user gets up from a seated position during a content sharing session for some reason, the ambient peripheral light devices may be fully lit to light the user's path within the space. Other simultaneous and scripted ambient control schemes are contemplated.

Another application that may be supported by interfaces 276b and that may be integrated with the content sharing system is a content preview application that enables a user to view content on a smaller semi-private scale prior to sharing in one of the common large content sharing fields. In at least some cases it is envisioned that if a first user shares a multi-slide presentation (e.g., a Power Point presentation) via one of the common display fields (see 210 in FIG. 11), an instance of the full presentation file may be accessible to any other user via her interface 276b so that the users can move backward and forward in the full presentation to review preceding slides and preview subsequent slides. In other cases it is contemplated that the system processor may maintain a content queue as well as a content history for content to be shared and content previously shared during a session or in conjunction with a specific project and that information may be accessible via interface devices 276*b* in some fashion.

Other applications that may be supported by the emissive surface interfaces 276*b* include personal notification applications like e-mail, texts, schedule reminders (e.g., next meeting in 5 minutes), current session schedule prompts (e.g., 5 minutes left until the end of current meeting, offers to extend current session periods, etc.). Yet other applications like voting applications, fitness applications, session effectiveness guidance, personal assistant, etc., may further be supported by the emissive surface interfaces. Still one other application type may be one that enables users to control personal or group privacy settings that are managed and controlled by some other system.

One other application that may be accessed and controlled via interfaces 276*b*, etc., include a Skype or other telepresence type application program which may enable telepresence video in addition to content sharing so that remote user's that link into the system 10 can have a video presence at the table 12.

In addition, consistent with the discussion above, because first user 89*b* is sharing content in field 210, interface 276*b* presents other control options for controlling the shared content including a "Close Field" option 170, a "Desktop Freeze" option 172 and a "Desktop Persist" option 174. Here, to close out field 210 and remove the first user's desktop image therefrom, first user 89*b* can select Close Field button 170 at which point the system 10 state would revert back to the state shown in FIG. 15.

Referring still to FIG. 16, if first user 89*b* selects Desktop Freeze button 172, the instantaneous content or image in field 210 freezes and first user 89*b* is able to use any application program or to access any other content on her laptop device 290 without having her instantaneous desktop presented on common surface 18*a*. Thus, once Desktop Freeze button 172 is selected, first user 89*b* can use her computer 290 for any purpose including previewing other content that the first user may want to share.

If first user 89*b* selects Desktop Persist button 174, the application operating in field 210 persists and continues to operate and first user 89*b* is able to use any application program or to access any other content on her laptop device 290 without having her instantaneous desktop replicated on common surface 18*a*.

Upon first user 89*b* freezing her desktop or selecting a desktop persist option, the control options presented via first user interface 276*b* are changed to reflect a different option set and include a "Close Field" option 180 and a "Replicate Desktop" option 182. Close Field option 180 is selectable to close out associated field 210 to effectively remove the first user's frozen image from display 18*a* and to allow second field 220 to be expanded to cover most of the display 18*a* surface. Replicate Desktop option 182 is selectable to re-associate the first user's instantaneous desktop image on device 290 with first field 210 so that the user's instantaneous and dynamic desktop is again replicated in field 210.

Figure 17:
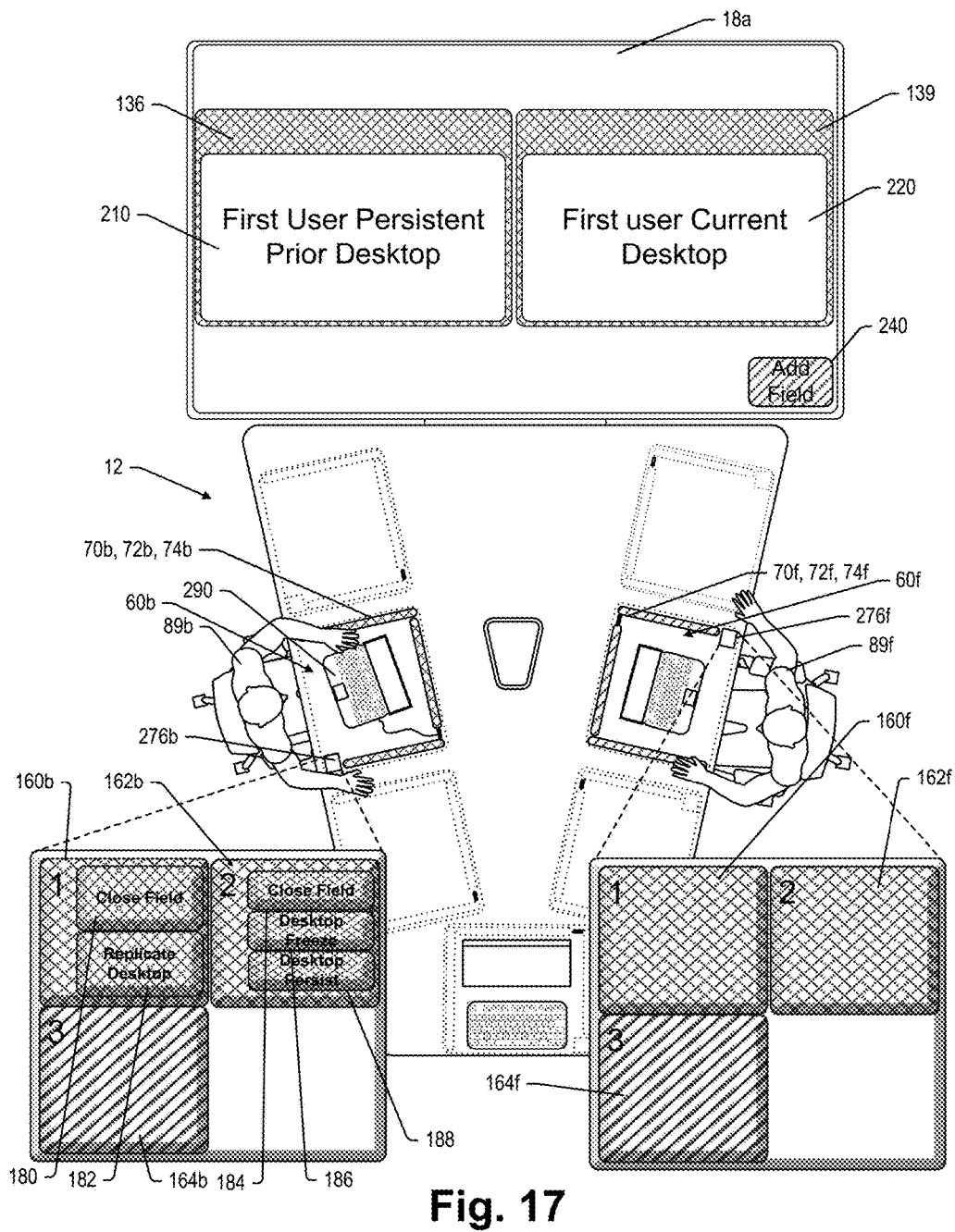
FIG. 17 is similar to FIG. 15, albeit including an emissive surface interface at east user station about a tabletop member.

In at least some cases a single user may be able to share two, three, or more independent content outputs (e.g., images, files, application output, etc.) from her portable source device simultaneously. To this end, in FIG. 16, after first user 89*b* freezes an initial content set in field 210, yellow second control button 162*b* offers first user 89*b* the option to open a second sharing field in which instantaneous content from the first user's device 290 can be presented. Upon selecting second button 162*b*, as shown in FIG. 17, second sharing field 220 is opened and first user 89*b*'s instantaneous or current desktop image on device 290 is replicated in field 220. In addition, to clearly indicate which user is sharing content in field 220, frame 139 and second control buttons 162*b* and 162*f* are illuminated green to match first user 89*b*'s assigned color as presented by indicator bars 70*b*, 72*b* and 74*b*. In addition, third control buttons 164*b* and 164*f*, both colored yellow, are presented at user stations 60*b* and 60*f* offering the option to each of users 89*b* and 89*f* to open a third sharing field on display 18*a*. Furthermore, because first user 89*b* is now sharing content in second field 220, interface 278*b* provides Close Field, Desktop Freeze and Desktop Persist options 184, 186 and 188 that operate as described above in the context of options 170, 172 and 174.

Referring still to FIG. 17, in the illustrated operating state where first user 89*b* has selected a prior desktop persist option so that a prior desktop is presented in field 210 and is sharing her instantaneous desktop in field 220, first user 89*b* has several options including closing out first field 210 (se button 180), replicating her instantaneous desktop image a second time in field 210 (se button 182), closing out second field 220 (see button 184), freezing the second field instantaneous desktop (see button 186), causing the instantaneous desktop in field 220 to persist (see button 188), and opening a third sharing field via selection of button 164*b*.

Figure 18:
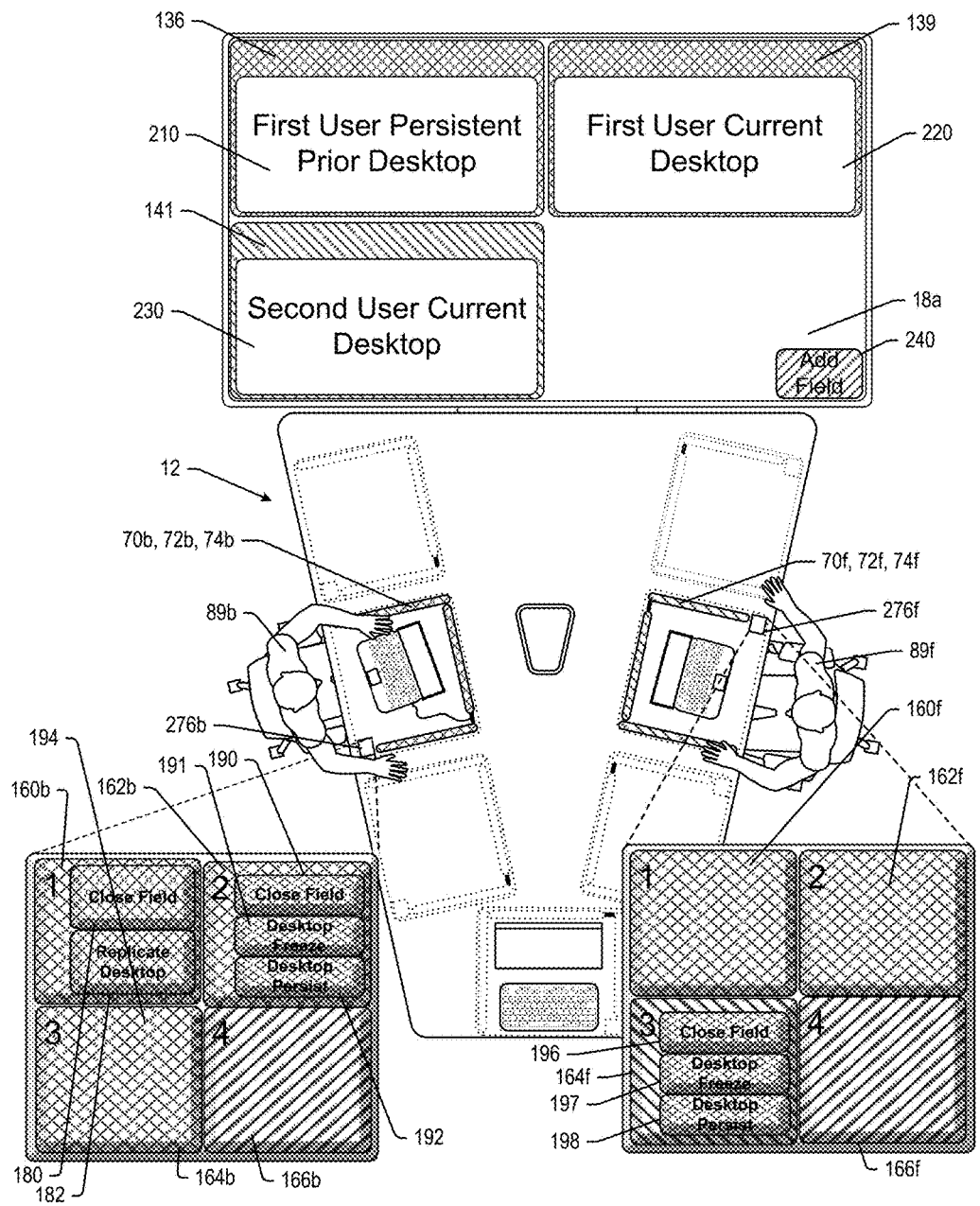
FIG. 18 is similar to FIG. 15, albeit including an emissive surface interface at east user station about a tabletop member.

While not shown as sharing content in FIG. 17, second user 89*f* has the options to select either of buttons 160*f* or 162*f* to take control of associated fields 210 and 220 or to select yellow button 164*f* to open a third sharing field. FIG. 18 shows the system state if user 89*f* selects third control button 164*f*. In FIG. 18, third sharing field 230 is opened and presents the second user 89*f*'s instantaneous desktop. System processor 100 provides a blue (e.g., left down to right hatched) frame 141 about third field 230 and also illuminates third control buttons 164*b* and 164*f* blue to match indicator bars 70*f*, 72*f* and 74*f* at the second user 89*f*'s station. Yellow fourth buttons 166*b* and 166*f* are provided at least interface 276*b* and 276*f* that are selectable to open fourth sharing fields on display 18*a*. Because second user 89*f* is now sharing her desktop in field 230, Close Field, Desktop Freeze and Desktop Persist options 196, 197 and 198 are presented that operate in the fashion described above with respect to similarly labelled option buttons in FIG. 17.

Figure 19:
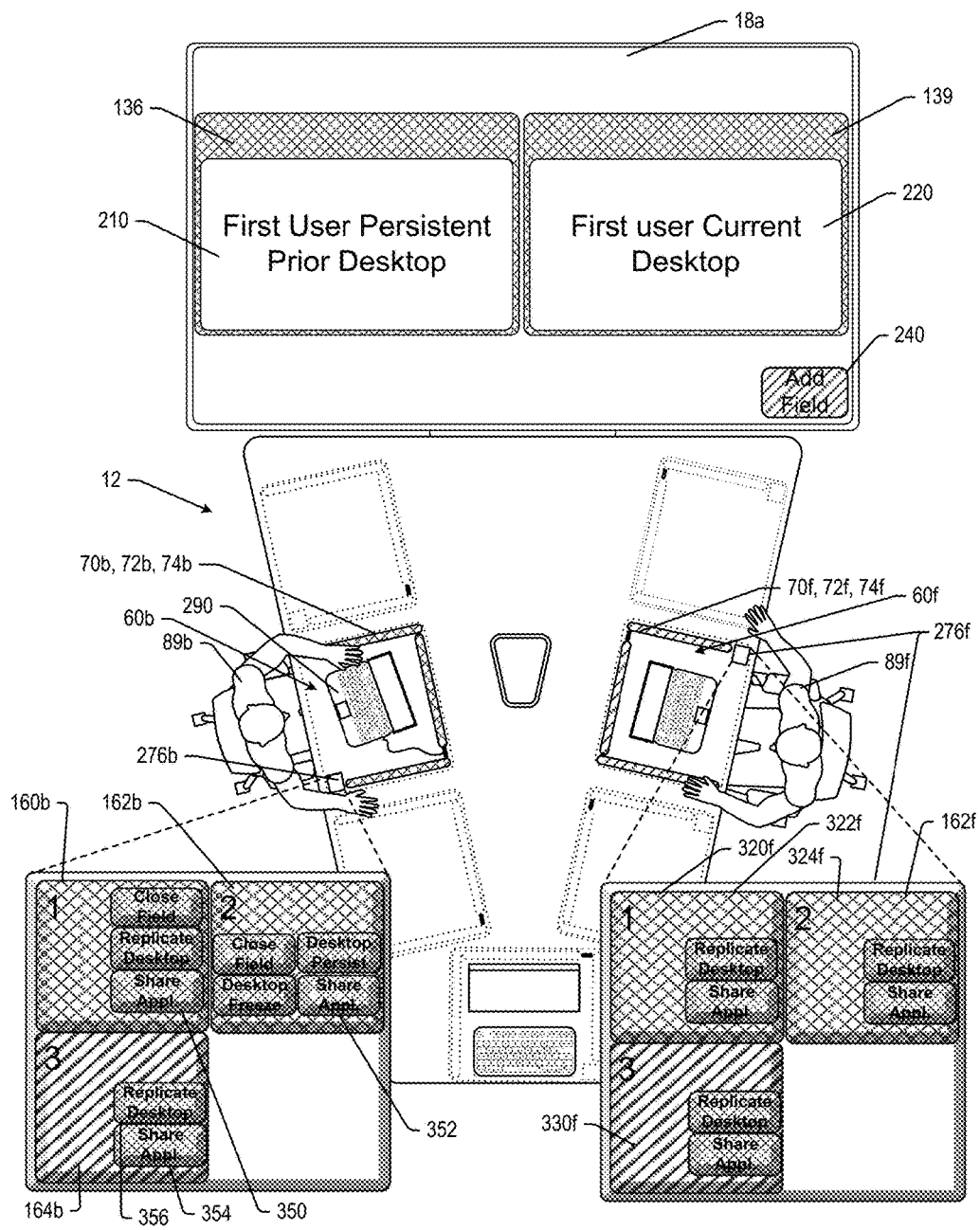
FIG. 19 is similar to FIG. 15, albeit including an emissive surface interface at east user station about a tabletop member.

Other content sharing options in addition to those described above are contemplated here. For instance, instead of sharing an entire desktop image, a system user may only want to share the output of a single application program. FIG. 19 shows exemplary interfaces 276*b* and 276*f* that enable users 89*b* and 89*f* to, in addition to the options described above, share only the output from a single application program as opposed to an entire desktop. In this regard, see that user 89*b* at station 60*b* has an additional "Share Application" option 350 associated with common field 210 which, when selected, causes the output of an instantaneously active application on user 89*b*'s source device 290 to be replicated in field 210. Similarly, first user 89*b* has other share application options at 352 and 354 for sharing output of her instantaneously active application in field 220 on display 18*a* and in a third field that opens when option 354 is selected. Interface 276*b* further presents first user 89*b* with a "Replicate Desktop" option 356 for the third field to clearly distinguish that option from the application sharing option associated with button 354. Second user 89*f* also is presented with clear Replicate Desktop and Share Application options for each of common fields 210 and 220 as well as for a third field that opens if either option associated with button 330*f* is selected.

Where a user shares an instantaneously active application in a common field, in at least some embodiments, if the user switches over to a second application on her source device so that the second application is active, the initially shared application may persist in the common field until replaced by some user or closed by the sharing user. In other cases, when an active application has been shared and the sharing user accesses a second application so that the second application is then active, the shared application in the common field may automatically be switched to the second and now currently active application. Thus, in this case, the commonly shared application would be coupled to the currently active application for the sharing user.

In at least some embodiments a single user may share two or more applications in two or more different common sharing fields on display 18*a* or may share an application in one common field and her full desktop in a second common field or may share a persistent desktop or a frozen desktop in one field and one or more separate operating applications in one or more other common fields.

In at least some cases where a persistent desktop (e.g., a desktop for which the desktop persist option has been selected) including at least one controllable application program is presented in a content sharing field (e.g., 210), system processor 100 may enable at least one system user in addition to the user that caused the desktop to persist to control any applications that appear on the persistent desktop. For instance, assume that when a desktop persist option is selected by first user 89*b*, the persistent desktop includes a maximized word processor document and application program that includes a standard set of word processor virtual control tools that are selectable to navigate through the document, modify the document, save the document, etc. In this case, in at least some embodiments, second user 89*f* may be able to operate an input device to control the word processor application from her station.

Figure 20:
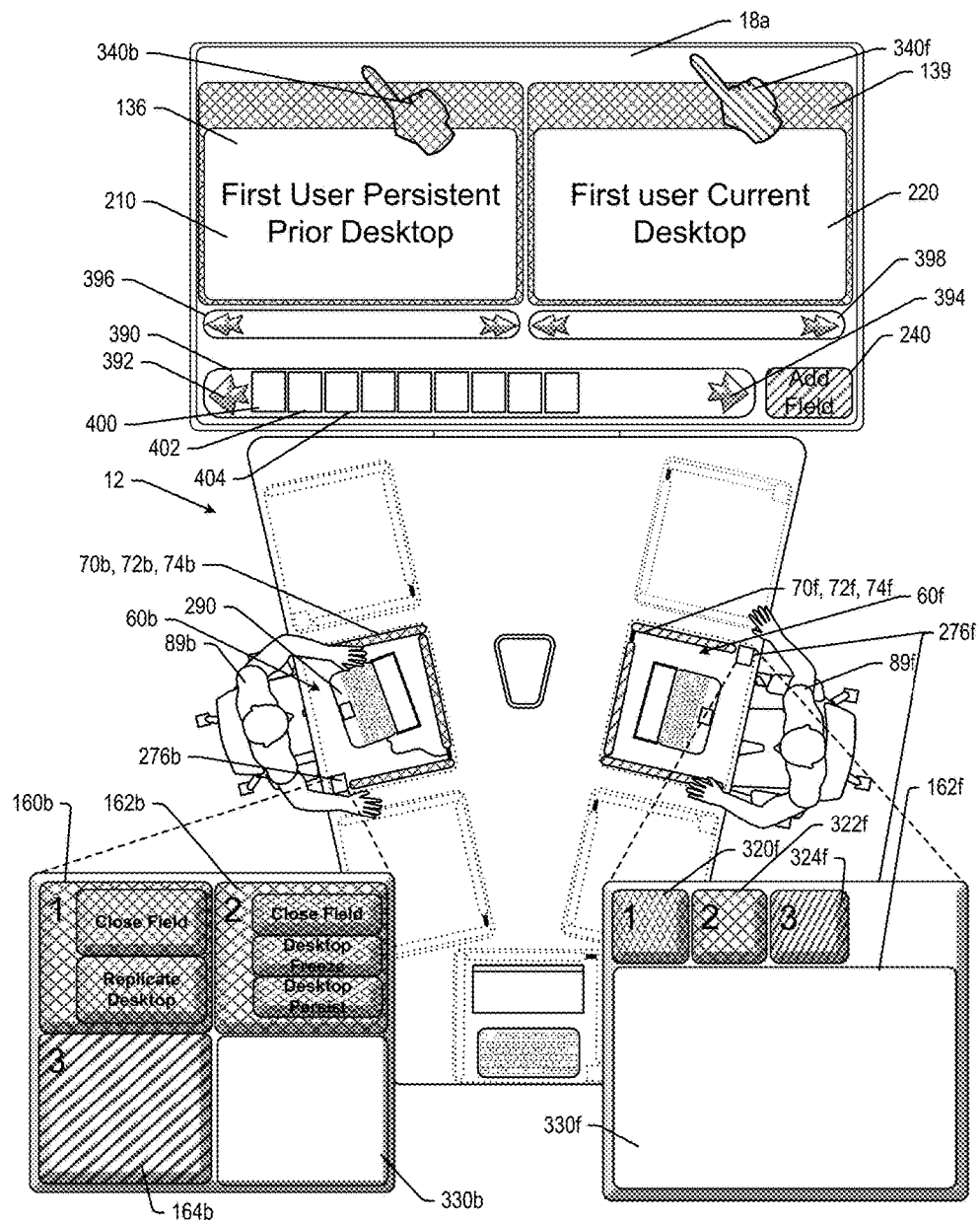
FIG. 20 is similar to FIG. 15, albeit including an emissive surface interface at east user station about a tabletop member.

FIG. 20 shows a system similar to the system described above with respect to FIGS. 15 through 18 that includes touch sensitive emissive surface interfaces 276*b*, 276*f*, etc., albeit having different control interface layouts and options. In FIG. 19, interface 276*b* is shown in a state similar to the identically labelled interface 276*b* in FIG. 17, albeit where the interface in FIG. 20 includes a touch pad area 330*b* (e.g., a dedicated and visually distinguished portion of the interface emissive surface) that can be used like a mouse device to move a first user control icon 340*b* about on the surface of display 18*a*. Similarly, interface 276*f* in FIG. 20 includes a smaller version of the field selection or control buttons at 320*f*, 322*f* and 324*f* as well as a touch pad area 330*f* for controlling a second user control icon 340*f* on display 18*a*. In FIG. 20 all of the interface control buttons that are similar to the control buttons described in other interface embodiments above operate in a fashion similar to that described above. User control icons 340*a*, 340*b*, etc., may only be presented on display 18*a* while associated touch pad areas are touched by users and for a short time thereafter (e.g., fading out after 5 seconds) so that content on display 18*a* remains relatively uncluttered.

Any of the table integrated interfaces (e.g., 76*b*, 276*b*, etc.) described above may be implemented on the display screens that comprise part of the user source devices. Thus, for instance, interface 276*b* in FIG. 18 may be presented as a hovering control tool in the upper right hand corner of first user 89*b*'s device 290. In cases where the interfaces are provided on the user device display screens, desktop replication on display 18*a* would not include the virtual interfaces on the user devices.

One other way contemplated by this application to enable content sharing is to use screen expansion techniques to enable system users to effectively expand their desktops from their personal portable devices to include at least portions of common display 18*a* or other common displays associated with a content sharing system 10. In this regard, see FIG. 21 where first and second portable user computing source devices 350 and 352 are shown at user stations 60*b* and 60*f*. Here, once a user associates her device with a specific station, it is contemplated that the user's device and system processor 100 will cooperate to effectively extend the user's device display to include at least a portion of the common display 18*a*.

Figure 21:
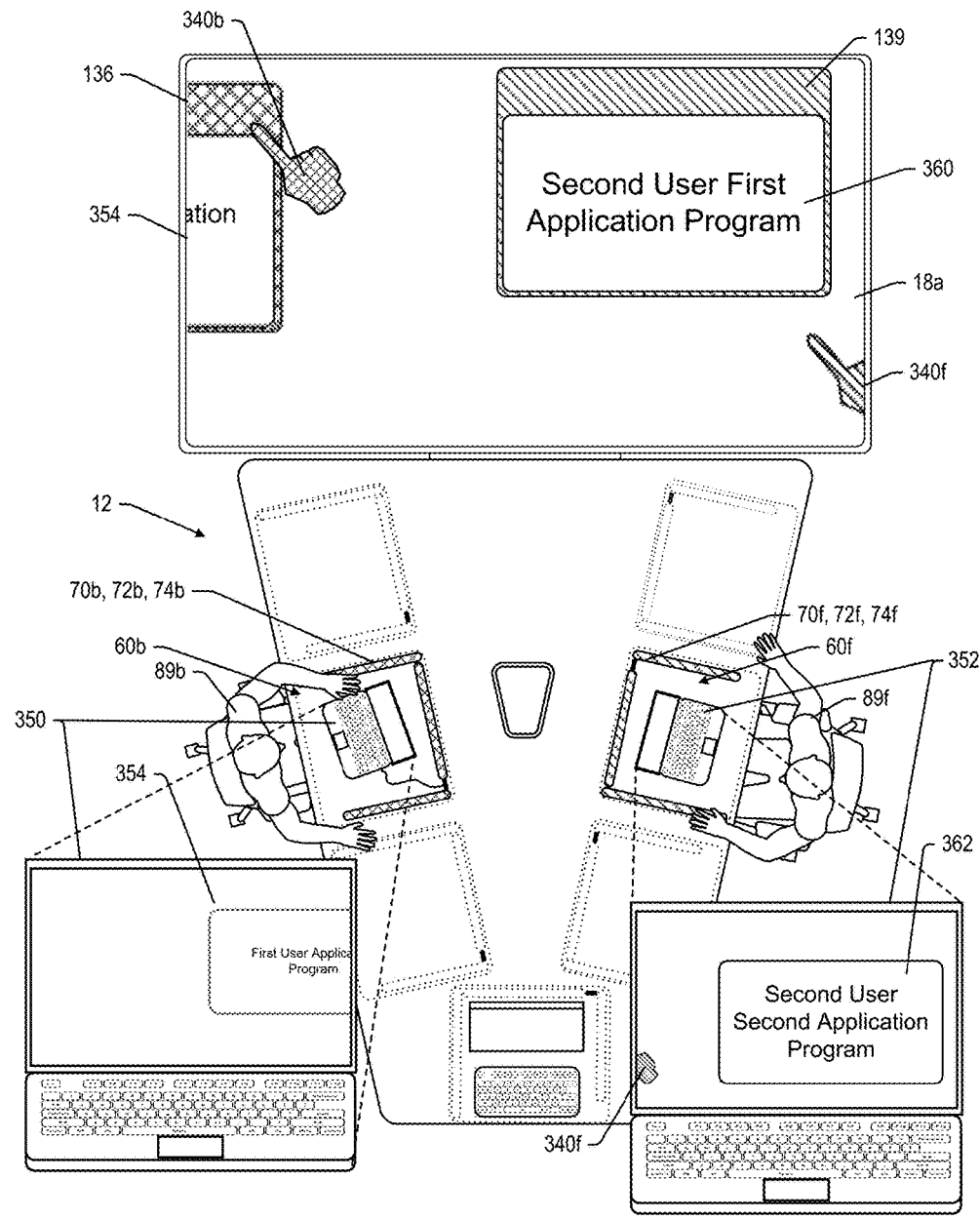
FIG. 21 is similar to FIG. 7, albeit where user's use laptop devices as opposed to integrated interfaces to control content sharing activities.

In at least some cases any content a user opens will initially be opened only on the user's portable device display and not on the common surface display 18*a*. Then, the user may be able to move content from the source 350 display to common display 18*a* by simply selecting the content via a pointing icon on the user's source device display and dragging the content off the edge of the source device display and onto common display 18*a*. In this regard, see, for instance, pointing icon 340*b* in FIG. 21 that user 89*b* used to select a window 354 on her device 350 display including a first user application program which is shown partially dragged into a location on display 18*a*. Similarly, display 18*a* shows a first application field 360 that has been dragged onto display 18*a* from the second user's device 352 and a second application window 362 that still persists on the second user's device 352 display. In FIG. 21, any time a user drags content to display 18*a*, processor 100 frames the content window with a border having the user's assigned color where that color matches the color of the light bars (e.g., 70*b*, 72*b*, 74*b*) at the user's station.

Figure 22:
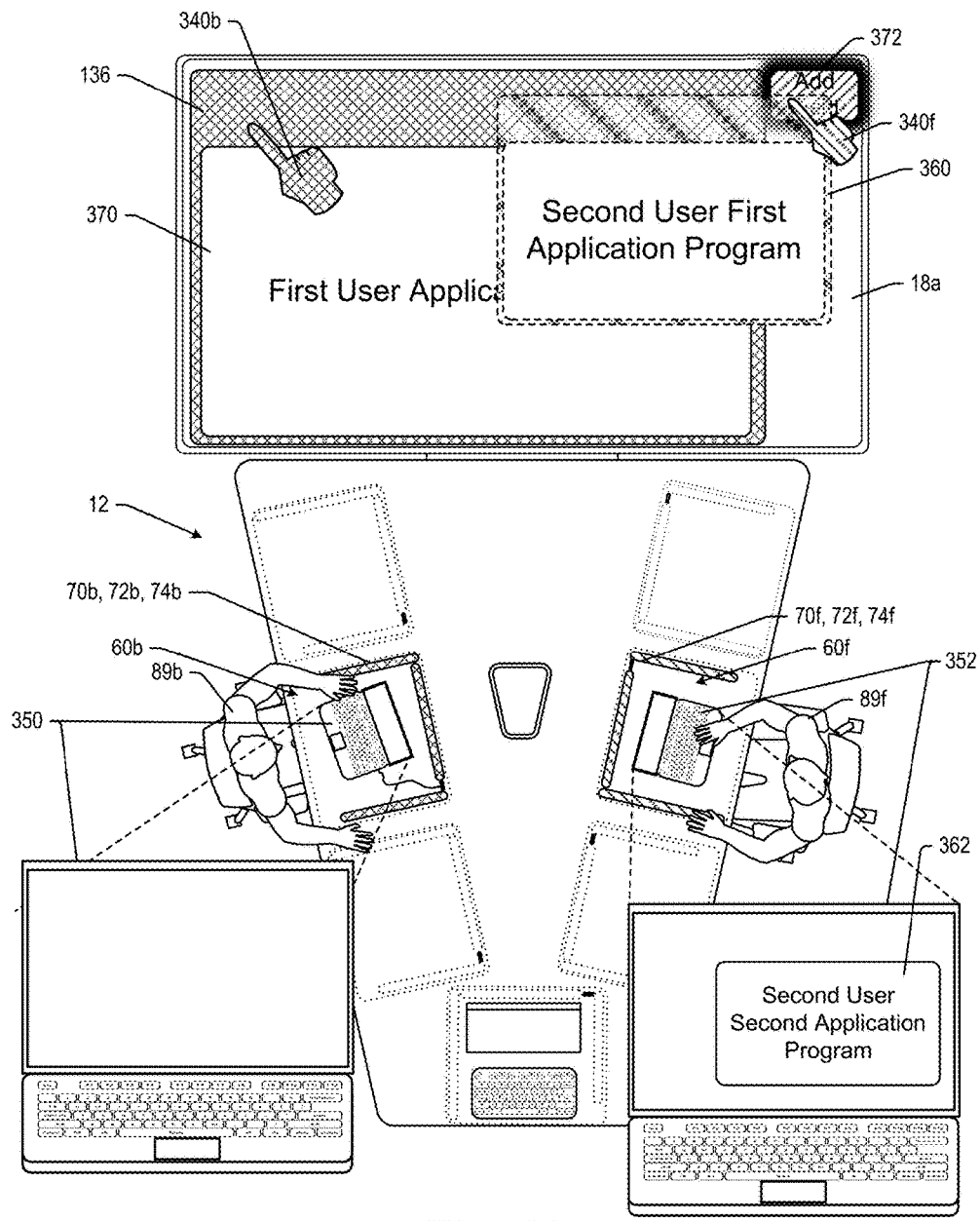
FIG. 22 is similar to FIG. 21, albeit showing a different operating state.

When a first application window is dragged from a source device to the shared common display 18*a*, while no other content is shared on display 18*a*, the dragged window and associated application may be automatically maximized on display 18*a*. While a first application window and associated application are presented on display 18*a*, if a second application window is dragged from a source device to display 18*a*, system server 100 may automatically split display 18*a* into two side by side fields, reduce the size of the first application window down to fit in one of the fields and place the second application window in the second field. In the alternative, referring to FIG. 22, if a second application window is dragged onto common display 18*a* while a first application window is maximized, the first application window size may be reduced slightly as shown at 370 so that an "Add Field" option 372 can be presented. Here, the user dragging the second window onto display 18*a* may drop the second window onto the Add Field icon 372 or may, instead, drop the second window on the reduced size first window 370. When the second window is at a location where it is aligned with icon 372 or window 370, the icon or window may be visually distinguished (e.g., a border about the window may be highlighted to indicate alignment as shown around icon 372). Thus, in this embodiment, any user can take control of a window or field on the common display 18*a* from any other user in an egalitarian fashion by dragging content to and dropping the content on the field.

In at least some cases it is contemplated that system processor 100 (see again FIG. 6) may store a log of shared content that can be accessed to reaccess shared content after the shared content is replaced by other shared content. For instance, referring again to FIG. 11, in some cases a session history scrolling tool may be integrated into the table assembly 12 at each user station 60*b*, 60*f*, etc., where the tool includes reverse and forward arrows 380*b* and 382*b*, respectively. Here, reverse arrow 380*b* may be selectable to step back through shared content sequentially on display 18*a*. Similarly, forward arrow 382*b* may be selectable to step forward sequentially through shared content on display 18*a*.

In other cases, referring again to FIG. 20, where user controlled pointing icons 340*b*, 340*f*, etc., are provided on common display 18*a*, system computer 100 may present a virtual session scrolling tool directly on display 18*a* as shown at 390 where, again, reverse and forward arrows 392 and 394 are selectable to move backward and forward through shared session content.

In many cases it is contemplated that if a user scrolls back through shared session content, when the user attempts to access legacy content, much of that content will no longer be available from the original source devices as those devices will instead be presenting other content (e.g., the users will have moved on to viewing other documents, running other applications, etc.). For this reason, in cases where the system allows legacy content scrolling, it is envisioned that just before a user's desktop image or application output is removed from the common display 18*a* (e.g., closed out or replaced by other content), a still or frozen snap shot of the content may be obtained and stored in system memory 102 (see again FIG. 6) in a session content sequence. Then, when a user moves back through the stored sequence of session content using tool 390 or some other scrolling tool, system processor 100 can obtain the sequential snapshot images and present them in order.

In other cases, the stored scrolling sequence may only include desktops, application or documents that currently remain open and viewable on user device displays and the scrolling sequence may be automatically culled whenever one of the documents in the sequence is closed out on a user's portable source device. For instance, where first user 89*b* shares a word processor document via display field 210 in FIG. 20 which is then replaced by an internet link by second user 89*f*, if the first user 89*b* continues to maintain the word processor document on her device display or at least open and running even if not currently viewable on her device display, the any user would be able to scroll back to view the first user's document assuming that the first user has not taken some other action to disable reaccess to that document. However, if the first user closes out the word document on her portable computing device, the document itself would be removed from the session sequence and would not be re-accessible via the scrolling tools.

In other cases it is contemplated that separate content scrolling tools may be presented for each common field on the common display screen(s) 18*a*. To this end, see again, for instance, FIG. 20 where first and second field scrolling tools 396 and 398 are spatially associated with the first and second common fields 210 and 220, respectively. Here, assuming a first sequence of 20 desktop shares and a second sequence of 22 desktop shares occur during a session in fields 210 and 220, respectively, a user would be able to scroll through either of the 20 or 22 shared content sequences independent of the other sequence.

In still other embodiments it is contemplated that a sequence of session thumbnail images may be presented as part of one or more of the scrolling tools so that users can better locate specific legacy content that they are seeking. To this end, see exemplary thumbnail images 400, 402, 404, etc., in FIG. 20 that form part of the scrolling tool 390.

While some scrolling tools are described in the content of a system where the scrolling tools are provided on the common display 18*a* and others are described in the context of table integrated scrolling buttons or the like, it should be understood that any of the table integrated functions or features may instead be provided on the common display 18*a* and the display 18*a* based functions and features may instead be provided by components integrated into the tabletop assembly.

The USB-C ports may also be provided at other locations including in the table edge at each user's station, within a grommet assembly, etc. Regarding power, while the optimal system would include wireless power charging at each user station, in other embodiments there may be no wireless power and user's may have to rely on USB-C ports or the receptacles integrated into the cable wire assembly at Alternative Optimized System Need to describe what a device-less system would look like where users do not bring any personal portable devices to the MS table.

This will likely be similar to what we see in FIG. 1 at the end of the table opposite the screen, albeit where personal screens and keyboards are provided at each user station. In general this type of system is specked out in one of the pending emissive surface cases (01135) where all I/O is emissive.

In at least some embodiments it is contemplated that a special sharing session management application program may be run by system computer 100 to manage content sharing, a content queue and content archiving for future access. In this regard, U.S. patent application Ser. No. 14/640,288 (hereinafter "the '288 application") which was filed on Mar. 6, 2015 and which is titled "Method and System for Facilitating Collaborative Sessions" teaches several session management system embodiments that may be combined with the teachings in this disclosure for managing sessions and is incorporated herein in its entirety by reference. More specifically, the '288 application describes systems whereby users can post content to session queues prior to commencement of a session or meeting, where any session attendees can access and view all content in the queue prior to, during and even after a session and where any attendee can move session content to a shared common display or content sharing field. In at least some cases it is contemplated that each user of system 10 described in the specification may have the same capabilities to post, access and control session content described in the '288 application where the common window or field is presented on common system display 18*a*.

In still other cases it is contemplated that system 10 may enable any system user or at least one system user to add any content shared on common display 18*a* to a session queue like the queues described in the '288 application. To this end, see, for instance, in FIG. 11 that a "Save To Session" option button 410 and 412 is provided for each of the common sharing fields 210 and 212. Here, it is contemplated that a separate "Save To Session" button would be provided for each common sharing field presented and that selection of one of those options would start a process whereby a user would select a specific session or team project queue to which the instantaneous content in the associated sharing field could be added.

Figure 23:
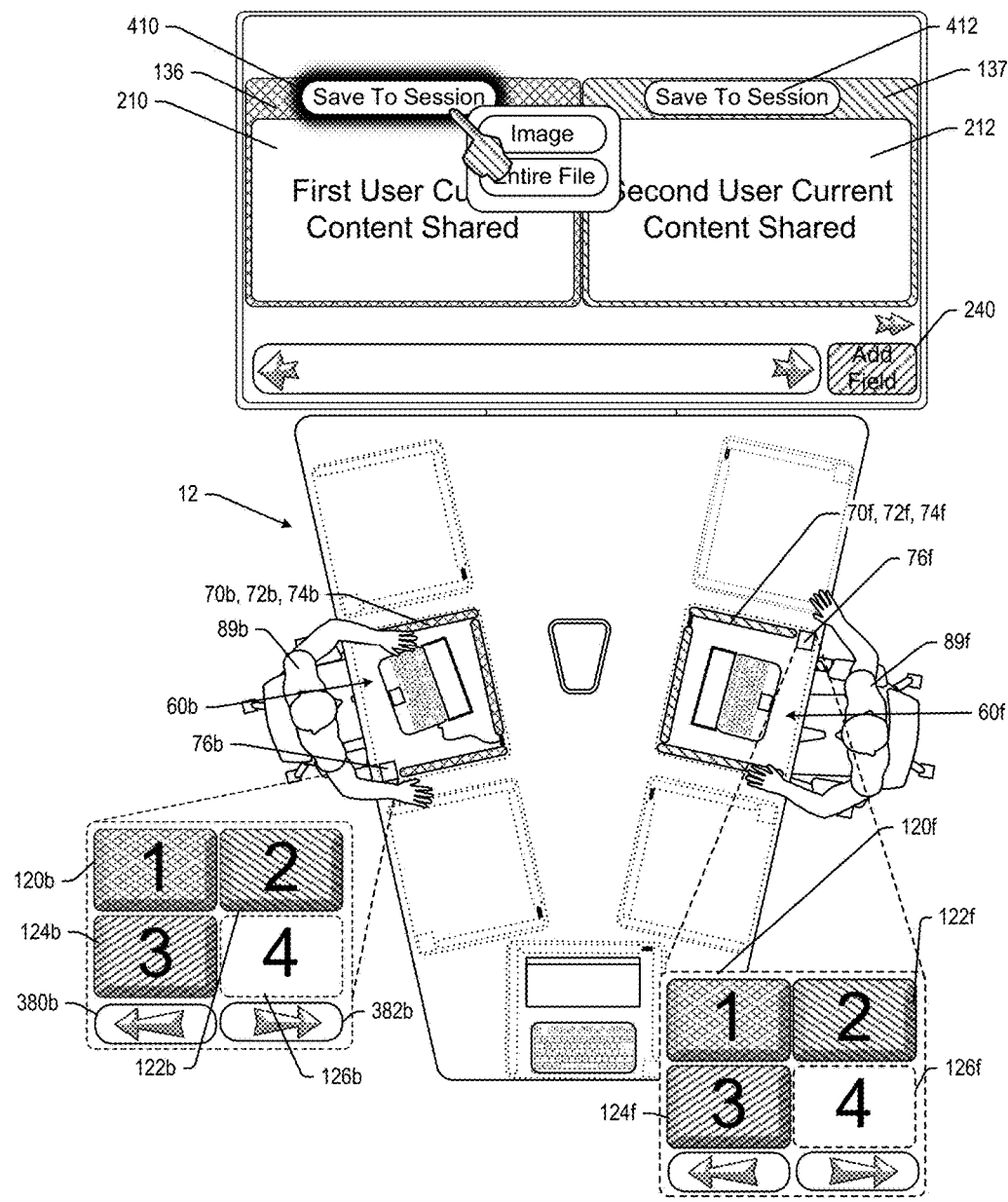
FIG. 23 is similar to FIG. 15, albeit where the interfaces have additional control features.

In some embodiments when content shared in a common sharing field (e.g., 210 in FIG. 23) is added to a session queue, the added content may only include the instantaneous image presented in the sharing field when the Save To Session option is selected. In other cases where the instantaneous image in a sharing field is simply one view of a larger document, video, file, record, etc., when the Save To Session option is selected, the entire record, file, document, etc., associated with the instantaneous image in the field may be loaded from a user's source device or some other location to the session queue for subsequent access. In other cases a user may have the option to store an instantaneous image or an entire related file, record, document, etc., when the Save To Session option is selected. For example, see in FIG. 23 that a minimal drop down menu is presented at 416 that gives a user the option to save either an instantaneous image or a related file, which may be presented when the instantaneous image is related to a larger file.

In still other embodiments when a user station is associated with a user, the station may simply provide a web browser type interface to enable the user to access her company's server to use applications and access data.

In cases where a user is wirelessly linked to system 10 and is associated with a first user station (e.g., 60b in FIG. 3) such that the station interface (e.g., 76b) and state indicator devices (e.g., 70b, 72b, 74b and the interface buttons) at the station are used in conjunction with a user's portable computing device to facilitate intuitive content sharing, if the user moves from first user station 60b to a different second user station such as for instance, station 60f in FIG. 3, in at least some embodiments, system processor 100 may be programmed to automatically disassociate the user's device from first station 60b and re-associate the user's device with the second station 60f so that the interface and state indicators at the second station then operate in conjunction with the user's device to facilitate intuitive sharing. In some cases, this re-association process may occur at any time during an ongoing session regardless of the duration of a disassociated period. In other cases, the duration of disassociation between the time the user's device is removed from the first station and the time at which the user's device is re-sensed at the second station may have to be less than some threshold value (e.g., 2 minutes) in order for an auto-re-association process to occur.

It has been recognized that it would be possible for a user to link to a first USB-C port associated with a first station but take a position at a different one of the user stations at a table assembly. Thus, for instance, in FIG. 3, a user may plug her portable device into port 35b at station 60b but assume a position at station 60f across the tabletop 26 from station 60b. Here, unless addressed, a problem could arise whereby the user device at the second station 60f would not be coupled to the interface and state indicator affordances at that station and instead would be coupled to the interface and indicator affordances at station 60b. In short order, the user would recognize the incorrect coupling and could either move from station 60f to station 60b to use interface 766b and be supported by the station 60b indicator affordances or could simply disconnect from port 35b and reconnect to port 35f.

In still other cases, the ports 35b, 35f, etc., may simply be for data connection and user device association may be based on NFC sensing of specific devices at specific stations. For instance, in the above example where a user links her device to port 35b but places her portable computing device at station 60f for use, the NFC or other station sensing device (e.g., see again 80 in FIG. 3) may detect the user device at station 60f and coupling to station 60f affordances (e.g., the interface, the state indicator set, etc.) may be automated despite the user device remaining coupled to port 35b at station 60b.

In some embodiments it is contemplated that initial user device association with system 10 and more specifically with a user station may be via NFC sensing and subsequent communication for content sharing, indicating states, etc., may be via some other longer range communication protocol such as, for instance, Bluetooth wireless communication. For instance, if a user initially places her laptop on tabletop surface 26 at user station 60b in FIG. 3, NFC sensor based association may be initiated. After initial association, Bluetooth communication would allow the user to, for example, place the user's laptop device on her lap or she may prefer to hold her device in her hands during use (e.g., many people prefer to hold smart phone or tablet type portable devices in their hands during use as opposed to having them rest on a tabletop) without decoupling from the system 10 and without disassociating with her current station. In at least some cases, after initial NFC based association, Bluetooth communication may occur and user device association with the associated station may persist until the user either affirmatively decouples from the system or until an NFC sensor at a different one of the user stations senses the user device located at that station.

Figure 24:
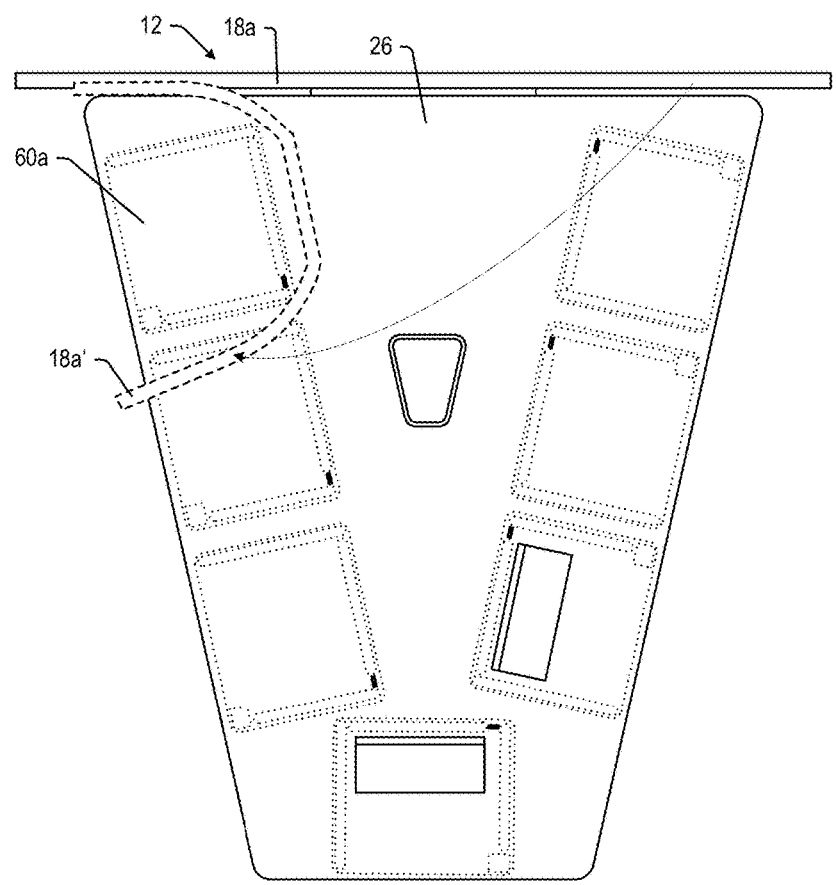
FIG. 24 is shows a top plan view including a common display screen arranged to support a single system user.

While content sharing systems like those described above are particularly useful for sharing content among multiple system users, it has been recognized that the affordances associated with a sharing system as described above can also support one or more users when performing single person work activities (e.g., activities requiring focused individual attention). For this reason, in at least some embodiments it is contemplated that system affordances may be able to morph between different arrangements to support users differently when operating individually and when operating as a group. For example, in some cases the common emissive surface display 18a may be moveable between an optimal group sharing position and an optimal individual user position or arrangement. To this end see, for instance FIG. 24 where an emissive surface 18a is bendable and moveable between the group use position shown in solid lines at 18a and a single user support position shown in phantom lines at 18a'. Here, an initial system user may link to the port at station 60a and processor 100 may provide the user an option to either configure the system for group use or for single uses support. Upon selecting the single user support option, the processor 100 may control motors or other actuators to move and bend the screen from the 18a position to the 18a' position so that the user can use the emissive surface structure to access data and software applications. An added benefit to configuring the screen as shown in phantom to support a user is that the screen itself provides a higher level of privacy for a system user.

Figure 25:
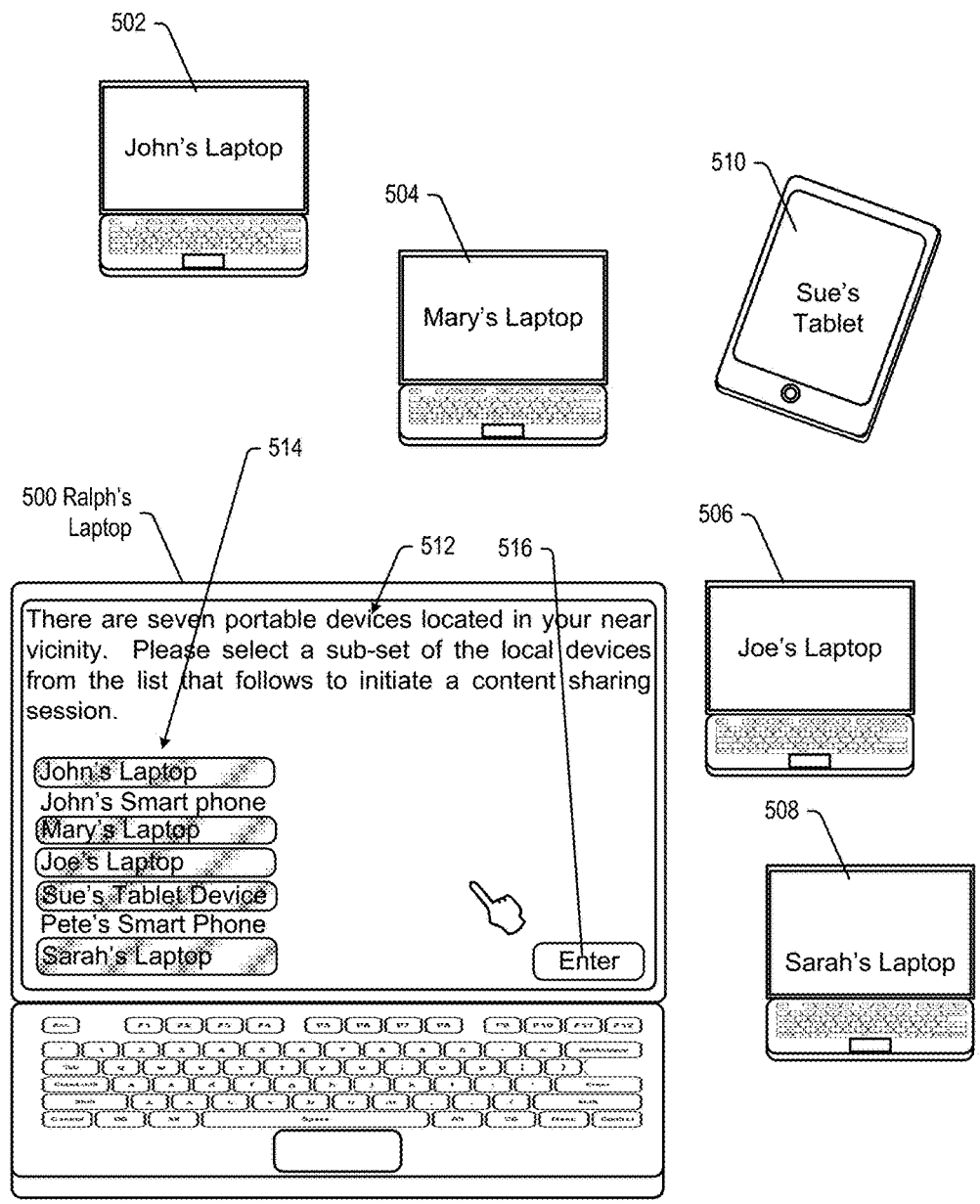
FIG. 25 is a schematic view showing a plurality of wireless user source computing devices that may be wirelessly linked together in a local network for content sharing that is consistent with at least some aspects of the present disclosure.

In some cases a group of people may want to share content with each other but may not have access to a content sharing system 10 like those described above. The present disclosure also contemplates a system wherein a group of users can associate their portable computing devices in a wireless local network in order to share content in a manner that is similar to that described above. To this end, see FIG. 25 where first through fifth laptops 500, 602, 504, 506 and 508 and a tablet computing device 510 are illustrated where devices 500, 502, 504, 506, 508 and 510 are owned or at least operated by user's named Ralph, John, Mary, Joe Sarah and Sue, respectively. Here, it is assumed that each of the devices in FIG. 25 has a content sharing application stored in a local memory or at least that is accessible via a wireless network or the like that enables content sharing as described herein. In at least some embodiments it is contemplated that the sharing software will, upon initiation, facilitate discover of other wireless user source devices in the near vicinity of the device that initiates the application and will present device linking options to a user. To this end, see in FIG. 25 that a screen shot presents instructions at 512 to select a subset of the proximate wireless devices that may be wirelessly associated for content sharing purposes and a list of selectable devices at 514. After selecting devices to associate with for content sharing, the user selects an Enter icon 516 causing his device to commence a sharing authorization process. Here, the devices may cooperate to provide the option to each of the users of the other selected devices to either reject the sharing option or to accept the option.

Figure 26:
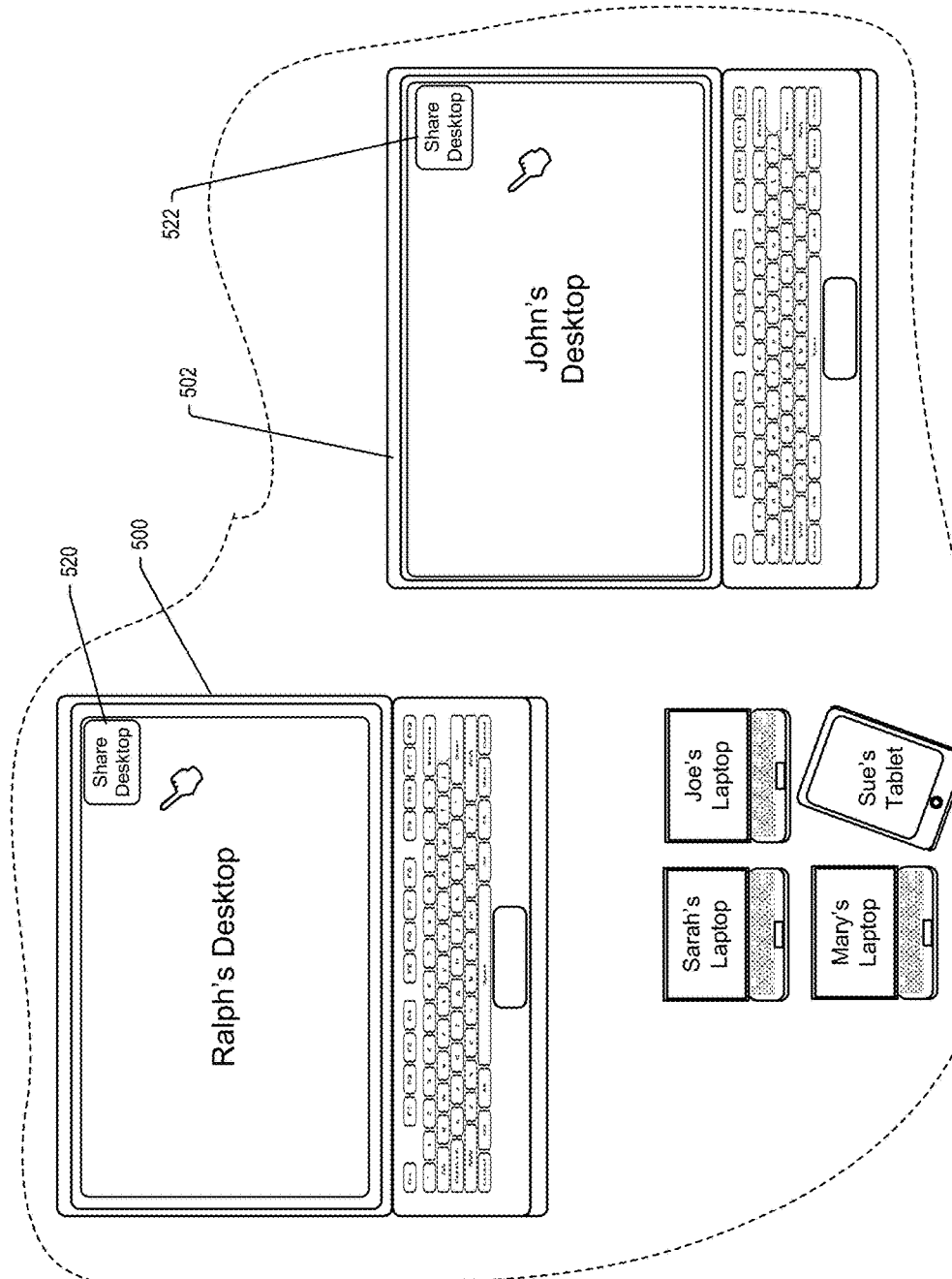
FIG. 26 is similar to FIG. 25, albeit showing the devices of FIG. 25 after association and during a content sharing session.
Figure 27:
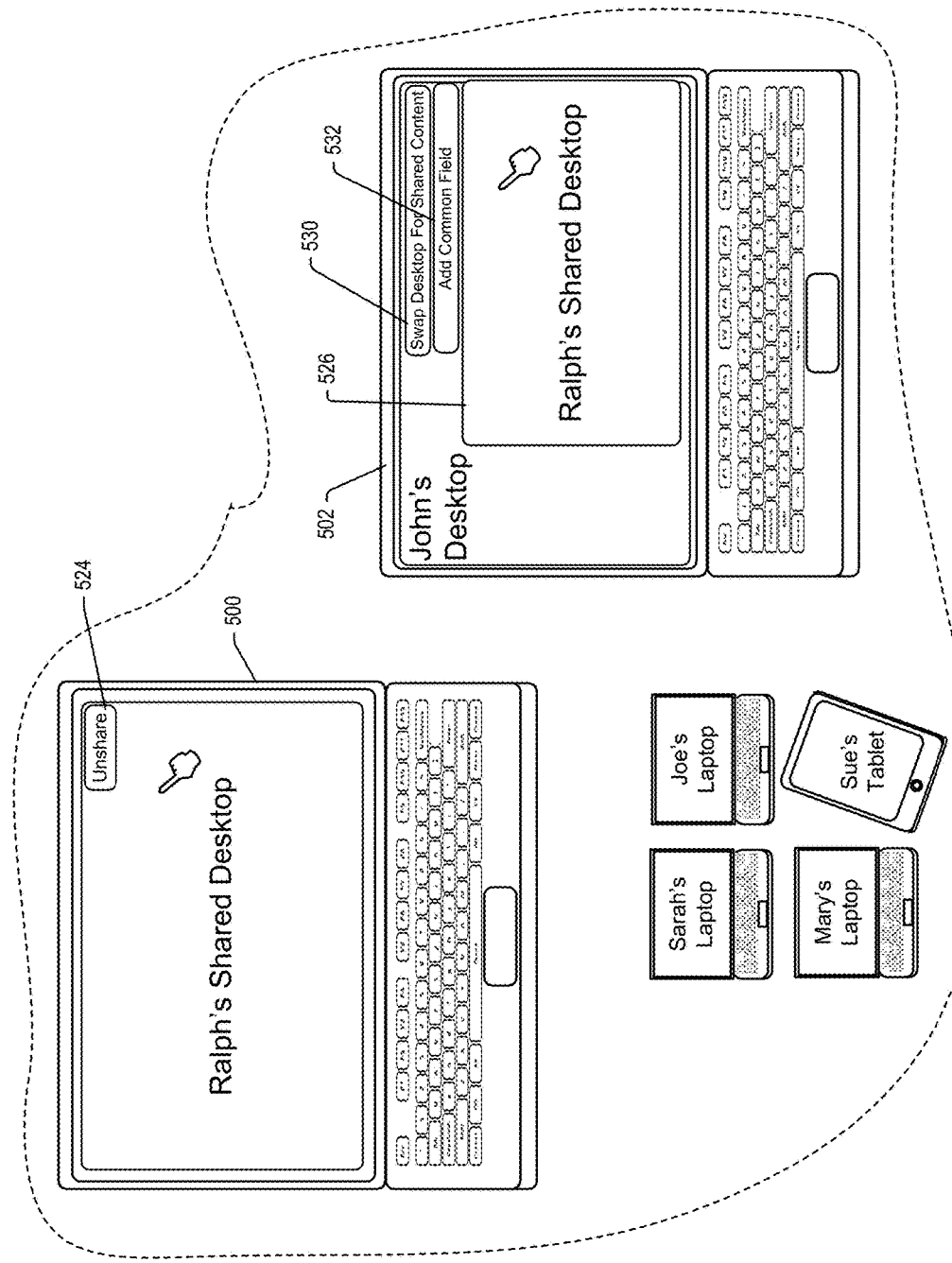
FIG. 27 is similar to FIG. 26 albeit showing the system in a different operating state.

Once the invited users accept the sharing option, each user that accepted the option may be presented with a "Share Desktop" option 520, 522 as shown in FIG. 26 as a selectable icon in a peripheral area of their desktop image for selection to share content with the other wirelessly networked devices. FIG. 27 shows Ralph's and John's devices 500 and 502 After Ralph selects the Share Desktop option in FIG. 26. Ralph is presented the option to "Unshare" his desktop as a selectable icon 524. As shown, Because Ralph is sharing his desktop, his desktop representation remains maximized on his device display screen. John's desktop remains maximized in the illustrated example but a content sharing window 526 is opened on top of John's desktop and presents Ralph's shared desktop. John is also presented the options to "Swap Desktop For Shared Content" via button 530 and "Add Common Field" via button 532. Here, if John selects button 530, John's desktop will be replace Ralph's shared desktop as the shared content and therefore John's view would look a lot like Ralph's in FIG. 27 and Ralph's would look a lot like John's in FIG. 27. All of the other user device views in FIG. 27 would be similar to John's albeit with their desktop representations as opposed to John's shown in the background.

Figure 28:
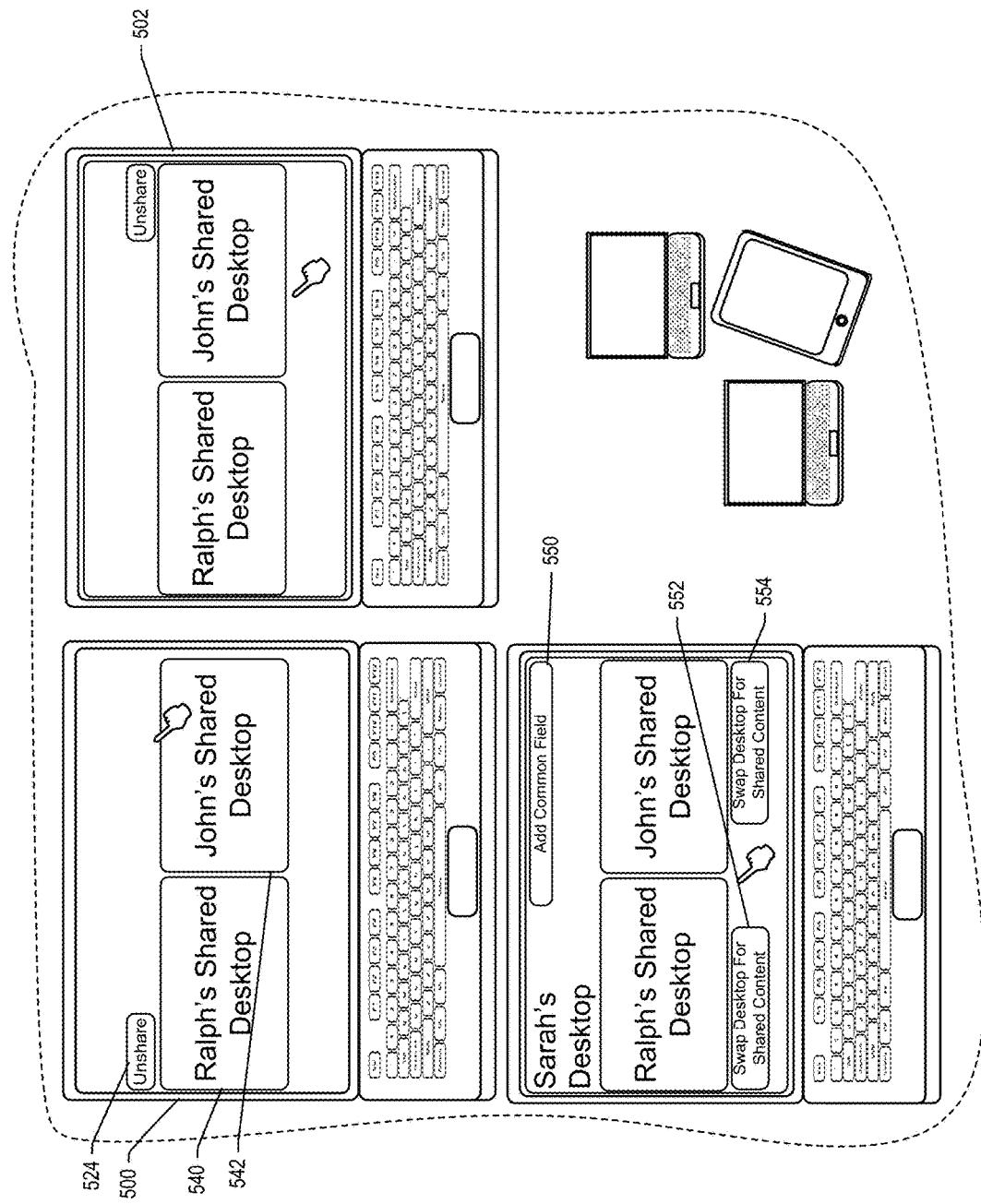
FIG. 28 is similar to FIG. 26 albeit showing the system in a different operating state.

Referring again to FIG. 27, if John selects button 532 to open an additional sharing field, in at least some embodiments the devices would switch to the presenting state shown in FIG. 28. In FIG. 28, Ralph's shared desktop field has been reduced in size 540 to accommodate John's new shared desktop field 542 on all device displays. Here, because both Ralph and John are presenting, their desktop images are presented in the shared fields and therefore are not presented in the background. However, as seen on Sarah's device, because Sarah is not sharing her desktop, Sarah's desktop is shown in the background on her device display.

Referring still to FIG. 28, Each of Ralph and John have the option to "Unshare" their shared desktop images. In addition to viewing the shared first and second fields, Sarah is presented the options to add an additional sharing field to share her desktop simultaneously with Ralph and John (se button 550) as well as separate option buttons 552 and 554 to swap her desktop image for either or Ralph's or John's desktop images. Again, the other user devices would have views similar to Sarah's in FIG. 28, albeit with their own desktop images in the background view.

In FIG. 27 it is contemplated that in at least some embodiments a user may be able to toggle between their desktop image and the shared content bringing either to the forefront and causing the other to assume the background position by simply clicking on one or the other via a mouse controlled or pad controlled cursor or the like.

Figure 29:
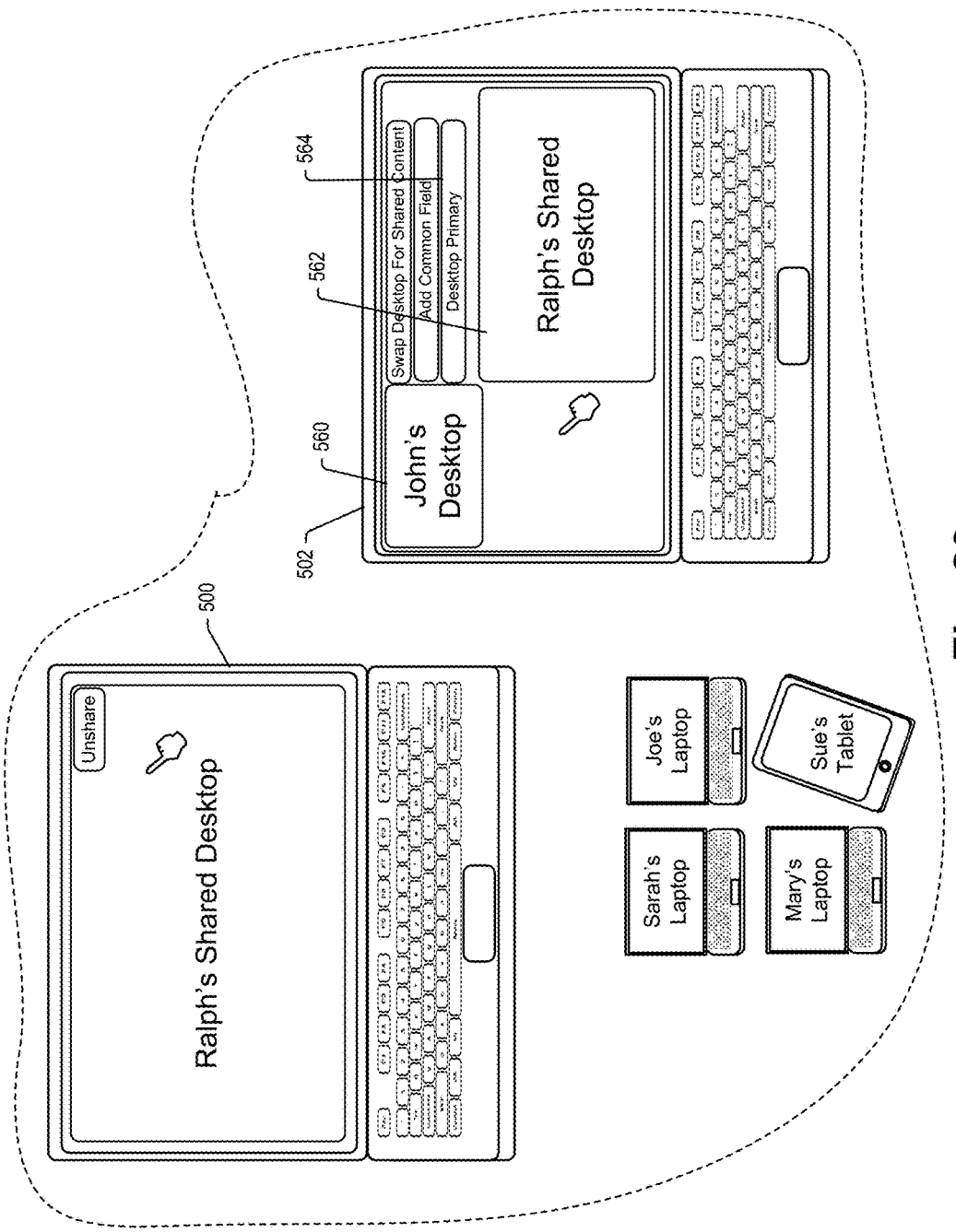
FIG. 29 is similar to FIG. 27 albeit showing a different way to arrange user desktop and shared content fields.
Figure 30:
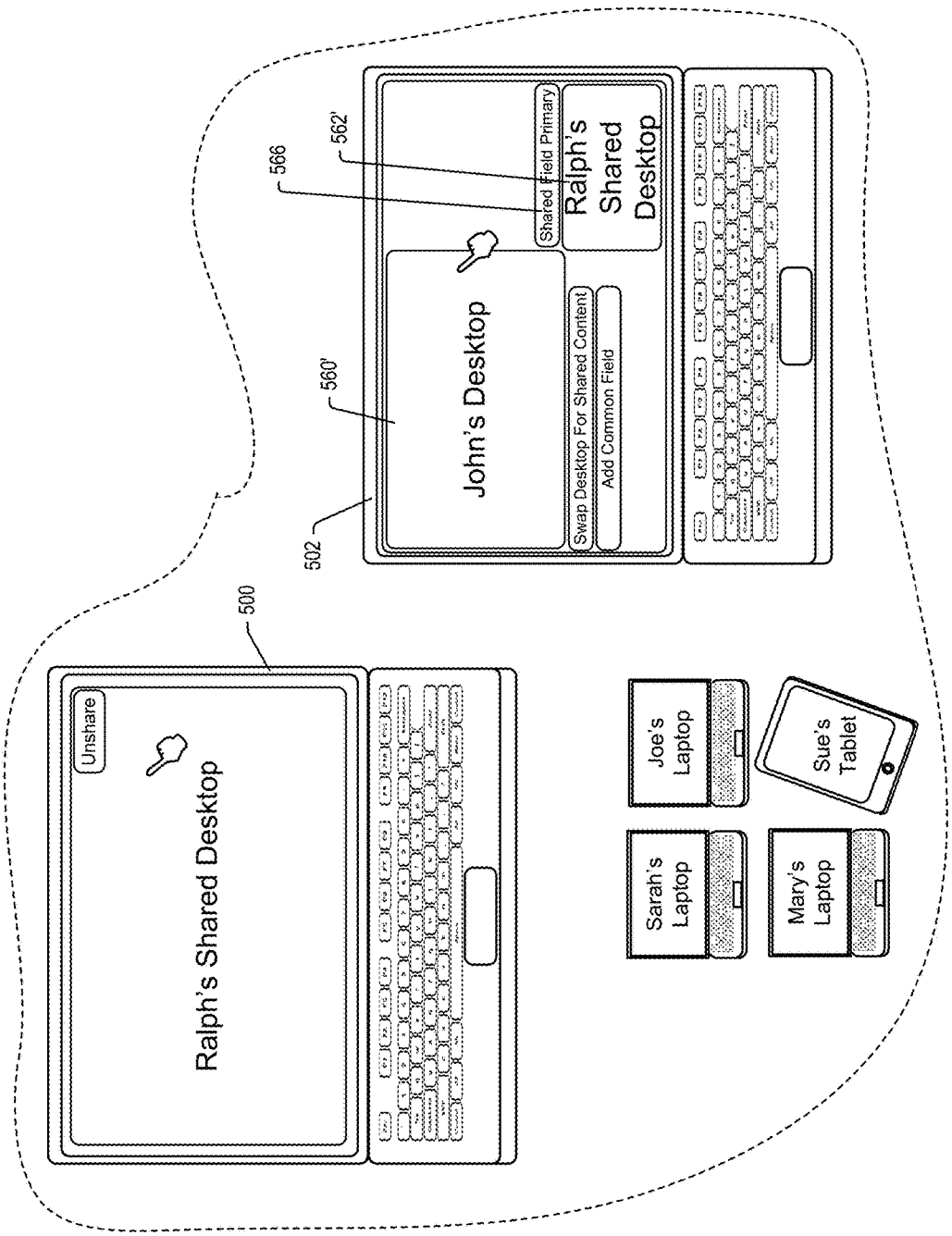
FIG. 30 is similar to FIG. 29, albeit showing the system if a different operating state.

Instead of presenting a user's desktop image in a background position, in at least some embodiments a user's desktop image may simply be presented in a second window on her device display that does not overlap and is not overlapped by the shared content fields. To this end, see FIG. 29 which represents a similar content sharing state to the state represented in FIG. 27, albeit where John's desktop is presented on his device display as a smaller second field 560 that is not overlapping with shared window 562. Again John is presented with options to swap his desktop for Ralph's shared desktop or to open an additional second content sharing field to present John's desktop simultaneously with Ralph's. In addition, an option to make John's desktop primary on his display is presented as button 564. If John makes his desktop primary, as shown in FIG. 30, John's desktop 560' increases in size and the shared field 562' is reduced in size, albeit where the resulting fields still do not overlap. With the shared field reduced in size, John is presented with the option to make the shared field primary again via button 566.

In at least some cases, in addition to the hardware described above, the table assembly 12 may also include integrated cameras, speakers and microphones. To this end, see the exemplary FIG. 2 table assembly 12 that includes a camera 622 (only one labelled at station 60b) at each of the user stations and stereo speaker/microphone devices 620 at each station. Here, the stereo devices 620 are integrated into the tabletop 26 adjacent the edges thereof and each station includes two spaced apart speakers and microphones so that if a user covers one of the devices with a device, paper, etc., there is a good chance that the other of the devices will remain uncovered and therefore fully functional. The cameras 622 and microphone speaker devices 620 may be multipurpose and used for recording session content as well as for facilitating Skype or other telepresence aspects of a session. While not shown, similar camera and microphone/speaker devices may be associated with side affordance configurations like the one shown at 190 in FIG. 1.

While the embodiments described above are described as generally egalitarian, in other cases it is contemplated that the system processor may facilitate other content sharing and control schemes. For instance, two other exemplary control schemes or modes of operation contemplated include a presentation type mode and an instruction type mode. As described above, in an egalitarian operating mode, any user that has a device linked to the system 10 may share content on the large common display(s) at any time without permission from any other linked system user. In a pure presentation mode, it is contemplated that no user would be able to take control of any shared or common content field on the common displays without a currently controlling user affirmatively yielding control of that field. In a pure instruction mode, it is contemplated that one user, referred to herein as an "instructor", would preview any content other users want to present in a common field and that the content would only be shared after the instructor confirms that the content should be shared. Hybrid modes are also contemplated. For instance, in one hybrid operating mode referred to as a "presentation/collaboration" mode, one or a sub-set of fields may be restricted and only controllable per the presentation mode paradigm where a current controlling use has to yield the field for another user to present and the balance of the fields may be controllable in an egalitarian fashion (e.g., any user may control egalitarian fields at any time).

Figure 31:
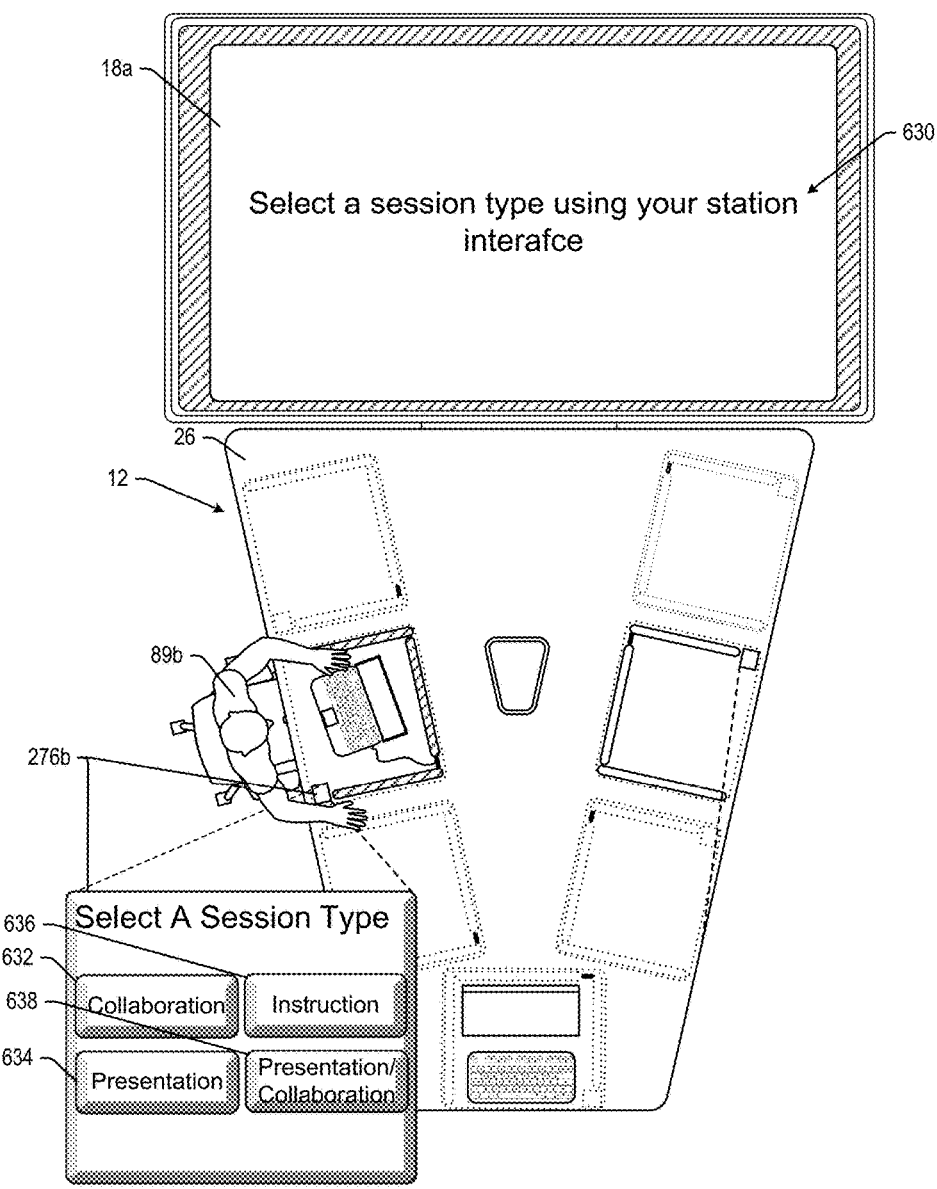
FIG. 31 is partially flat top plan view of a content sharing system where pre-canned control options are presented for a user to consider.

In at least some cases it is contemplated that a first user that links to the system 10 may be presented initial virtual tools for setting system operating mode. For instance, see FIG. 31 where one of the integrated user interfaces 276b is shown immediately after a user 89b links her portable laptop device to the system where the system processor presents the user with four operating mode options as well as instructions

630 on the common emissive surface 18*a* encouraging the user to select one of the options. The four options include a collaboration mode, a presentation mode, an instruction mode and a hybrid presentation/collaboration mode 632, 634, 636 and 638, respectively, selectable to set those modes as described above. In at least some cases the operating mode may be changeable at any time during a session. In some cases only the original user that selected the initial session mode or the interface (e.g., 276*b*) used to set the initial session mode may be useable to alter the operating mode.

In at least some embodiments where the presentation mode is initially set, a session may start out as a sort of pseudo egalitarian system where any user can open up an additional content sharing field up to a maximum number (e.g., four) for sharing content independent of any other user yielding a field but where no user can replace another attendee's shared content in any field without the field controlling user yielding that field. Thus, for instance, where a maximum number of sharing fields on a common emissive surface is four (e.g., two rows, two columns), if a first user is sharing content in a first large field, second, third and fourth users would be able to open new second, third and fourth fields for sharing their content in an egalitarian fashion. Thereafter, a fifth user would only be able to share her content after at least one of the first through fourth users yields one of the fields.

When in the instruction mode it is contemplated that the system processor may present a content queue to the instructor via any one of the instructor's computing device or one of the integrated interfaces (e.g., 276*b*, 40 (see again FIG. 1)) so that the instructor can leaf through content that other users want to share and organize sharing order pursuant to personal preferences. Here, it is contemplated that, in addition to allowing the instructor to preview and select other user's content for sharing, the interface will include tools for selecting either an existing field on the common emissive surface or for creating a new field (up to the maximum number of surface fields) to receive other user content to be shared.

When in the hybrid presentation/collaboration mode, it is contemplated that certain sharing fields may be restricted to being presentation fields and others may be restricted to being collaboration fields. For instance, in some embodiments a first field on a common surface may always be a presentation field which has to be yielded prior to another user controlling content in that field and second, third and fourth created fields may always be collaboration fields where egalitarian control occurs. In other cases, when a field is initially created, the user that opens or creates the field may have the ability to set the operating mode for that specific field in a fashion similar to that described above in conjunction with the interface 276*b* having four options 632, 634, 636 and 638.

In a presentation mode where no user can take control of a specific sharing field prior to the controlling user yielding the field, the control options presented to each user would be limited to only available options. Thus, for instance, where a user can add an additional sharing field but cannot take control of a field that some other user is currently controlling, the option to take control of the field controlled by the other user would not be presented.

While two or more visual content sets can be presented at the same time in different common display fields, audio output cannot be simultaneous in most cases and still make sense to users that experience simultaneous broadcast. For this reason, in at least some cases the system processor may implement and enforce audio rules for which of two or more simultaneous audio streams is broadcast to users of the sharing system. For instance, in some cases it may be that once a first audio steam is being broadcast, a second stream cannot be broadcast until either the first audio stream is completed or the user that presented the first stream stops that stream from broadcasting. Here, where audio broadcasts are associated with simultaneous video, it may be that an associated video stream is delayed if the audio is delayed until after a current audio broadcast is complete or stopped by the sharing user.

In other cases, if a user shares an audio stream (e.g., either the audio stream alone or in conjunction with an associated video stream) while another user's first shared audio stream is playing, the first audio stream (and, if it exists, first associated video stream) may be stopped and the newly shared stream may be broadcast.

In still other cases where a second user shares an audio stream while a first user's first audio stream is being broadcast, the system may provide a query to the first, the second, or both the first and second users requesting the user(s) to indicate if the first stream (and associated video if it exists) should persist or the second stream (and associated video if it exists) should take precedence over the first stream.

Figure 32:
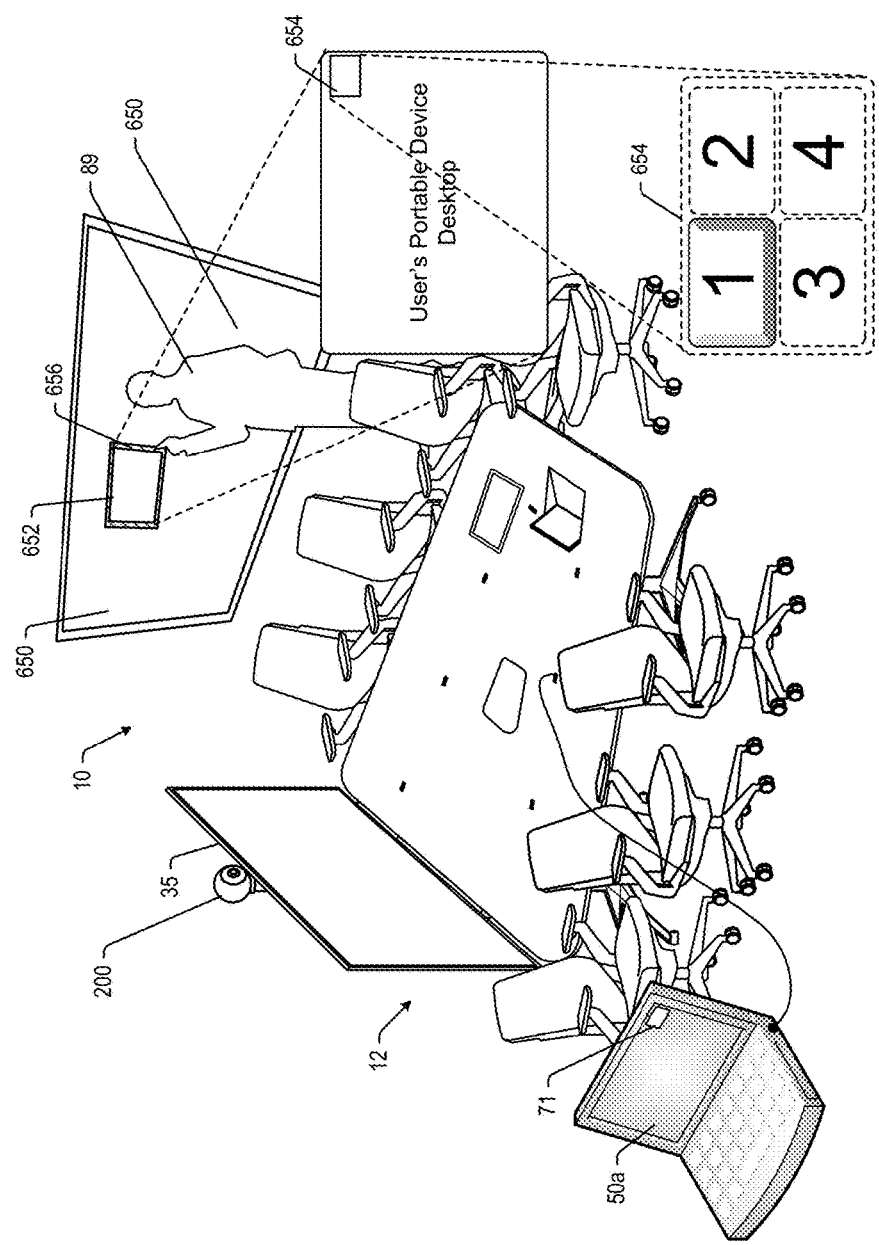
FIG. 32 is a perspective view of a content sharing application where a user is shown proximate a touch sensitive emissive surface in a conference space and where the user' desktop is replicated at the user's location remote from the user's source computing device.

While the systems described above include one or two large common display screens for content sharing, in other embodiments systems including three or more emissive content sharing surfaces are contemplated as are systems that include two emissive surfaces that are arranged in different configurations. For instance, see FIG. 32 where an exemplary system 10 includes an additional large common and wall mounted emissive and touch sensitive surface 650. In this case, it is contemplated that, after a user links her laptop or other portable device to the system 10 in one of the ways described above, the user 89 may have occasion to get up without her portable device and move over to the large surface 650 as illustrated to interact with content or application interfaces presented thereon. Here, as the user moves in the vicinity of system 10, cameras 200 or other sensor devices within the space may track the user's location automatically and may associate the user's identity with the specific user in space. Here, it is contemplated that the user may, while at surface 650, perform some action to access her laptop desktop such as, for instance, triple tapping the surface 650 in rapid succession causing the system processor to replicate user 89's desktop on surface 650 as shown at 652.

With her replicated desktop 652 at hand on surface 650, user 89 would be able to drive her laptop or other portable device in a fashion similar to the way the device would be driven directly if the user were at the device. Thus, user 89 could open or close any device 50*a* application, control any application, generate content, etc., from replicated desktop 650. In addition to replicating application interfaces and content, replicated desktop 650 would also replicate the content sharing interface 71 from the desktop. An exemplary four button sharing interface is shown at 654 in FIG. 32 that is similar to the sharing interface design described above. Other sharing interfaces are contemplated.

Where user 89 accesses her desktop but does not share the desktop, a frame 656 about the desktop representation may be presented on surface 650 that is colored or otherwise distinguished as described above to indicate that the user is linked to share but is not currently sharing her desktop. Similar color indicators would be controlled at the station to which the user's source device is linked. As user 89 shares content the system state indicators including 656 would be controlled to indicate different sharing states.

Figure 33:
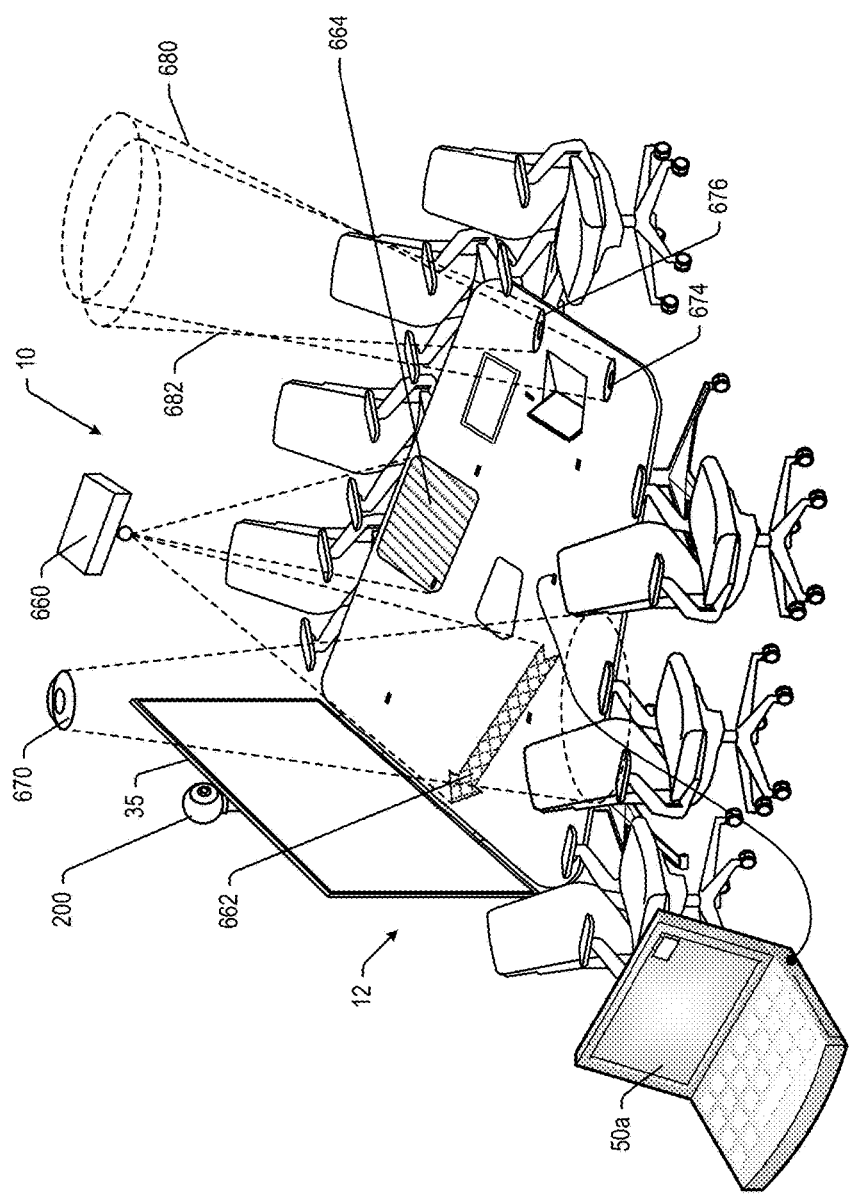
FIG. 33 is similar to FIG. 32, albeit showing other aspects of a sharing system that are consistent with at least some concepts in the present disclosure including other sharing state indicator systems as well as directional speaker systems.

Other types of sharing state indicators are contemplated. For instance, in FIG. 33 a ceiling mounted laser writer device 660 is mounted over the table assembly that can project images or content onto the tabletop surface such as, for instance, an illuminated yellow field 664 to invite an attendee to take a station or a green sharing arrow from one station to the common display to indicate which station(s) is currently sharing content. Other ceiling mounted light devices may also be controlled over user stations to indicate current sharing states in a manner similar to that described above. In other cases the tabletop may be contrasted of a translucent or semi-transparent plastic or other rigid material and a projector there below may be controlled to shine control indicia up onto the undersurface of the tabletop member to be seen through the top surface.

In at least some cases it is contemplated that one or more speakers and/or microphones in a space may be directional so that they are operational along narrow corridors within a conference space to obtain audio from or broadcast audio top specific users at specific locations. To this end, several companies have developed ultrasonic directional speakers capable of transmitting sound to specific locations within space. For instance, once such speaker is the Sennheiser Audiobeam from Sennheiser Electronic GmbH & Co. Instead of generating ordinary audible sound waves with a single moving electromagnetic coil and cone, ultrasonic directional speakers generate ultrasound (high-frequency sound waves) that is too high pitched for our ears to hear using an array of electrical devices called piezoelectric transducers. The transducers are simply crystals, such as quartz, that vibrate back and forth tens of thousands of times a second when you feed electric currents through them, producing very high frequencies of sound. Ultrasound is used because its higher-frequency waves have a correspondingly shorter wavelength and diffract (spread out) less as they travel, which means they stay together in a beam for longer than ordinary sound waves. Also, having an array of many, small transducers makes sound diffract less than it would from a single, large transducer. The ultrasound travels out from a directional speaker in a narrowly focused column, like a flashlight beam. When the ultrasound waves hit something, they turn back into ordinary sound you can hear.

In the contemplated system, user locations at stations about the conference table 12 or in the space that houses the system 10 would be known and therefore directional audio could be broadcast from the speakers to all present users along narrow paths. One advantage here would be that other people in the general vicinity of users at a conference table would have minimal distraction from or ability to hear audio broadcast by the system 10. Thus, in some cases where system 10 is located in an open office of cafeteria type setting, people in the ambient would not be bothered. Where user voices at table 12 are picked up and amplified only along paths directly toward users that are linked to system 10, the linked users could speak more quietly and still be clearly heard by other linked users without bothering other people in the ambient.

In at least some embodiments that include directional speakers, those speakers may be located and oriented so that it is highly likely that only a user at an associated station at the table edge hears broadcast audio. In this regard, see again FIG. 33 where one directional speaker 670 is shown suspended overhead, likely in a ceiling structure, over one of the user stations along the tabletop edge with a directional field of sound (FOS) 672 collimated to only be appreciably heard at the single associated user station. Other similarly mounted and arranged directional speakers would also be provided above each of the other illustrated user stations about the edge. Here, the directional broadcast in FOS 672 would not be transmitted horizontally in space and therefore would substantially terminate at the associated user's station. In at least some cases the affordances within each user station may include at least some sound absorbing material to minimize sound reflection and further reduce unintended audio broadcast into the ambient.

In still other cases directional speakers and microphones may be integrated directly into the tabletop surface and directed generally upwardly and slightly outwardly so that they obtain audio and broadcast audio upward and slightly outward along an FOS that would typically include a user's head. To this end, see the exemplary dual directional speakers 674 and 676 mounted on either side of a user station in FIG. 33 that include FOSs 680 and 682 aimed upward and outward to cover audio requirements of the associated station. Again, sound absorbing material may be provided in the FOS paths to further eliminate unintended ambient audio broadcasting.

In at least some cases it is contemplated that the directional sound speakers 674, 676 may be further controllable to dynamically alter the FOS created thereby to focus on a user's head while at an associated table station. Thus, for instance, one or more system cameras 200 or other sensor devices may track the location of a user's head at a station and the system processor may be programmed to aim relatively narrow FOSs at the location of a user's head to more effectively limit overall ambient noise while delivering superior directed audio messages or content to a user.

While the directional speakers are described here in the context of a conference table, it should be appreciated that the directional speaker concept may be included in a personal workstation to provide audio to a station user while only minimally affecting overall noise level in a surrounding environment. In the case of a personal workstation, the directional audio may be integrated into a workstation tabletop, a ceiling tile above the station, a privacy screen that surrounds a portion of the station or into any other station defining affordance (e.g., the head of a task light, an edge of a shelf member, etc.).

In some cases it is contemplated that two content sharing systems may be remotely located from each other and linked via some type of communication network (e.g., the Internet) to facilitate collaborative sessions between first and second differently located user groups. To this end, see FIG. 34 where first and second similarly afforded sharing systems 10a and 10b are shown that may be internet linked. In the illustrated state, first and second users 89b and 89f are located at system 10a and third and fourth users 89x and 89y are located at system 10b. Each user 89b, 89f, 89x and 89y has station affordances that are similar to those described above with respect to FIGS. 2 through 4 and other associated drawings. In the illustrated example each of the users 89b, 89f, 89x and 89y is linked to the overall system and can share their content with other local and remote attendees via common emissive surfaces 18a and 18b that are included in the two systems.

Figure 34:
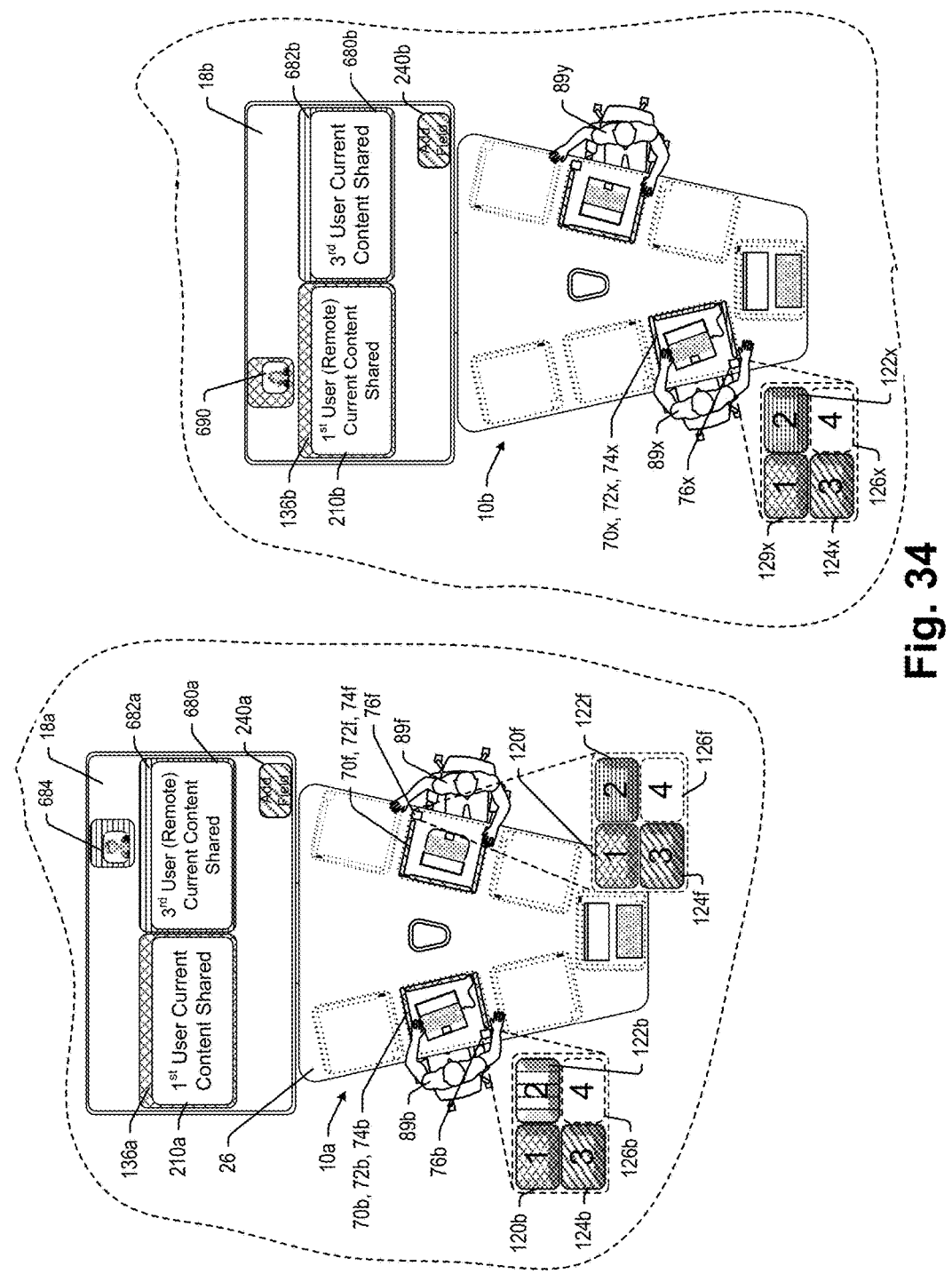
FIG. 34 is a partially flattened top plan view of first and second remotely located conference systems where remote users that share content are indicated on at least one common emissive surface.

Referring still to FIG. 34, in the illustrated state, first user 89b and third user 89x are currently sharing their desktops via both the first and second systems 10a and 10b. As shown, first user 89b's desktop is presented in a left shared field 210a and 210b at each system location while third user 89x's desktop is presented in a right shared field 620a and 620b at each system location. Consistent with the indicating rules described above, a frame 136*a* and 136*b* about each left shared field is illuminated green (double diagonal cross hatch) to indicate that first user 89*b* is sharing her content and a frame about each right shared field is illuminated pink (e.g., horizontal hatching) to indicate that third user 89*x* is sharing his content in those fields.

As in the case of the system described with respect to FIG. 3 above, local users at the first location can see the table integrated indicators 70*b*, 72*b*, 74*b*, etc. to associate the green frame 136*a* with user 89*b* locally but users at the second location of system 10*b* cannot. For this reason, an image or live video representation of user 89*b* is presented at the second location as shown at 690 and that image or video is also framed green to help users in the second location understand that user 89*b* who is remote is sharing the desktop at 210*b*. Similarly, local users at the second location of system 10*b* can see the table integrated indicators 70*x*, 72*x*, 74*x*, etc. to associate the pink frame 682*b* with user 89*x* locally but users at the first location of system 10*a* cannot. For this reason, an image or live video representation of user 89*x* is presented at the first location as shown at 684 and that image or video is also framed pink to help users in the first location understand that user 89*x* who is remote is sharing the desktop at 680*a*.

In at least some cases it is contemplated that when two or more remote sharing systems are linked together for a session, one of the systems may include more emissive surface sharing capabilities than another. For instance, referring to FIG. 35, in an exemplary case a first system 720 including one sharing surface 722 may be linked to a second system 724 including two sharing surfaces 726 and 728 so that twice as many sharing fields can be presented in the second system than in the first. Here, despite the fact that at times more sharing windows will be presented in one system than another, it would be advantageous for users in the two different systems to know what fields and content the users in the other location are able to view.

Figure 35:
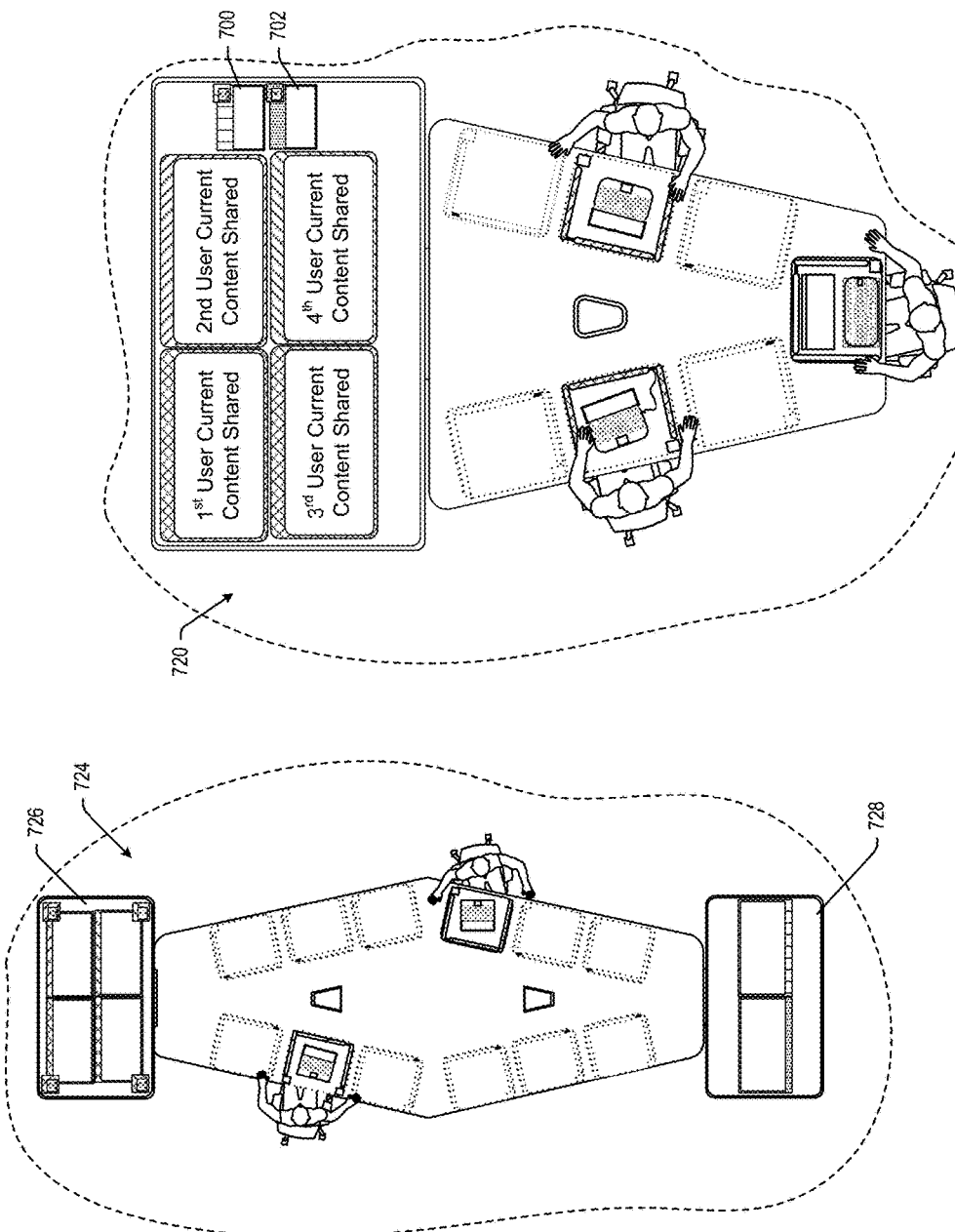
FIG. 35 is a partially flattened top plan view of first and second remotely located conference systems wherein one of the systems is afforded with more emissive surface than the other.

To this end, in at least some embodiments it is contemplated that if more large common sharing fields are presented at a first system location than at a second location, at least smaller representations of the additional fields in the first location may be presented on a common surface in the second location. In FIG. 35, first, second and third users at system 720 share content in four large common fields on surface 722 while two other users at system 724 share content in first and second large fields on surface 728. Here, the content shared by the first, second and third users at system 720 is replicated on large surface 726 at system 724 in a large format because system 724 has enough emissive surface space to present six large common fields. As shown, the remotely shared content in each field on surface 726 is labelled with facial images of sharing users at first system 720 that are remote from the location of second system 724 to indicate ownership or who is sharing each of those desktops or other content. In addition, while full representations of the content shared by local users using system 724 are presented on surface 728, because those representations are only presented as smaller representations at first system 720, those representations at system 724 are visually distinguished in a different way at system 724 represented by the labels "Remotely Small".

Referring still to FIG. 35, at first system 720, each of the small representations 700 and 702, because they are presented by remote users using the second system 724, are labelled with facial images of the remote users that present the desktop images to indicate ownership. In addition, to make clear that each of representations 700 and 702 is large at the remote second system 724, each is labeled "Remotely Large". Thus, in FIG. 35, in addition to presenting content in ways that clearly indicate ownership of or who is instantaneously sharing content, the system also presents content such that each users has the ability to perceive any type of presentation disparity that exists between remotely linked conferences spaces.

Laptops exist today where a logo or some other device on a rear surface of a display can be illuminated, primarily for the purpose of highlighting the logo for aesthetic purposes. It is contemplated that laptops may be provided with the ability to control the color of the rear display surface logo. In this case, system state indicators that indicate content sharing and specifically who has control of shared content may be provided using the rear display surface logo or some other light device integrated into a laptop. Here, for instance, a link to a system to share without sharing may be indicated via yellow and sharing by a specific user associated with the color green may be indicated via green light, etc.

Yet one other interesting configuration contemplated by the present disclosure is similar to the FIG. 1 system, albeit where the single tabletop assembly is replaced by a plurality of smaller portable tables that can be arranged together in a conference space adjacent one or more common display screens where each table includes integrated control and indicator devices or subassemblies. To this end, see, for instance FIG. 36 where a system 748 includes four castered table or station assemblies are shown at 750, 752, 754 and 756 that are proximate a large common emissive surface 760. Here, each station is similarly constructed and would operate in a similar fashion and therefore only station 750 is described in any detail. Station 750, like the single tabletop stations described above, includes a worksurface area that is surrounded by integrated light indicators on three sides for inviting a user to use the station, indicating linkage of the user's portable device or the user's identity to the overall system for sharing, a content sharing as described above. As shown at 770, in at least some cases the indicator light devices may be integrated into one or more of the edges of the station worktop member so that at least a portion of the light generated thereby is horizontally directed and another portion is directed generally upward so that the indicator states are easily viewable from all locations above or to the sides of the worktop. The station 750 further includes an integrated camera and directional or standard speakers and a microphone, an integrated control interface, an inductive charging or other assembly, an NFC sensor and communication device, a USB-C or other multifunction connection port, etc. In addition, because each station is castered and therefore mobile, in at least some cases each station will also include a wireless transceiver for wirelessly communicating with the system processor for control and state indication purposes.

Figure 36:
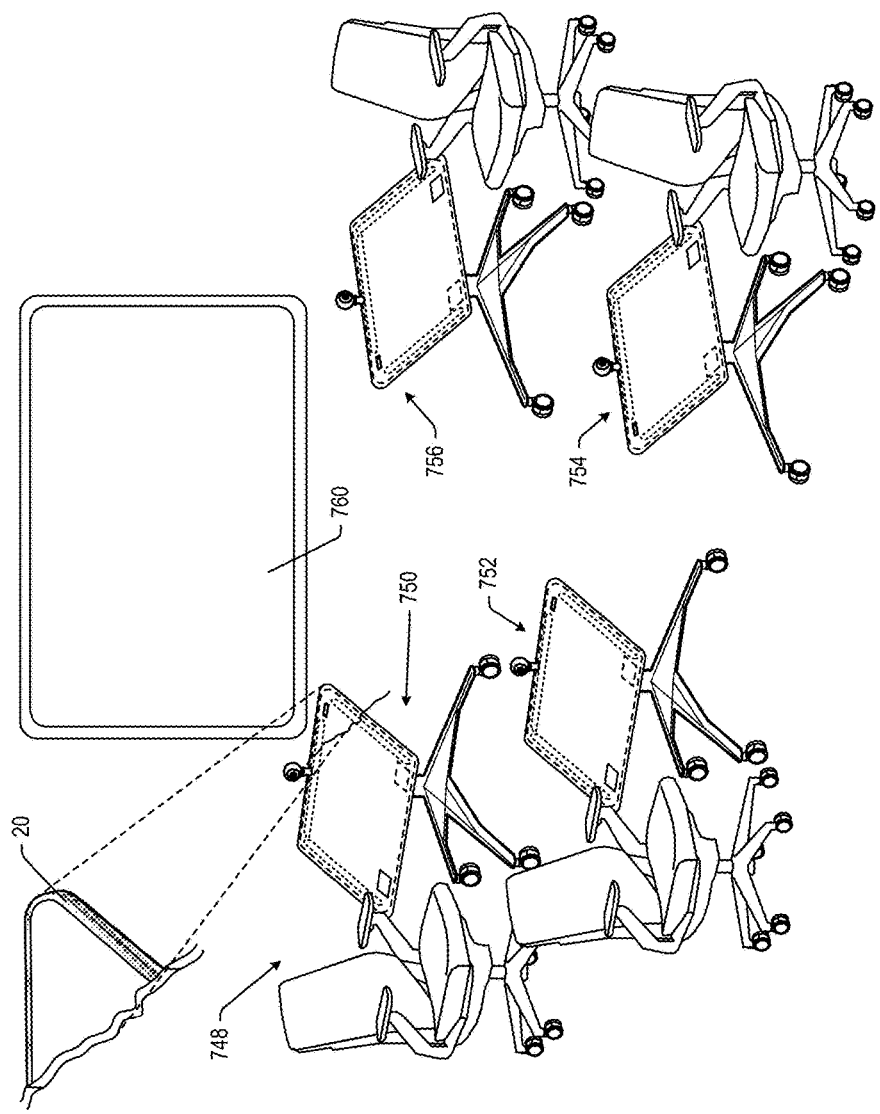
FIG. 36 is a perspective view of one other configuration where user stations are formed separately as opposed to along edges of a single tabletop member.

In a case like the system 748 shown in FIG. 36, in some embodiments any time a mobile station 750 is within some range of a common emissive surface (e.g., 760 or some other common surface), the station 750 may automatically associate with that surface for sharing purposes. Thus, for instance, a wireless access point system or the like may detect when station 750 is located within 20 feet of surface 760 and may automatically associate the station and the surface. In other cases where surface 760 is located in a defined conference space like a conference room that has a single egress, whenever statin 750 is located in the conference space occupied by surface 760, the station 750 may be associated with and only associated with station 760. In yet other cases an association process may be required that is akin to the laptop or other portable device association process described above with respect to FIG. 25 for associating stations with surface 760.

Referring again to FIG. 3, in some cases each station (e.g., 60b) may include only one indicator light device 72b and may or may not include other indicia for indicating the space associated with the station 60b. Thus, for instance, where indicators 70b and 74b are shown, printed indicia may be presented instead of light devices for simply indicating bounds of the station. In other cases the indicators 70b and 74b may be illuminated with only a single color to indicate bounds only when the station is occupied or, indeed, the entire station worksurface space may be dimly illuminated with a non-color changing light to indicate station bounds while only device 72b changes color to indicate invite, linked and controlling states. State indicators on a common emissive surface may also take other forms in addition to full colored frame representations including a single illuminated bar along the edge of an associated content field, a circular token representation where color is tied to the station that was used to share the content, etc. Other indicator and station defining configurations are contemplated.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims:

What is claimed is:

1. A digital content conference sharing system comprising:
a first large common emissive surface arranged for viewing by users within a conference space;
a first conference table assembly located in the conference space and including at least a first worksurface member and a plurality of indicator devices that form a plurality of user stations including at least first and second user stations, the first and second user stations including first and second station worksurfaces and first and second indicator devices spatially associated with the first and second worksurfaces, the first indicator device controllable to indicate at least first and second visually distinct states, the second indicator device controllable to indicate at least the first visually distinct state and a third visually distinct state that is distinct from the first and second states;
a processor programmed to perform the steps of:
(i) while a source device is associated with the first station and capable of sharing but is not sharing content on the common emissive surface, controlling the first indicator to indicate the first state;
(ii) while a source device is associated with the second station and capable of sharing but is not sharing content on the common emissive surface, controlling the second indicator to indicate the first state;
(iii) while a source device is associated with the first station and is sharing content on the common emissive surface, controlling the first indicator to indicate the second state; and
(iv) while a source device is associated with the second station and is sharing content on the common emissive surface, controlling the second indicator to indicate the third state.

2. The system of claim 1 wherein content is presented in non-overlapping content fields on the common emissive surface, the processor presenting a first indicator that indicates the second state spatially proximate any field including content from a source device associated with the first station and presenting a second indicator that indicates the third state spatially proximate any field including content from a source device associated with the second station.

3. The system of claim 2 wherein each first indicator includes at least a first light bar of a first color along an edge of a content sharing field in which content from a source device associated with the first station is presented and each second indicator includes at least one light bar of a second color along an edge of a content sharing field in which content from a source device associated with the second station is presented.

4. The system of claim 3 wherein each first indicator includes a full illuminated frame about an associated sharing field and each second indicator includes a full illuminated frame about an associated sharing field.

5. The system of claim 4 wherein the first, second, third and fourth states are indicated by generating different colored illumination.

6. The system of claim 5 wherein the first indicator device includes a plurality of light devices that substantially outline at least a portion of the first worksurface at the first station and the second indicator device includes a plurality of light devices that substantially outline at least a portion of the second worksurface at the second station.

7. The system of claim 2 wherein the first and second indicators are light devices capable of generating light in a plurality of different colors and wherein the first, second and third states are indicated by different illumination colors.

8. The system of claim 1 further including a user location sensor linked to the processor, the processor further programmed to control the first and second indicator devices to, upon the processor detecting a user proximate the at least a first worksurface that is not associated with a station, illuminate one of the indicators at one of the stations that is not currently associated with a source device to indicate a fourth state that is visually distinct from the first, second and third states to guide the user toward the associated station.

9. The system of claim 1 wherein each user station further includes an interface assembly that includes selectable buttons for controlling system content sharing states.

10. The system of claim 9 wherein each interface includes at least first and second selectable buttons for identifying first and second fields for sharing content on the common display.

11. The system of claim 10 wherein the processor controls the appearance of the selectable buttons.

12. The system of claim 11 wherein the processor controls the first interface first and second buttons to indicate the first state when a source device associated with the first station is not sharing content in the first and second fields, respectively, and to indicate the second state when a source device associated with the first station is sharing content in the first and second fields, respectively, and controls the second interface first and second buttons to indicate the first state when a source device associated with the second station is not sharing content in the first and second fields, respectively, and to indicate the third state when a source device associated with the second station is sharing content in the first and second fields, respectively.

13. The system of claim 12 wherein each interface also includes at least third and fourth selectable buttons for identifying third and fourth fields for sharing content on the common display.

14. The system of claim 13 wherein the processor controls the first interface third and fourth buttons to indicate the first state when a source device associated with the first station is not sharing content in the third and fourth fields, respectively, and to indicate the second state when a source device associated with the first station is sharing content in the third and fourth fields, respectively, and controls the second interface third and fourth buttons to indicate the first state when a source device associated with the second station is not sharing content in the third and fourth fields, respectively, and to indicate the third state when a source device associated with the second station is sharing content in the third and fourth fields, respectively.

15. The system of claim 12 wherein the plurality of user stations includes at least a third user station that includes at least a third indicator device and a third interface.

16. The system of claim 9 wherein each interface is integrated into the at least a first worksurface member.

17. The system of claim 16 wherein each interface includes a touch sensitive emissive surface where virtual control buttons are provided graphically on each interface.

18. The system of claim 1 further including at least one wireless transceiver linked to the processor, the transceiver for communicating wirelessly with the source devices.

19. The system of claim 18 wherein the wireless transceiver includes first and second separate near field communication devices proximate the first and second user stations.

20. The system of claim 19 wherein each station includes a separate near field communication device.

21. The system of claim 18 wherein each station further includes a content sharing interface integrated into the worksurface member.

22. The system of claim 1 wherein the at least a first worksurface member includes a separate work surface member for each of the user stations.

23. The system of claim 1 further including a second large common emissive surface arranged for viewing by users within a second conference space and at least a second conference table assembly located in the second conference space and including at least a second worksurface member and a plurality of indicator devices that form a plurality of user stations including at least third and fourth user stations, the third and fourth user stations including third and fourth station worksurfaces and third and fourth indicator devices spatially associated with the third and fourth worksurfaces, the third indicator device controllable to indicate at least the first and a fourth visually distinct states, the fourth indicator device controllable to indicate at least the first visually distinct state and a fifth visually distinct state that is distinct from the other states, the content presented on the second common emissive surface replicating the content presented on the first common emissive surface, the processor programmed to further perform the steps of:

(i) while a source device is associated with the third station and capable of sharing but is not sharing content on the common emissive surfaces, controlling the third indicator to indicate the first state;

(ii) while a source device is associated with the fourth station and capable of sharing but is not sharing content on the common emissive surfaces, controlling the fourth indicator to indicate the first state;

(iii) while a source device is associated with the third station and is sharing content on the common emissive surface, controlling the third indicator to indicate the third state; and (iv) while a source device is associated with the fourth station and is sharing content on the common emissive surface, controlling the fourth indicator to indicate the fourth state.

24. The system of claim 1 wherein the indicators are de-energized when no source device is associated with an associated user station.

25. The system of claim 1 further including at least a first sensor device for sensing when a wireless source device is within any one of the station spaces, the processor programmed to, upon detecting that a source device is located within a station space that is not currently associated with a source device, automatically initiating a process to associated the source device with the station.

26. The system of claim 1 further including at least one power and data connection port integrated into the worksurface adjacent each of the user stations.

27. The system of claim 26 wherein the at least one power and data connector port includes a USB-C port.

28. The system of claim 1 wherein the indicators are arranged along rear edge portions of each of the user stations.

29. The system of claim 1 wherein content sharing is egalitarian so that when one user is sharing content in one of the content sharing spaces any other user can take control of that one of the content sharing spaces to share other content in that space.

30. The system of claim 1 wherein the processor presents instructions to system users on the common emissive surface informing users how to share content.

31. A digital content conference sharing system comprising:
a first large common emissive surface arranged for viewing by users within a conference space;
a first conference table assembly located in the conference space and including at least a first worksurface member and a plurality of indicator devices that form a plurality of user stations, each user station including a station specific section of the worksurface member and indicator devices spatially associated with the station, each indicator device controllable to indicate at least first and second visually distinct states wherein each first state is indicated in a first visually distinct manner and each second state is indicated in an indicator specific second visually distinct manner that is different for each of the indicators, each state including the first state and each of the indicator specific second visually distinct states indicated by generating light of a state specific and visually distinct color;
a processor programmed to perform the steps of:
(i) while a source device is associated with a user station and capable of sharing but is not sharing content on the common emissive surface, controlling the indicator associated with the station to indicate the first state;
(ii) while a source device is associated with a user station and is currently sharing content in a field on the common emissive surface, controlling the indicator associated with the station to indicate the indicator specific second state and presenting an on screen indicator that also indicates the indicator specific second state associated with the user station.

32. The system of claim 31 wherein content is presented in non-overlapping content fields on the common emissive surface, the processor presenting a first indicator that indicates the first indicator specific second state spatially proximate any field including content from a source device associated with the first station and presenting a second indicator that indicates the second indicator specific second state spatially proximate any field including content from a source device associated with the second station.

33. The system of claim 32 wherein each first indicator includes at least a first light bar of a first color along an edge of a content sharing field in which content from a source device associated with the first station is presented and each second indicator includes at least one light bar of a second color along an edge of a content sharing field in which content from a source device associated with the second station is presented.

34. The system of claim 32 wherein the first and second indicators are light devices capable of generating light in a plurality of different colors.

35. The system of claim 31 further including a user location sensor linked to the processor, the processor further programmed to control the first and second indicator devices to, upon the processor detecting a user proximate the at least a first worksurface that is not associated with a station, illuminate one of the indicators at one of the stations that is not currently associated with a source device to indicate a state that is visually distinct from the first and second states to guide the user toward the associated station.

36. The system of claim 31 wherein each user station further includes an interface assembly that includes selectable buttons for controlling system content sharing states.

37. The system of claim 36 wherein each interface includes at least first and second selectable buttons for identifying first and second fields for sharing content on the common display.

38. The system of claim 37 wherein the processor controls the appearance of the selectable buttons.

39. The system of claim 38 wherein the processor controls the first interface first and second buttons to indicate the first state when a source device associated with the first station is not sharing content in the first and second fields, respectively, and to indicate the first station specific second state when a source device associated with the first station is sharing content in the first and second fields, respectively, and controls the second interface first and second buttons to indicate the first state when a source device associated with the second station is not sharing content in the first and second fields, respectively, and to indicate the second station specific second state when a source device associated with the second station is sharing content in the first and second fields, respectively.

40. The system of claim 31 further including at least one wireless transceiver linked to the processor, the transceiver for communicating wirelessly with the source devices.

41. A digital content conference sharing system comprising:
a first large common emissive surface arranged for viewing by users within a conference space;
a first conference table assembly located in the conference space and including at least a first worksurface member and a plurality of indicator devices that form a plurality of user stations, each user station including a station specific section of the worksurface member and indicator devices spatially associated with the station, each indicator device controllable to indicate at least first and second visually distinct states wherein each first state is indicated in a first visually distinct manner and each second state is indicated in an indicator specific second visually distinct manner that is different for each of the indicators, each state including the first state and each of the indicator specific second visually distinct states indicated by generating light of a state specific and visually distinct color, each station further including a station specific user interface integrated into the worksurface member including at least first and second selectable content sharing buttons associated with at least first and second fields on the common emissive surface, the buttons operable to control content sharing in an egalitarian fashion;
a processor programmed to perform the steps of:
(i) while a source device is associated with a user station and capable of sharing but is not sharing content on the common emissive surface, controlling the indicator associated with the station to indicate the first state;
(ii) while a source device is associated with a user station and is currently sharing content in a field on the common emissive surface, controlling the indicator associated with the station to indicate the indicator specific second state and presenting an on screen indicator that also indicates the indicator specific second state associated with the user station.

42. The system of claim 41 wherein content is presented in non-overlapping content fields on the common emissive surface.

43. The system of claim 41 wherein the first and second indicators are light devices capable of generating light in a plurality of different colors.

44. The system of claim 41 wherein each user station further includes an interface assembly that includes selectable buttons for controlling system content sharing states.

45. The system of claim 44 wherein each interface includes at least first and second selectable buttons for identifying first and second fields for sharing content on the common display.

46. The system of claim 45 wherein the processor controls the appearance of the selectable buttons.

* * * * *

UNITED STATES PATENT AND TRADEMARK OFFICE
CERTIFICATE OF CORRECTION

PATENT NO. : 10,264,213 B1
APPLICATION NO. : 15/840730
DATED : April 16, 2019
INVENTOR(S) : Darrin Sculley Page 1 of 1

It is certified that error appears in the above-identified patent and that said Letters Patent is hereby corrected as shown below:

In the Specification

Column 40, Line 16, "at" should read --at 32.--.

Signed and Sealed this
Twenty-eighth Day of May, 2019

Andrei Iancu
*Director of the United States Patent and Trademark Office*